United States Patent [19]

Smith

[11] Patent Number: 4,507,896

[45] Date of Patent: Apr. 2, 1985

[54] CENTERLESS GRINDING SYSTEMS

[75] Inventor: Roderick L. Smith, Rockford, Ill.

[73] Assignee: Energy Adaptive Grinding, Inc., Rockford, Ill.

[21] Appl. No.: 445,689

[22] Filed: Nov. 30, 1982

[51] Int. Cl.³ .............................................. B24B 49/16
[52] U.S. Cl. ................................. 51/165.92; 51/103 R
[58] Field of Search ............ 51/165.77, 165.71, 165.92, 51/165.91, 103 R, 103 TF

[56] References Cited

U.S. PATENT DOCUMENTS

| | | | |
|---|---|---|---|
| 3,653,855 | 4/1972 | Smith | 51/165.77 |
| 3,699,720 | 10/1972 | Lenning | 51/165.91 |
| 3,807,098 | 4/1974 | Schaller et al. | 51/165.91 |
| 3,859,755 | 1/1975 | Schaller | 51/165.92 |
| 4,014,142 | 3/1977 | Coes, Jr. | 51/165.77 |
| 4,053,289 | 10/1977 | Tatsumi | 51/165.77 |
| 4,055,027 | 10/1977 | Freddi | 51/165.77 |
| 4,118,900 | 10/1978 | Moritomo et al. | 51/165.77 |
| 4,137,677 | 2/1979 | Nedreski | 51/165.92 |

Primary Examiner—Harold D. Whitehead

Attorney, Agent, or Firm—Leydig, Voit, Osann, Mayer & Holt, Ltd.

[57] ABSTRACT

A centerless grinding system comprises a driven grinding wheel, a driven regulating wheel, and a work rest blade for centerless grinding of a workpiece supported by the work rest blade between the grinding wheel and the regulating wheel; means for determining the rate of reduction of the workpiece radius while it is being ground; and means responsive to the rate of reduction of the workpiece radius for controlling the ratio of the power consumed in removing workpiece material to the rate of removal of workpiece material by the grinding wheel. The regulating wheel is preferably fed toward the grinding wheel to feed the workpiece into the grinding wheel. In a similar center-type grinding system, the workpiece is mounted on spindles or chucks which are movable toward the grinding wheel so that the workpiece can still be fed by the regulating wheel. Workpieces longer than the axial dimension of the grinding wheel are ground in successive plunges along the length of the workpiece, with said ratio being controlled in each successive plunge. To grind hollow workpieces, the regulating wheel or grinding wheel is placed inside the hollow workpiece.

20 Claims, 25 Drawing Figures

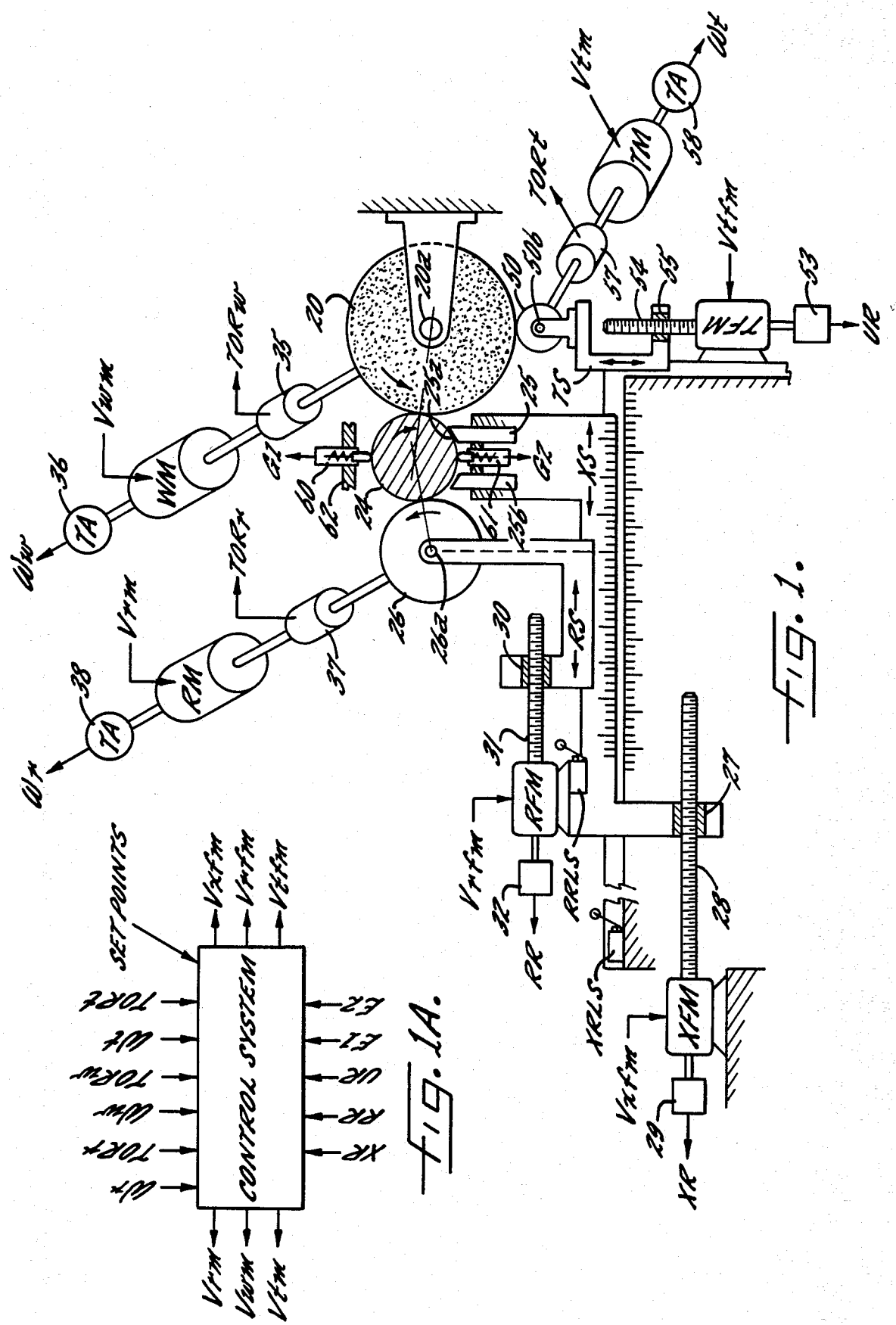

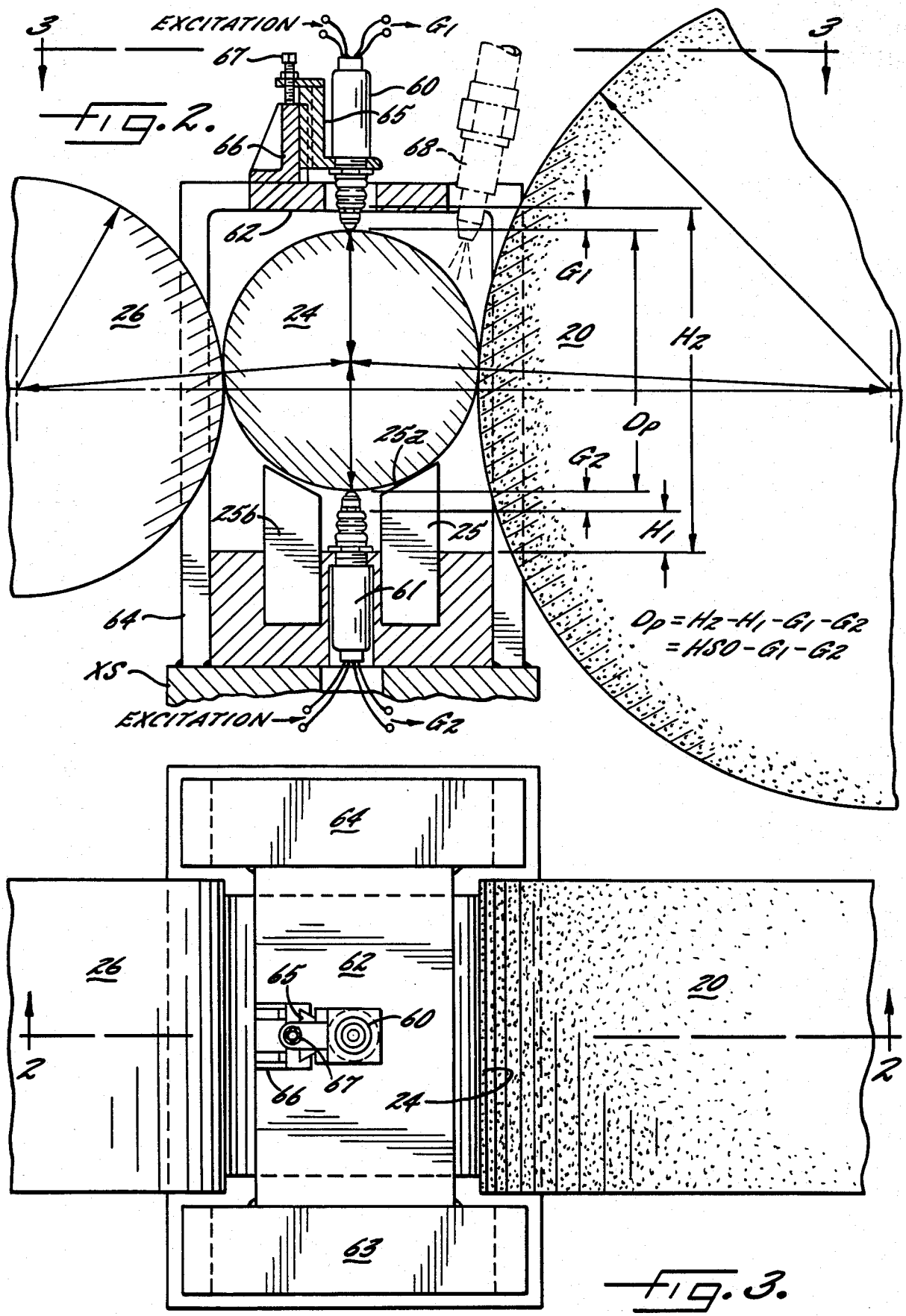

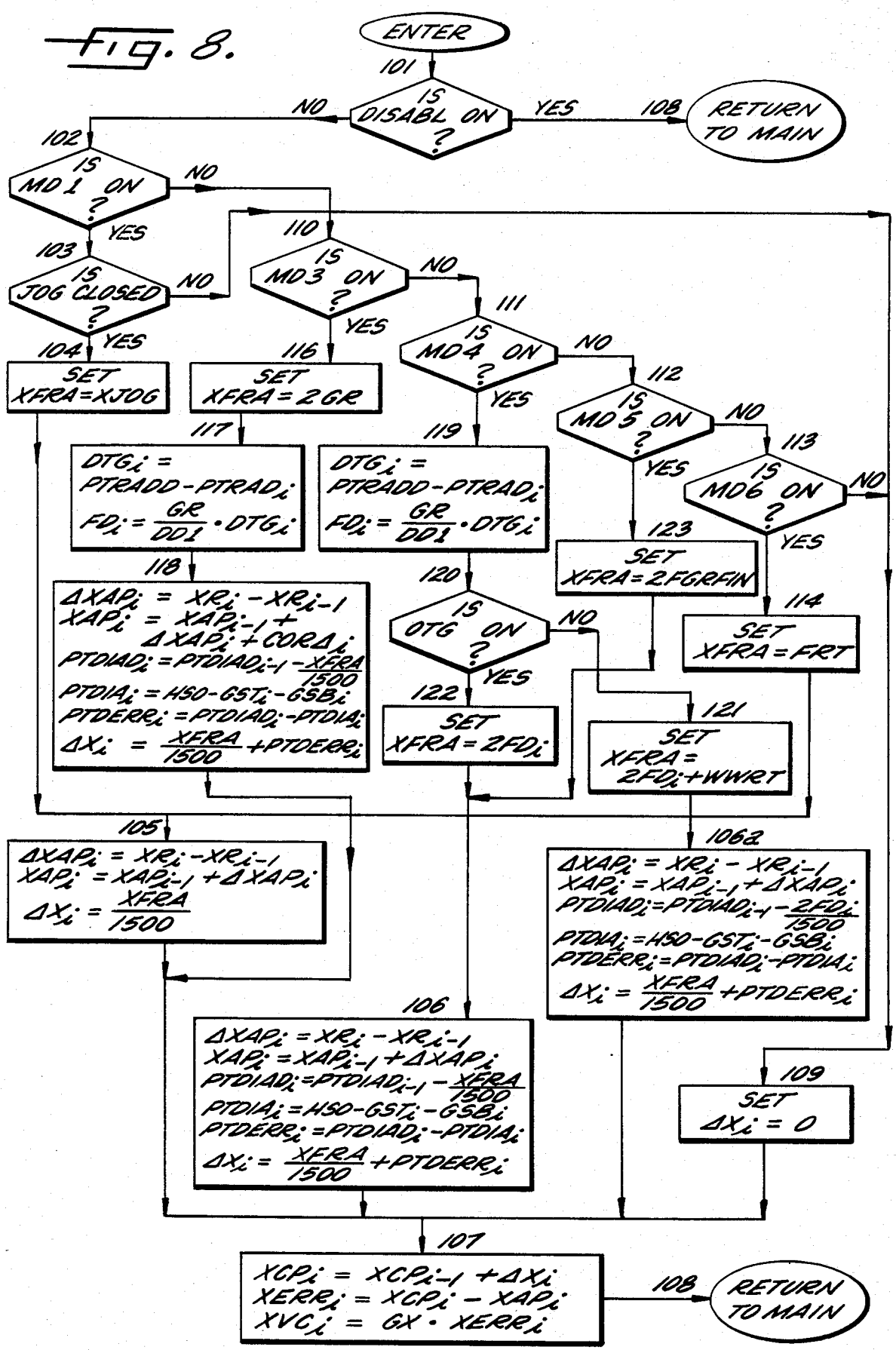

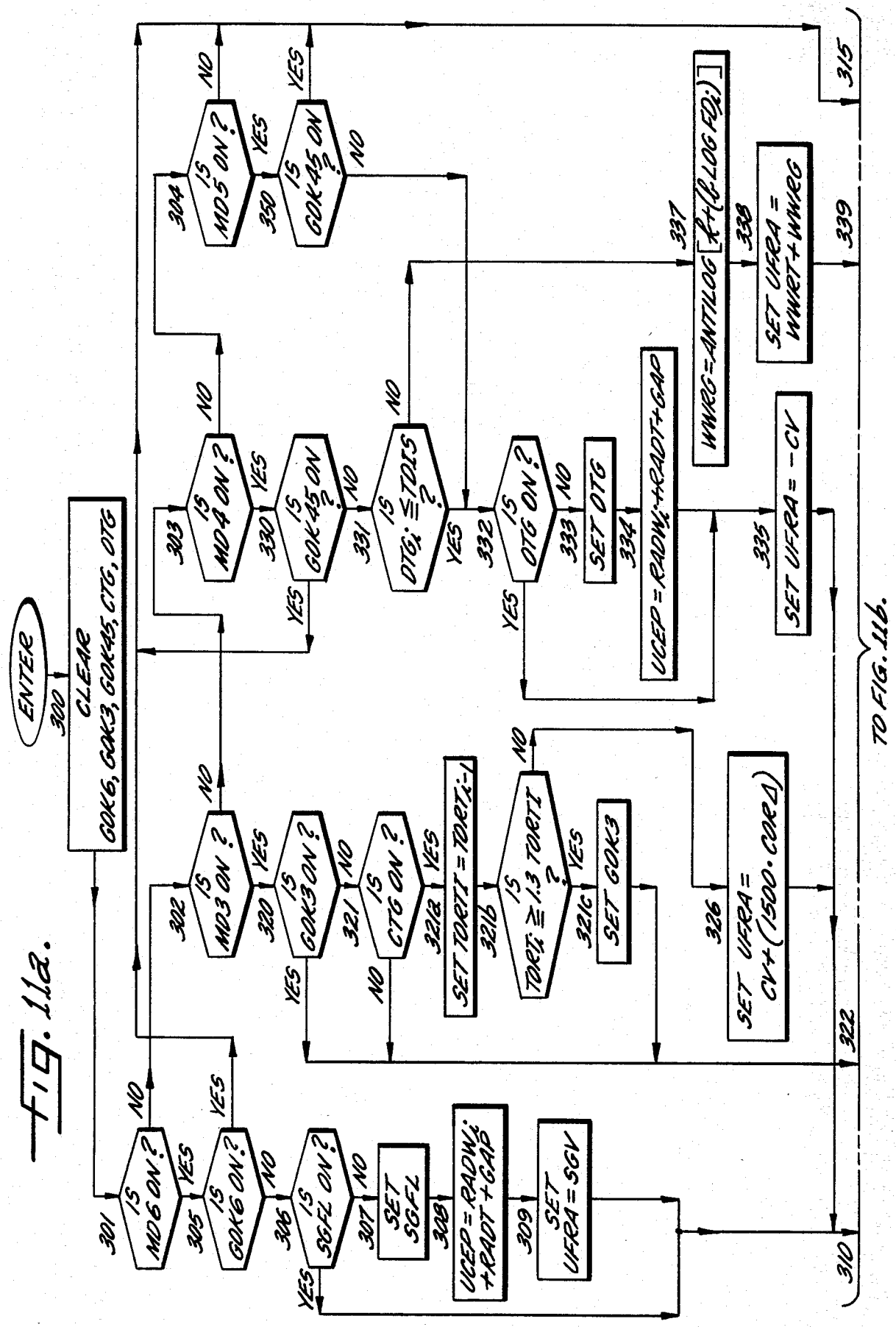

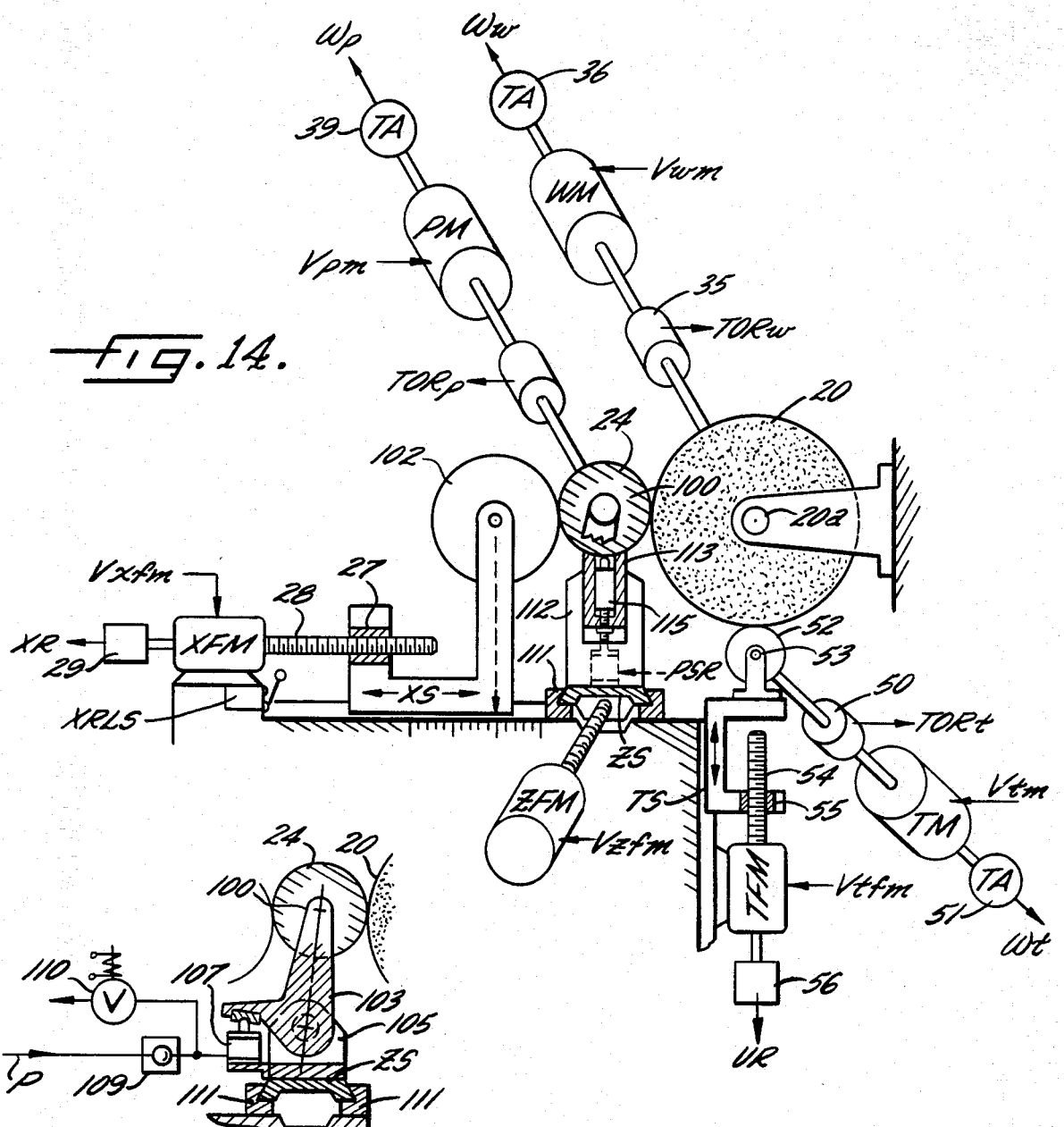
Fig. 14.
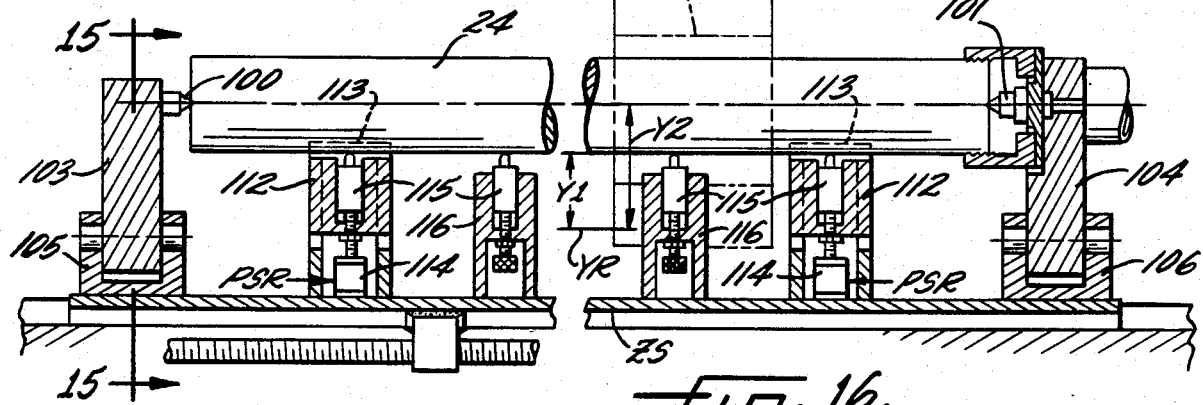
Fig. 15.
Fig. 16.

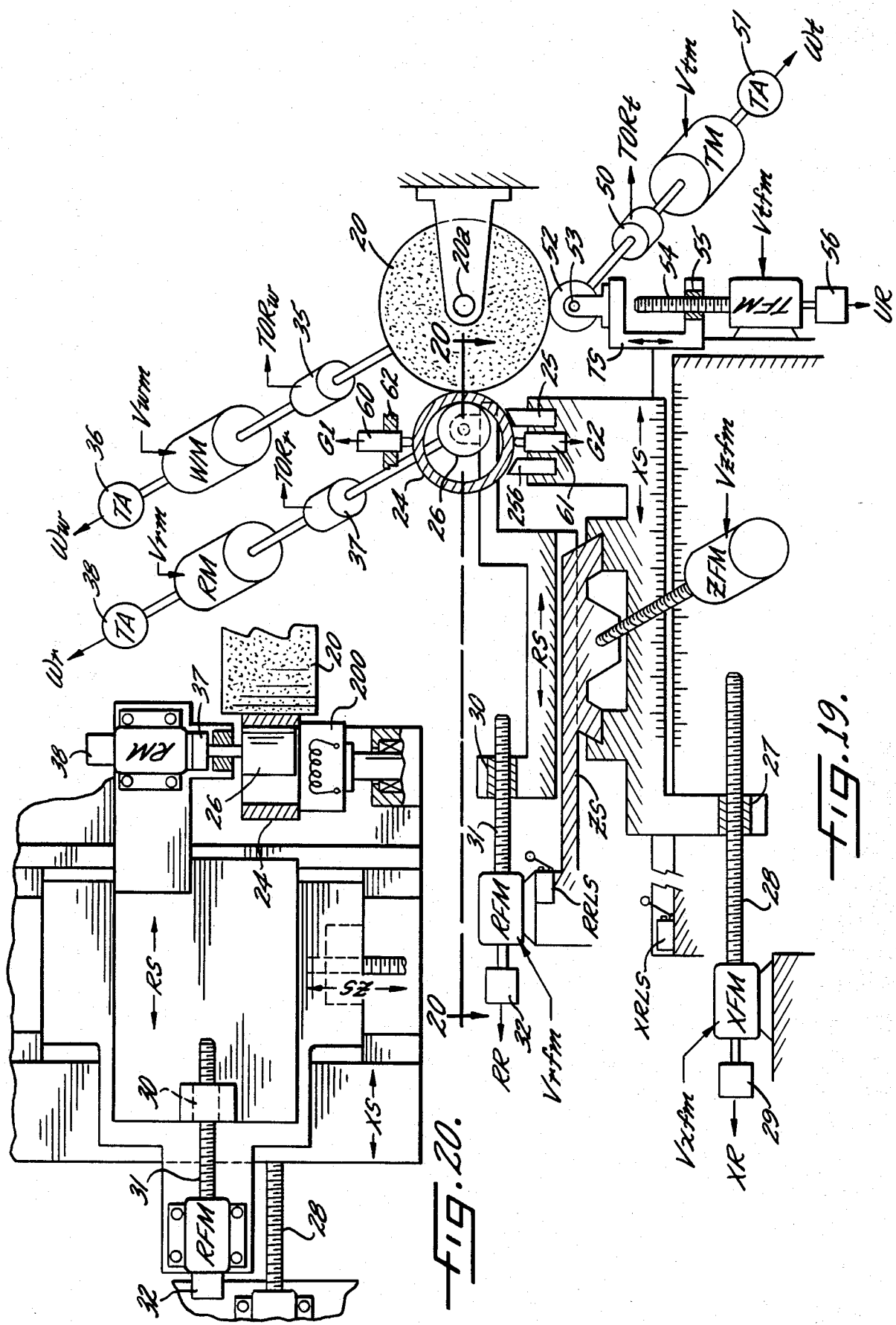

CENTERLESS GRINDING SYSTEMS

FIELD OF THE INVENTION

The present invention relates generally to grinding systems for grinding a wide variety of different kinds of workpieces with a rotationally driven grinding wheel, including both centerless grinding systems (where the workpiece is not always held on a fixed axis) and center-type grinding systems (where the workpiece is held on a fixed axis), for grinding both solid and hollow workpieces.

DESCRIPTION OF PRIOR ART

Centerless grinding is a well known grinding technique in which the workpiece is not held in any centering spindles or chucks, but rather is inserted into the space between the faces of a grinding wheel and an opposed regulating wheel. The bottom of the workpiece is normally supported by a work rest blade which has an inclined top surface so that the vertical position of the workpiece, relative to the centers of the grinding wheel and the regulating wheel, can change without losing the support of the work rest blade. The rotational axis of the workpiece normally remains above the rotational axes of the regulating wheel and the grinding wheel so that the workpiece is also supported by both wheels.

There are two different types of centerless grinding—infeed and throughfeed. In infeed centerless grinding, the workpiece is supported by the work rest blade and the regulating wheel while the grinding wheel is fed radially into the workpiece. The grinding wheel is rotationally driven at a surface velocity greater than that of the regulating wheel to produce the desired relative surface velocity at the grinding interface between the workpiece and the grinding wheel. In throughfeed centerless grinding, the workpieces are fed in seriatim in an axial direction by canting the axis of the regulating wheel relative to that of the grinding wheel, the grinding wheel is advanced just enough to compensate for wheel wear, thereby maintaining a constant gap between the grinding wheel and the regulating wheel.

The rate at which a workpiece is rounded in centerless grinding generally increases as the height of the workpiece axis above a centerline connecting the two wheel axes increases. The extent to which this height can be increased, however, is limited by an increasing tendency for grinding chatter to occur as such height is increased. The tendency for grinding chatter to occur also increases as the grinding wheel dulls in centerless grinding. This grinding chatter can be avoided by reducing the grinding feed rate, but the grinding wheel must also be periodically diamond dressed—requiring interruption of the grinding operation—to maintain a reasonable, but low, level of productivity.

In center-type cylindrical grinding, the axis of the workpiece is held in a fixed position while being ground. In some cases the grinding wheel is "plunged" into the workpiece while both the wheel and the workpiece are being driven about their respective axes. In other cases the grinding wheel is traversed along the length of the workpiece in successive passes, again while both the wheel and the workpiece are being driven about their axes.

Long workpieces, i.e., workpieces that are longer than the grinding wheel in the axial direction, are usually ground by either center-type traverse grinding or through-feed centerless grinding. In both these grinding techniques, the grinding wheel and the workpiece are moved relative to each other in the axial direction, thereby producing a curvature across the grinding wheel face due to the fact that the leading portion of the grinding wheel face does more of the grinding than the trailing portion. For the same reason, there is a gradation of wheel sharpness or dullness across the face of the grinding wheel, which means that a severely limiting constraint is imposed on the entire grinding operation by that fraction of the grinding wheel face which is grinding at the lowest level of efficiency and productivity. For example, if the dullest portion of the wheel face—and certain portions will always be duller than others—were fed into the workpiece at the optimum feed rate for the sharpest portion of the wheel face, the workpiece would be metallurgically burned by the duller portions of the wheel. In fact, this is what often happens in actual practice as grinding machine operators try to increase the feed rate in order to improve productivity.

In through-feed centerless grinding, the duller portions of the wheel face present a further constraint because of the lower threshold for grinding chatter along those portions of the wheel. That is, the efficiency of the entire grinding operation must be reduced to a level that will prevent the least efficient portion of the wheel face from causing grinding chatter.

Center-type traverse grinding is further complicated by the need for multiple, adjustable steady rests along the length of the workpiece. The operator must continually adjust the radial positions of these steady rests in an effort to keep the workpiece deflection as small and uniform as possible along the length of the workpiece. This requires a high level of operative skill, particularly when grinding long slender workpieces which vary in cross-section along their length, such as long cam shafts having multiple cam lobes and bearings spaced along the length thereof.

Still other problems are encountered in centerless grinding of hollow workpieces, regardless of their length. One such problem is workpiece distortion caused by "squashing" of the workpiece between the grinding wheel and the workpiece supports located at various points around the outside surface of the workpiece. Such workpiece distortion causes grinding of out-of-round surfaces on workpieces which are supposed to have perfectly circular cross sections, which means that the final part of the grinding operation must be carried out slowly enough to permit the workpiece to relax and be ground to the desired degree of roundness; this, of course, greatly reduces the productivity of the grinding operation and dulls the grinding wheel. Furthermore, such workpiece distortion results in inaccurate gage readings, which can introduce disastrous positive feedback into control loops intended to correct any errors reflected by the gage reading.

OBJECTS OF THE INVENTION

It is a primary object of one aspect of the present invention to provide an improved grinding system which improves the efficiency, cost effectiveness, accuracy, reliability, and productivity of both centerless and center-type grinding of workpieces that are longer than the grinding wheels with which they are to be ground. In this connection, one particular object of this invention is to provide such a grinding system which enables the entire face of the grinding wheel to be used with maximum efficiency along the full length of such long workpieces, thereby maximizing the overall grinding rate and productivity.

It is another important object of this aspect of the invention to provide an improved grinding system which substantially reduces the possibility of metallurgical injury (e.g., metallurgical "burn") to the ground surfaces of long workpieces, while at the same time reducing the level of operator skill required and increasing the productivity of the grinding operation.

An important object of another aspect of this invention is to provide an improved centerless grinding system which permits the workpiece to be maintained at a relatively high position above the axes of the grinding wheel and regulating wheel, thereby accelerating the rounding of the workpiece, without producing grinding chatter. A related object of the invention is to provide such an improved centerless grinding system which eliminates, or at least minimizes, the need for diamond dressing of the grinding wheel to prevent grinding chatter.

It is a significant object of yet another aspect of the present invention to provide an improved center-type grinding system which eliminates the need for operator adjustment of steady rests along the length of the workpiece.

A further object of this invention is to provide an improved centerless grinding system for grinding the outer surfaces of hollow workpieces. More particularly, one objective is to provide such a system which minimizes workpiece distortion during the grinding of hollow workpieces, thereby accelerating the grinding of such workpieces with a high degree of accuracy.

Yet another object of the invention is to provide such an improved centerless grinding system which can be used to grind both the inner and outer surfaces of hollow workpieces.

It is another specific object to provide an improved angular grinding system which achieves a high rate of productivity with reliable and accurate control of the ground surfaces.

A still further object of this invention is to provide an improved grinding machine and associated control system, major portions of which can be used interchangeably for either center-type grinding or centerless grinding.

Other objects and advantages of the invention will be apparent from the following detailed description and the accompanying drawings.

IDENTIFICATION OF DRAWING FIGURES

FIG. 1 is a diagrammatic illustration of an exemplary centerless grinding machine with rotational and feed drives for the various relatively movable components, and with sensors for signaling the values of different physical parameters such as speeds, feed rates, and torques, for practicing the present invention;

FIG. 1A is a generalized representation of a control system to be associated with the apparatus of FIG. 1 in the practice of the present invention according to any of several embodiments;

FIG. 2 is a vertical section of the work rest blade and associated workpiece gages in a centerless grinding machine embodying the invention, also showing a workpiece and the regulating wheel and grinding wheel in contact therewith;

FIG. 3 is a plan view of the structure shown in FIG. 2;

Figure 5:
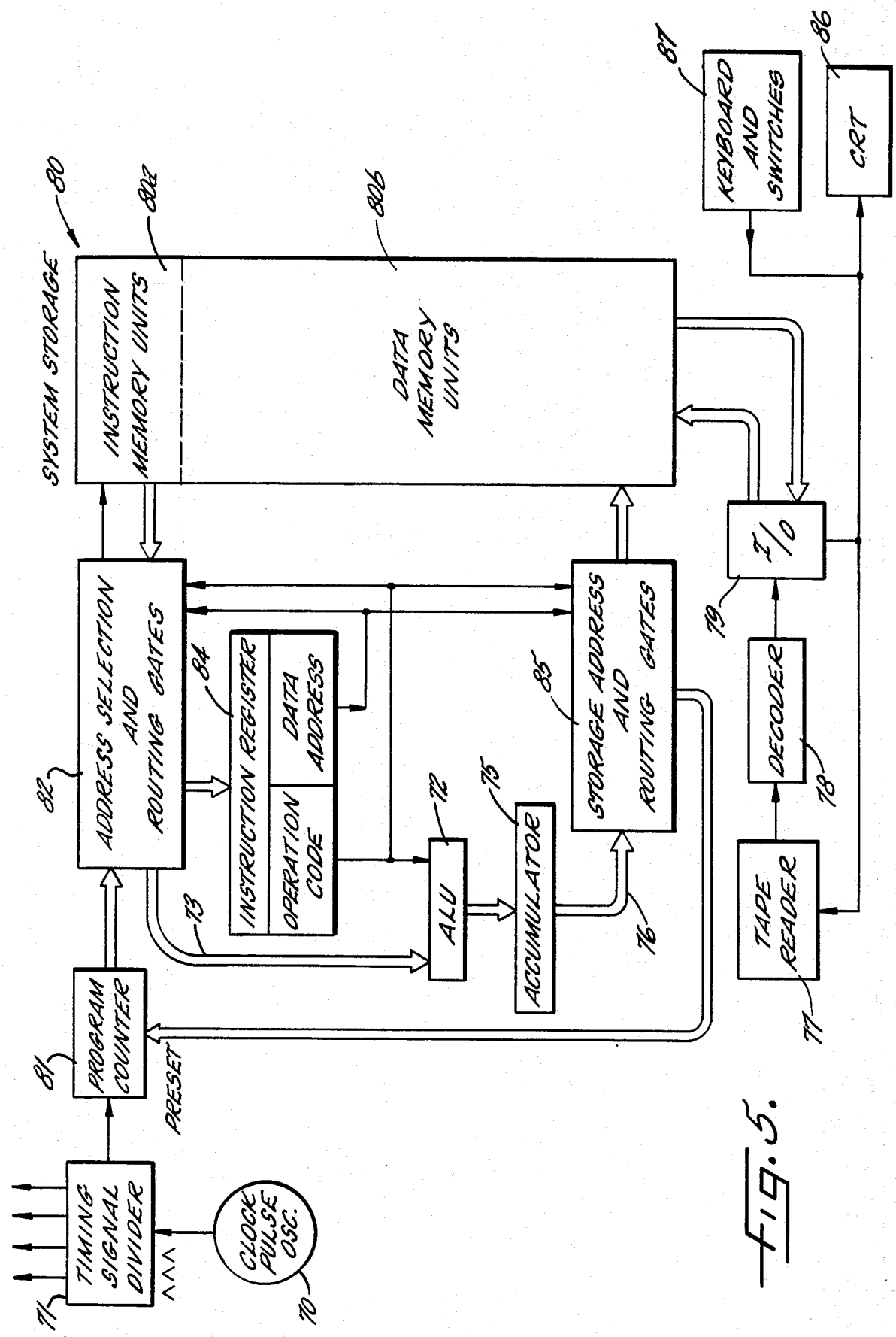
FIG. 5 is a block diagram of one suitable form of digital minicomputer with associated memory or storage, for use in controlling the grinding machine of FIG. 1.
Figure 6:
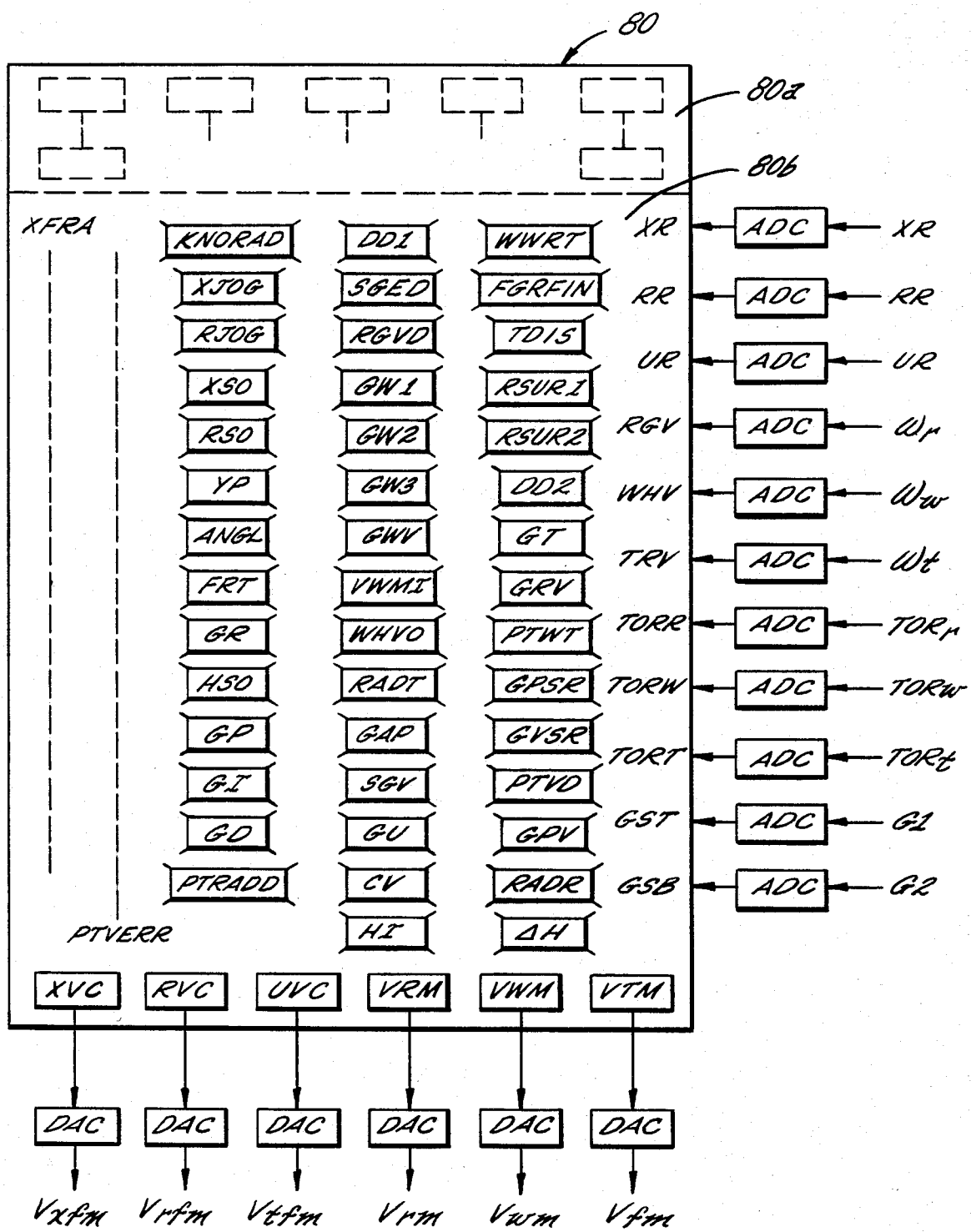
FIG. 6 is a block representation of the signal storage units or memory for the minicomputer of FIG, 5, when used to control the grinding machine of FIG. 1 according to the first example of the invention.
Figure 7A:
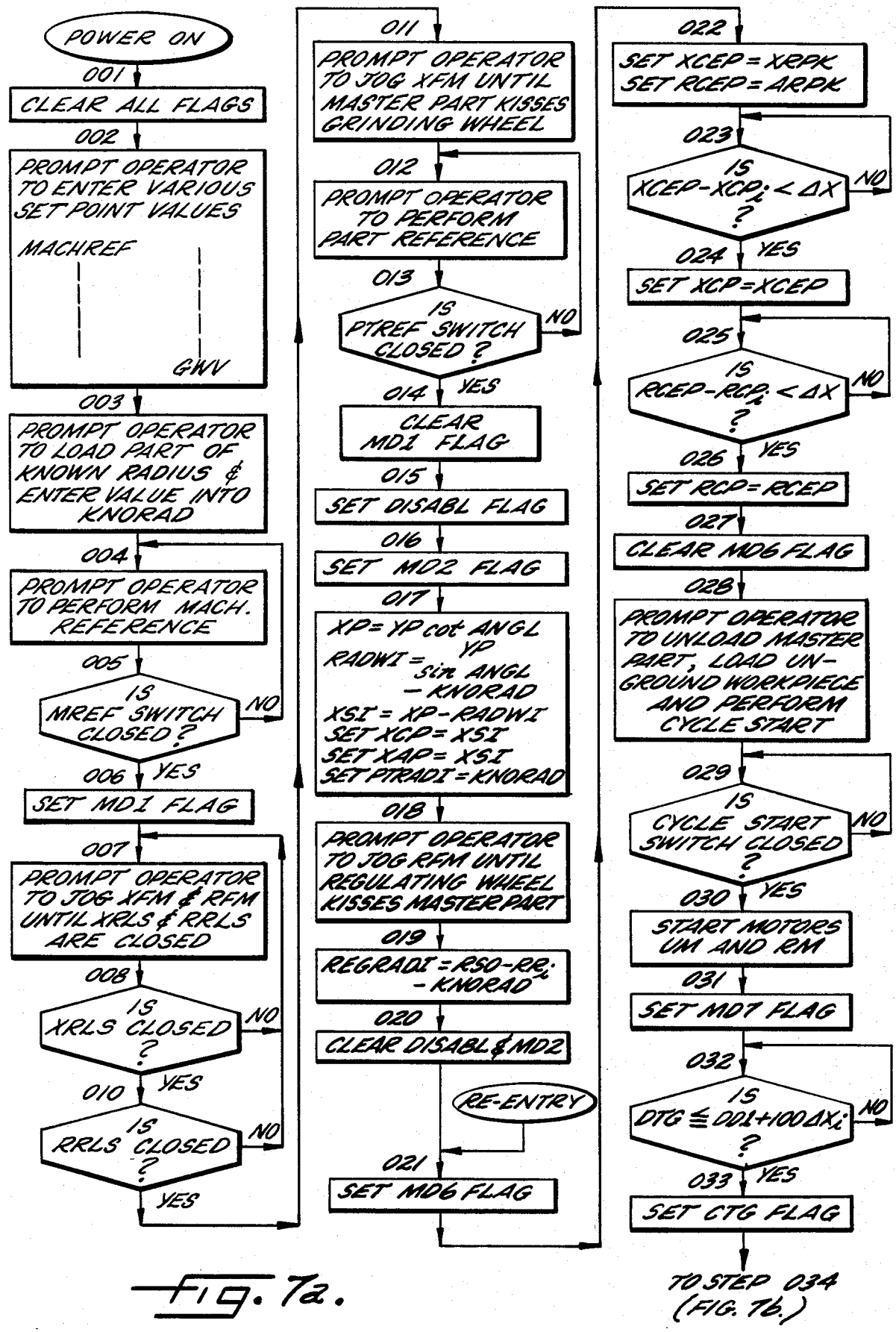
Figure 7B:
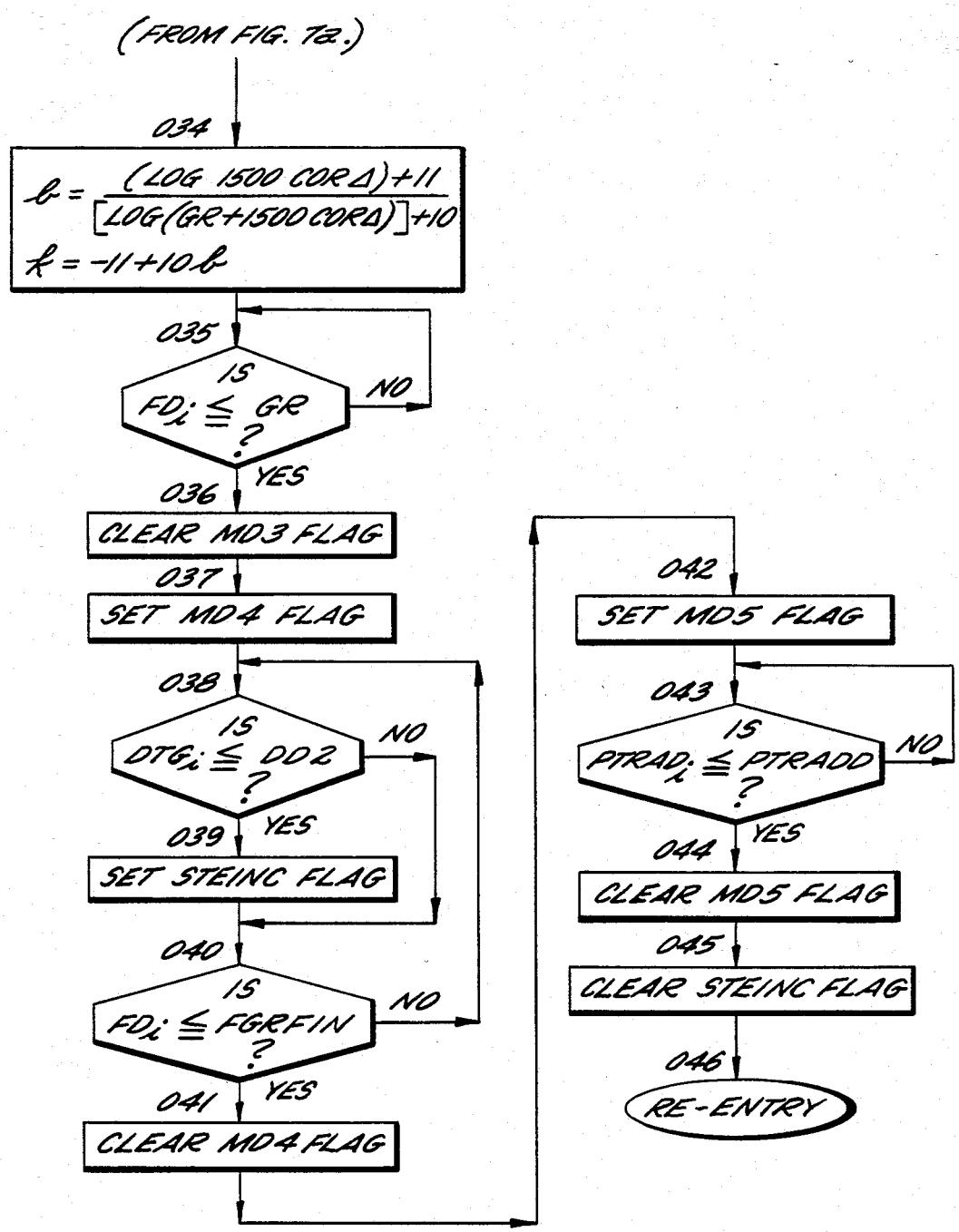
Figure 9:
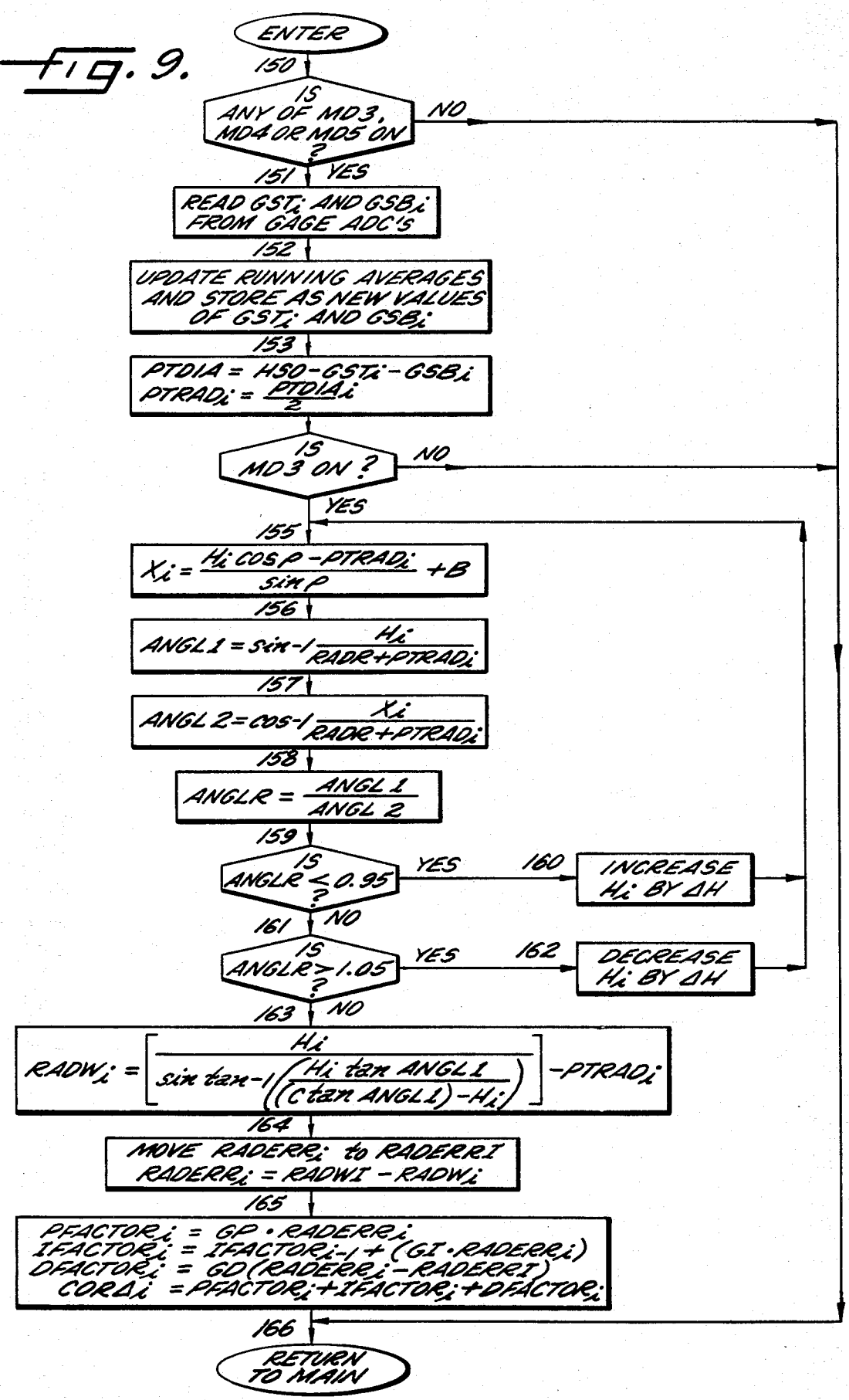
Figure 10:
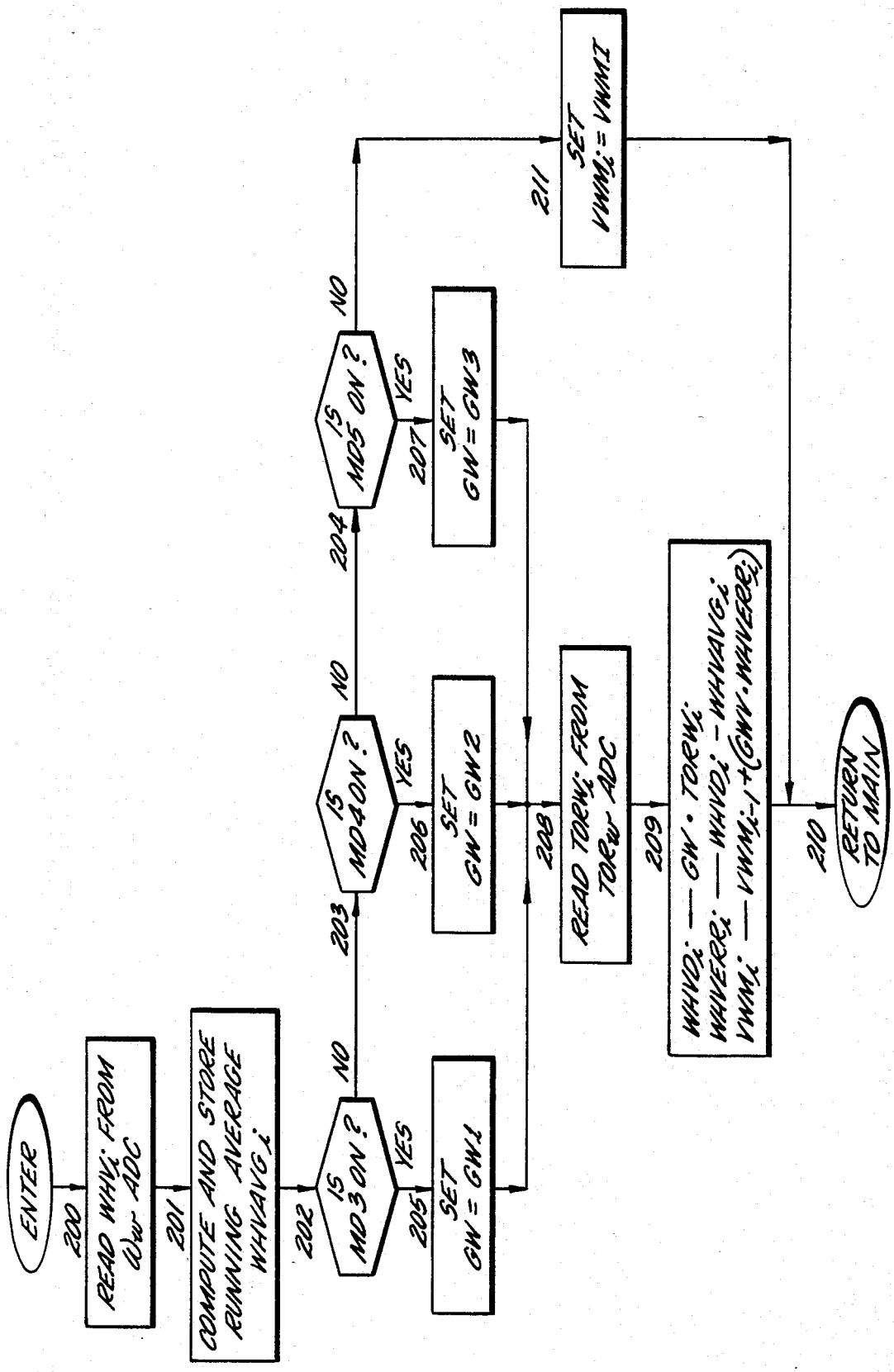
Figure 11B:
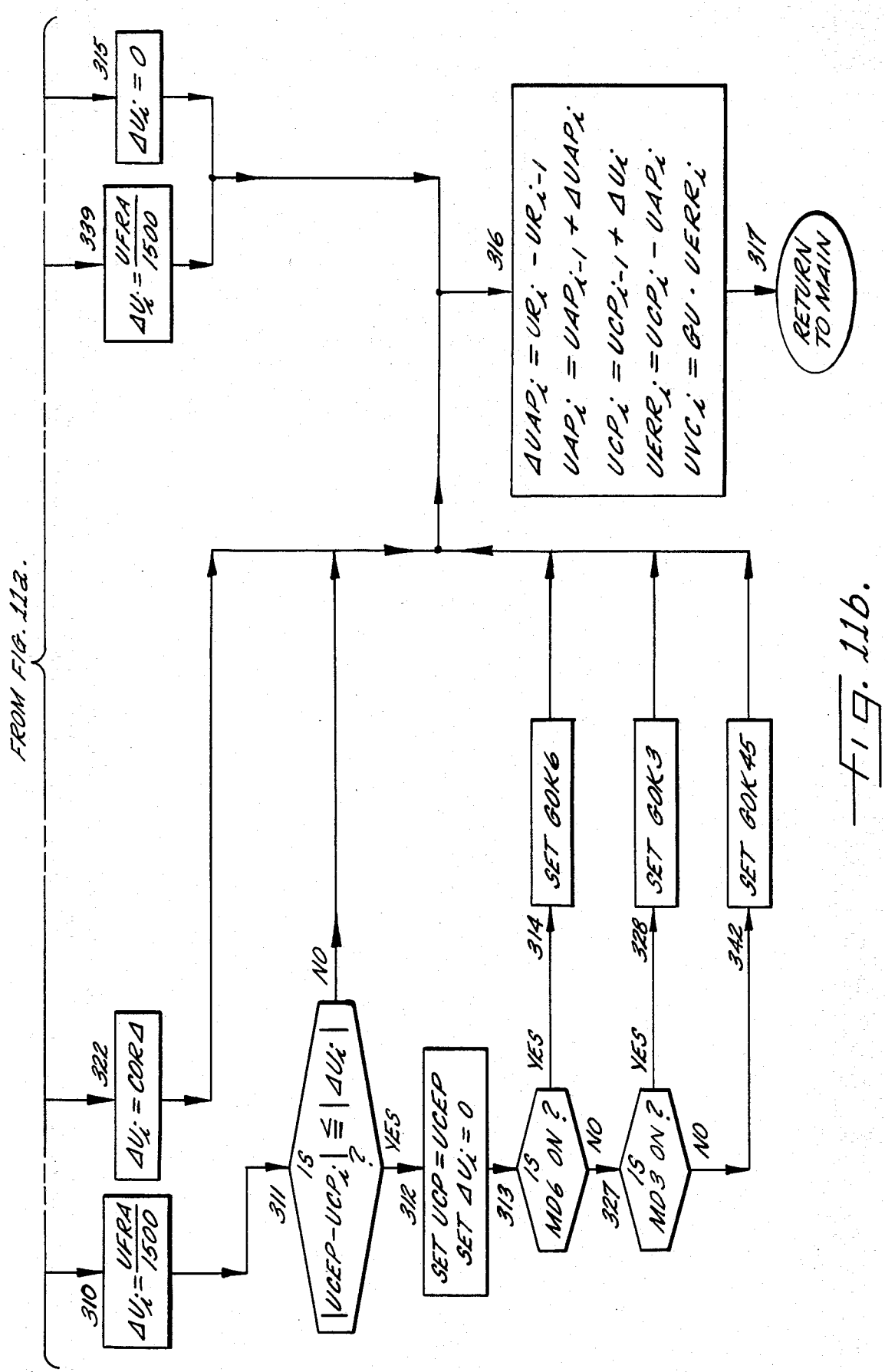
Figure 12:
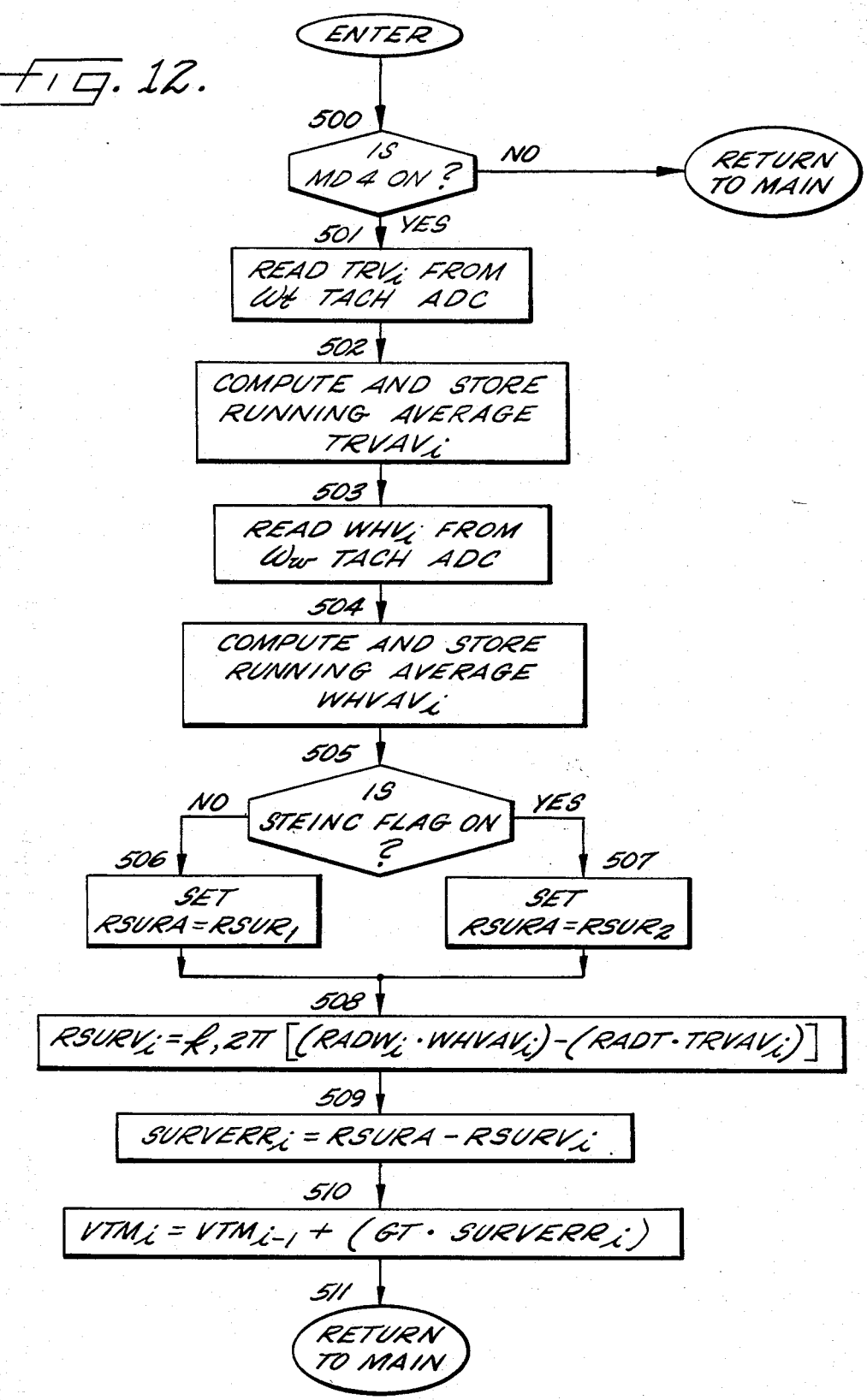
Figure 13:
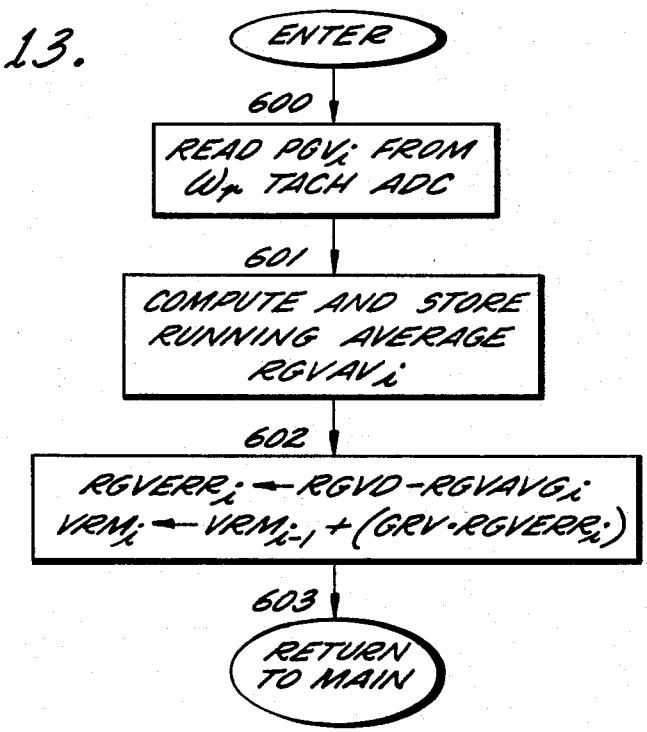
Figure 17:
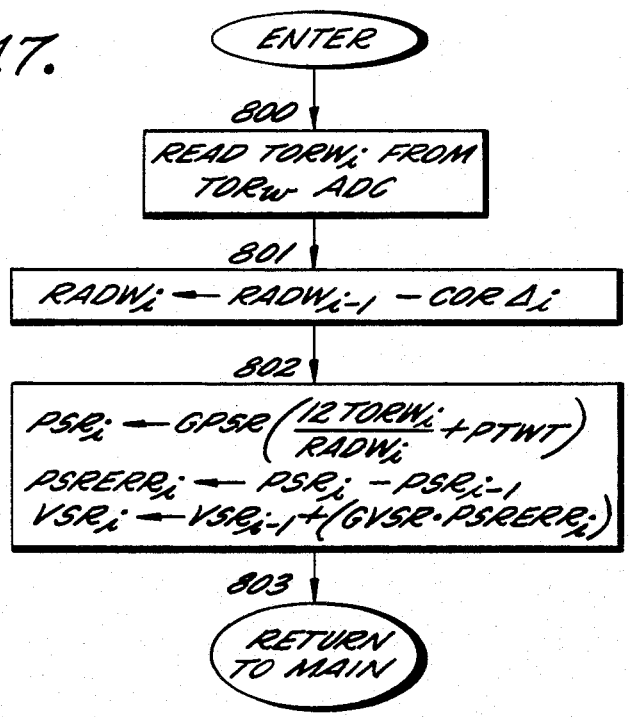
Figure 18:
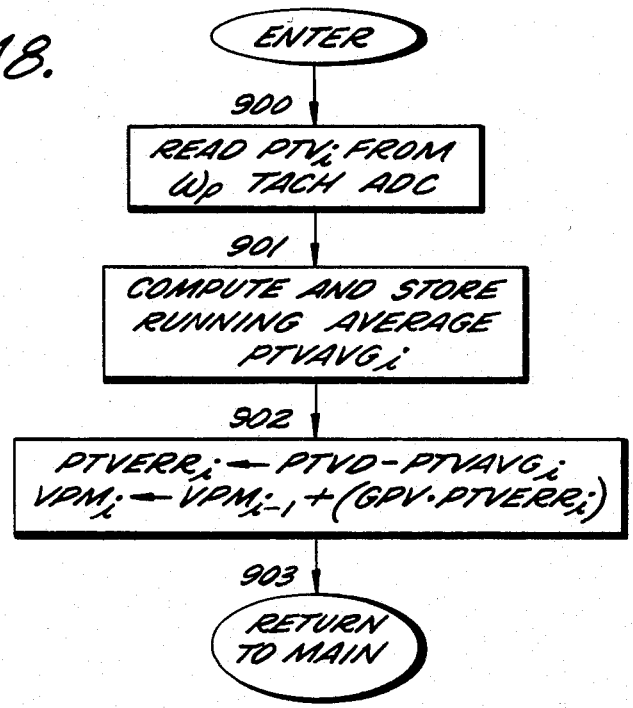
Figure 21:
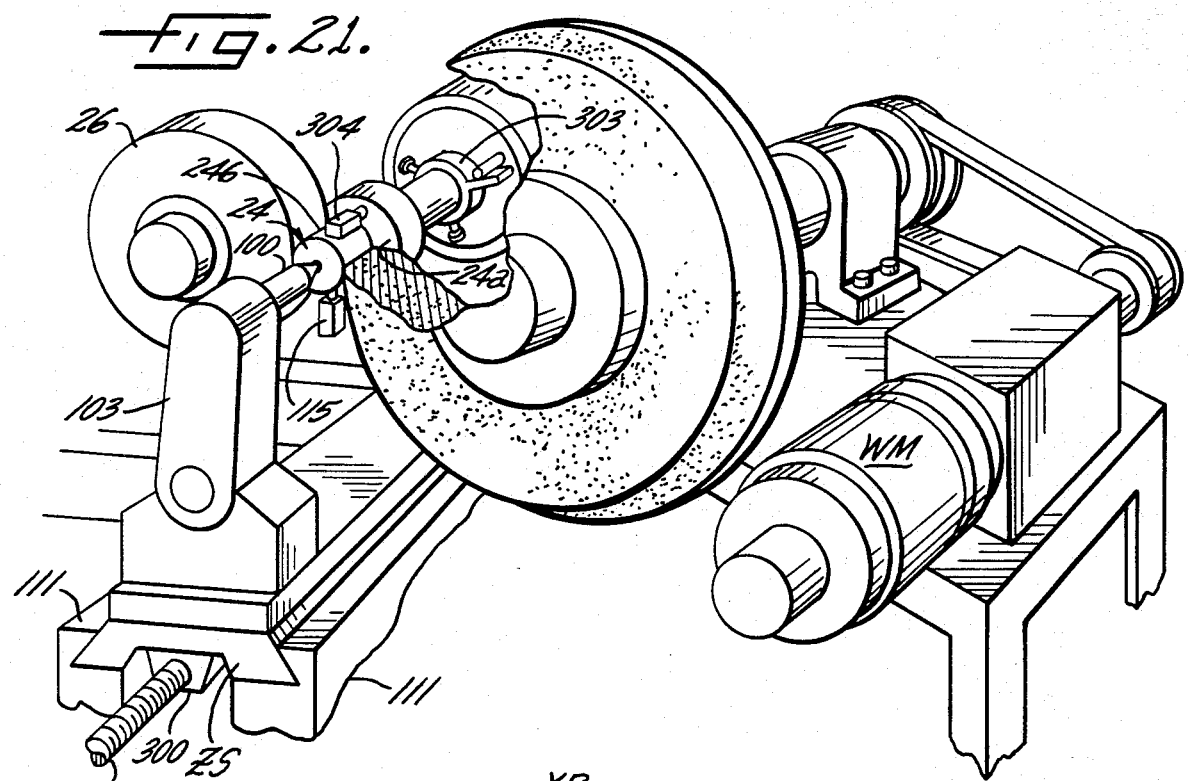
Figure 22:
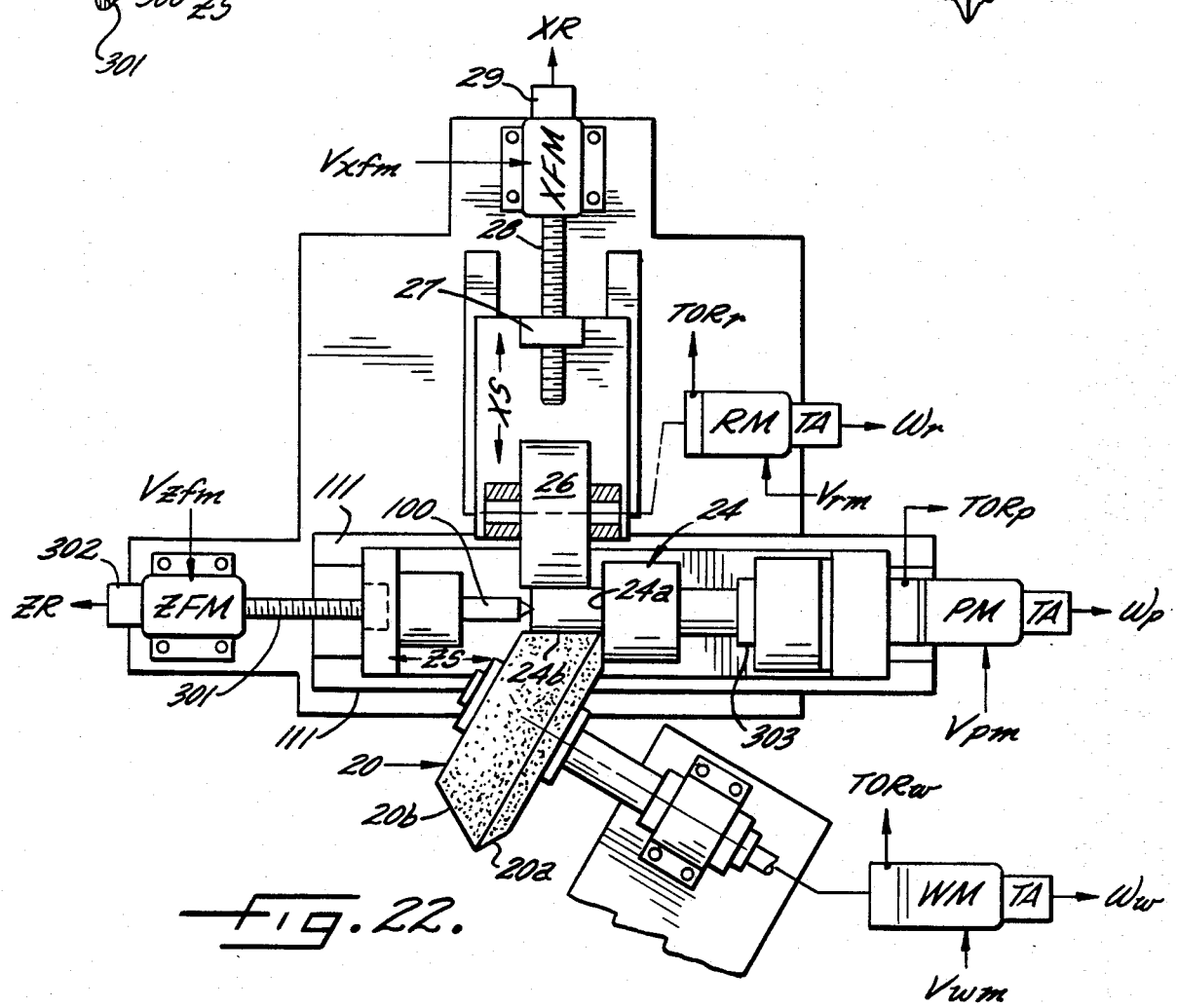

FIGS. 7a and 7b (hereinafter collectively referred to as FIG. 7) constitute a flow chart illustrating the sequence of operations carried out according to a main program stored in the memory of FIG. 6 and executed by the minicomputer of FIG. 5 for controlling the grinding machine of FIG. 1;

FIG. 8 is a flow chart illustrating the sequence of operations carried out according to a subroutine program stored in the memory of FIG. 6 and executed by the minicomputer of FIG. 5 for controlling the X-axis slide feed motor ZFM in the grinding machine of FIG. 1;

FIG. 9 is a flow chart illustrating the sequence of operations carried out according to a subroutine program stored in the memory of FIG. 6 and executed by the minicomputer of FIG. 5 for performing certain operations during modes 3, 4 and 5 in the grinding machine of FIG. 1;

FIG. 10 is a flow chart illustrating the sequence of operations carried out according to a subroutine program stored in the memory of FIG. 6 and executed by the minicomputer of FIG. 5 for controlling the grinding wheel drive motor WM during modes 3, 4 and 5 in the grinding machine of FIG. 1;

FIGS. 11a and 11b (hereinafter collectively referred to as FIG. 11) constitute a flow chart illustrating the sequence of operations carried out according to a subroutine program stored in the memory of FIG. 6 and executed by the minicomputer of FIG. 5 for controlling the truing roll slide feed motor TFM in the grinding machine of FIG. 1;

FIG. 12 is a flow chart illustrating the sequence of operations carried out according to a subroutine program stored in the memory of FIG. 6 and executed by the minicomputer of FIG. 5 for controlling the truing roll drive motor TM in the grinding machine of FIG. 1;

FIG. 13 is a flow chart illustrating the sequence of operations carried out according to a subroutine program stored in the memory of FIG. 6 and executed by the minicomputer of FIG. 5 for controlling the regulating wheel drive motor RM in the grinding machine of FIG. 1;

FIG. 14 is a diagrammatic illustration of an exemplary center-type grinding machine with rotational and feed drives for the various relatively movable components, and with sensors for signalling the values of different physical parameters such as speeds, feed rates and torques, for practicing the present invention;

FIG. 15 is a fragmentary vertical section of one of the spindle support arms in the machine of FIG. 14, along with a schematic diagram of hydraulic circuitry for controlling a hydraulic biasing force applied to the spindle arms;

FIG. 16 is a vertical section taken along one side of the workpiece in the grinding machine of FIG. 14;

FIG. 17 is a flow chart illustrating the sequence of operations carried out according to a subroutine program stored in the memory of FIG. 6 and executed by the minicomputer of FIG. 5 for controlling the hydraulic pressure supplied to the steady rest cylinders in the grinding machine of FIGS. 14–16;

FIG. 18 is a flow chart illustrating the sequence of operations carried out according to a subroutine program stored in the memory of FIG. 6 and executed by the minicomputer of FIG. 5 for controlling the workpiece drive motor in the grinding machine of FIGS. 14–16;

FIG. 19 is a diagrammatic illustration of an exemplary centerless grinding machine for hollow workpieces, with rotational and feed drives for the various relatively movable components, and with sensors for signalling the values of different physical parameters such as speeds, feed rates and torques, for practicing the present invention;

FIG. 20 is a section taken generally along line 20—20 in FIG. 19;

FIG. 21 is a partially diagrammatic perspective illustration of an exemplary angular grinding machine embodying the present invention; and FIG. 22 is a top plan view of the grinding machine of FIG. 21.

TYPICAL GRINDING MACHINE CONFIGURATION AND COMPONENTS

FIG. 1 diagrammatically shows a grinding machine with its various relatively movable components, together with various sensors and driving motors or actuators. Not all the sensors and actuators are required in certain ones of the method and apparatus embodiments to be described, but FIG. 1 may be taken as an "overall" figure illustrating most of the machine-mounted controllable components which are employed in centerless grinding according to the present invention.

The centerless grinding machine is here illustrated as including a grinding wheel 20 journaled for rotation about a fixed axis 20a and rotationally driven (here, counterclockwise) at an angular velocity $\omega_w$ by a wheel motor WM. As shown, the face of the grinding wheel is brought into relative rubbing contact with the work surface of a part or workpiece 24. The workpiece 24 is generally cylindrical in shape (or its outer surface is a surface of revolution) and supported on a work rest blade 25 having an inclined top surface 25a. A regulating wheel 26 also frictionally engages the surface of the workpiece 24 while being rotationally driven about its axis 26a at an angular velocity $\omega_r$ by a regulating wheel motor RM.

As is conventional in centerless grinding, the regulating wheel 26 is made of a rubber compound containing only a minimum amount of grit to provide a high coefficient of friction at the interface between the regulating wheel and the workpiece. As a result, the workpiece 24 is always rotated at the same surface velocity as the regulating wheel 26, which is chosen to be different from that of the grinding wheel to cause rubbing contact at the grinding interface. Since the workpiece and grinding wheel surfaces move in the same direction at their interface, the relative surface speed of their rubbing contact is equal to the difference between their peripheral surface speeds.

For the purpose of supporting the workpiece 24 when it is first inserted in the machine, as well as any other time when the regulating wheel 26 is retracted, a work support blade 25b is mounted rearwardly in the work rest blade 25. When the regulating wheel 26 is advanced into engagement with the workpiece 24, the wheel 26 lifts the workpiece off the rear blade 25b so that the workpiece is supported by its three points of contact with the grinding wheel 20, the work rest blade 25, and the regulating wheel 26.

To create abrasive grinding action at the work/wheel interface, the workpiece face is fed relatively into the grinding wheel by movement of either an X-axis slide XS which moves the work rest blade 25 along horizontal ways of the machine bed, or an R-axis slide RS which moves the regulating wheel 26 horizontally along the X-axis slide XS. Any appropriate controllable means may be employed to move the slides XS and RS left or right, including hydraulic cylinders or hydraulic rotary motors. As here shown, however, the slide XS mounts a nut 27 engaged with a lead screw 28 connected to be reversibly driven at controllable speeds by an X-axis feed motor XFM fixed on the bed. It may be assumed for purposes of discussion that the motor XFM moves the slide XS, and thus the work rest blade 25 and the regulating wheel 26, to the left or the right, according to the polarity of an energizing voltage $V_{xfm}$ applied to the motor, and at a rate proportional to the magnitude of such voltage. A position sensor in the form of a resolver 29 is coupled to the slide XS or the lead screw 28 to produce a signal XR which varies to represent the position of the X-axis slide as it moves back and forth.

The slide RS is similarly driven by a feed motor RFM carried on the slide XS. Thus, the slide RS mounts a nut 30 engaged with a lead screw 31 which is reversibly driven at controllable speeds by the motor RFM. Energization of the motor RFM moves the slide RS, and thus the regulating wheel 26, to the left or right, according to the polarity of an energizing voltage $V_{rfm}$ applied to the motor, and at a rate proportional to the magnitude of such voltage. A position sensor in the form of a resolver 32 is coupled to the slide RS or the lead screw 31 to produce a signal RR which varies to represent the position of the R-axis slide as it moves back and forth.

In the practice of the invention in certain of its embodiments, it is desirable (for a purpose to be explained) to sense and signal the power which is being applied for rotational drive of the grinding wheel 20, and also to sense and signal the rotational speed of the wheel. While power may be sensed and signaled in a variety of ways, FIG. 1 illustrates for purposes of power computation a torque transducer 35 associated with the shaft which couples the grinding wheel motor WM to the grinding wheel 20. The torque sensor 35 produces a dc. voltage $TOR_w$ which is proportional to the torque exerted in driving the grinding wheel to produce the rubbing contact described above at the interface of the wheel 20 and the workpiece 24. The motor WM is one which is controllable in speed, and while that motor may take a variety of forms such as a hydraulic motor, it is here assumed to be a dc. motor which operates at a rotational speed $\omega_w$ which is proportional to an applied energizing voltage $V_{wm}$. As a convenient but exemplary device for sensing and signaling the actual rotational speed of the wheel 20, a tachometer 36 is here shown as coupled to the shaft of the motor WM and producing a dc. voltage $\omega_w$ proportional to the rotational speed (e.g., in units of r.p.m.) of the grinding wheel.

A similar torque transducer 37 is associated with the shaft which couples the regulating wheel motor RM to the regulating wheel 26. The torque sensor 37 produces a dc. voltage $TOR_r$ which is proportional to the torque exerted in driving or braking (usually the latter) the regulating wheel to produce rubbing contact at the interface of the wheel 26 and the workpiece 24. The motor RM, like the grinding wheel motor WM, is one which is controllable in speed and is here assumed to be a dc. motor which operates at a rotational speed $\omega_r$ which is proportional to an applied energizing voltage $V_{rm}$. For sensing and signaling the actual rotational speed of the regulating wheel 26, a tachometer 38 is coupled to the shaft of the motor RM and producing a dc. voltage $\omega_r$ proportional to the rotational speed (e.g., in units of r.p.m.) of the regulating wheel.

Merely for simplicity in the description which ensues, it is assumed that the motor RM is a dc. motor which may act bi-directionally, i.e., either as a source which drives the wheel 26 in a counterclockwise direction or which affirmatively brakes the wheel 26 (when the latter is driven c.w. by the grinding wheel 20 in contact therewith) by torque acting in a c.c.w. direction. It is known in the motor art that a dc. motor may be controlled to act as a variable brake by regenerative action. Assuming that the regulating wheel 26 has been brought into peripheral contact with the workpiece 24, the motor RM may thus serve as a controllable brake producing a retarding effect proportional to an energizing voltage $V_{rm}$ applied thereto. If desired, one may view the motor as an electromagnetic brake creating a variable torque by which the rotational speed $\omega_r$ of the regulating wheel 26 is controlled by variation of the applied voltage $V_r$. In this fashion, the relative rubbing surface speed between the regulating wheel and the workpiece may be controlled by controlling the braking effort exerted by the motor RM through a shaft coupled to the wheel 26.

As grinding of the part 24 by the grinding wheel 20 proceeds, the wheel may not only become dull, but its face may also deteriorate from the desired shape. Accordingly, it has been the practice in the prior art to periodically "dress" the grinding wheel to restore sharpness and/or periodically "true" the grinding wheel face in order to restore its shape or geometric form to the desired shape. These related procedures of dressing and truing will here be generically called "conditioning" the wheel face.

The grinding machine of FIG. 1 includes a conditioning element or truing roll 50 having a face surface which conforms to the desired wheel face shape. Whenever truing or dressing is required or desired, the operative surface of the truing roll 50 may be relatively fed into relative rubbing contact with the wheel face in order to either wear away that wheel face so it is restored to the desired shape, or to affect the sharpness of the abrasive grits carried at the wheel face. Thus, FIG. 1 shows the truing roll 50 as being mounted for rotation about its axis 50a on a spindle carried by a truing roll slide TS which can be moved along an axis T passing through the center of the grinding wheel. The truing slide TS is slidable along vertical ways by a truing feed motor TFM mechanically coupled to a lead screw 54 engaged with a nut 55 in the slide TS. The motor TFM has its stator rigidly mounted on the machine bed so that as the lead screw 54 turns in one direction or the other, the slide TS is fed up or down relative to the rotational axis of the grinding wheel. The motor TFM is here assumed, for simplicity, to be a dc. motor which drives the lead screw in a direction which corresponds to, and at a speed which is proportional to, the polarity and magnitude of an energizing voltage $V_{tfm}$. In order that the position of the truing roll 50 may at all times be known, a resolver 53 is coupled to the lead screw 54 and produces a signal UR which varies with the physical position of the truing slide TS as the slide moves up or down.

The conditioning element 50 will usually take the form of a cylindrical roll having an operative surface which conforms to the desired shape of the wheel face. In order to produce the relative rubbing of the wheel 20 and truing roll 50, the latter is rotationally driven or braked at controllable speeds by a truing motor TM which is mounted upon, and moves with, the truing slide TS. As in the case of the motor RM, it is assumed that the motor TM is a dc. motor which may act bi-directionally, i.e., either as a source which drives the roll 50 in a clockwise direction or which affirmatively brakes the roll 50 (when the latter is driven c.w. by the wheel 20 in contact therewith) by torque acting in a c.c.w. direction. Assuming that the grinding wheel 20 has been brought into peripheral contact with the roll 50, the motor TM may thus serve as a controllable brake producing a retarding effect proportional to an energizing voltage $V_{tm}$ applied thereto. That is, the motor RM acts as an electromagnetic brake creating a variable torque by which the rotational speed $\omega_t$ of the truing roll 50 is controlled by variation of the applied voltage $V_{tm}$. In this fashion, the relative rubbing surface speed between the wheel face and the truing roll 50 may be controlled by controlling the braking effort exerted by the motor TM through a shaft coupled to the roll 50.

Also for a purpose which will become clear, it is desired to sense or control the power expended in either driving or braking the truing roll 50 by the action of the motor TM during the relative rubbing contact. While a variety of known power sensing devices may be utilized, the arrangement illustrated by way of example in FIG. 1 includes a torque transducer 57 associated with the shaft which couples the motor TM to the truing roll 50. That transducer produces a signal in the form of a dc. votage $TOR_t$ which is proportional to the torque transmitted (either by motoring or braking action, but usually the latter). Also, the rotational velocity of the truing roll 50 is desirably sensed and signaled for reasons to be made clear. For this purpose, a tachometer 58 is coupled to the roll 50 or to the shaft of the motor/brake TM, and it produces a dc. voltage $\omega_t$ which is proportional to the speed (expressible in r.p.m.) with which the roll 50 is turning at any instant.

In setting up a grinding system of the type illustrated in FIG. 1, the four slides XS and RS for the corresponding axes X and R have known reference positions fixed by reference limit switches XRLS and RRLS. When either of these slides is in a position where it engages its reference limit switch, the position of that slide on the component on which that slide is mounted (i.e., the machine bed in the case of slide XS and the slide XS in the case of slide RS) is a known value.

FIG. 1A is a generic block representation of a control system employed in certain embodiments of the invention to be described and which operates to carry out the inventive methods. In its most detailed form, the control system receives as inputs the signals XR, RR, UR, $TOR_w$, $TOR_t$, $TOR_r$, $\omega_w$, $\omega_t$ and $\omega_r$ produced as shown in FIG. 1, plus two gage signals E1 and E2 to be described below; and it provides as output signals the motor energizing signals $V_{wm}$, $V_{tm}$ and $V_{rm}$ which determine the respective rotational speeds of the grinding wheel 20, the truing roll 50 and the regulating wheel 26—as well as the signals $V_{xfm}$, $V_{tfm}$ and $V_{rfm}$ which determine the feed rates of the X-axis slide XS, the truing slide TS, and the regulating wheel slide RS. Yet, it will become apparent that not all the sensors, nor all the signals representing sensed physical variables, need be used in the practice of all embodiments of the invention. Several typical but different embodiments will be described in some detail, both as to apparatus and method, in the following portions of the present specification.

DEFINITIONS AND SYMBOLS

Regulating Wheel: A cylinder which is driven about its axis of rotation while its surface is maintained in frictional contact with the surface of a workpiece, while the workpiece is being ground, to control the rotational velocity of the workpiece. Ideally, the workpiece turns at exactly the same surface velocity as the regulating wheel so that no rubbing, and no material removal, occurs at the regulating wheel-workpiece interface; to this end, the regulating wheel is usually made with a relatively small amount of abrasive having a grain and grade specification different from that of the grinding wheel, and generally with a rubber bond. The grinding wheel is always driven at a surface velocity different from that of the regulating wheel so that rubbing action and consequent removal of material occurs at the grinding wheel-workpiece interface.

Work Rest Blade: A workpiece-supporting member, typically used in centerless grinding, to support the bottom of a workpiece positioned between a regulating wheel and a grinding wheel. The top surface of the blade, which is the surface that engages the workpiece, normally slopes upwardly toward the grinding wheel. The blade is usually at least as long as the workpiece so that the workpiece is supported along its full length.

Wheel Conditioning: The modification of the face of a grinding wheel (i) to affect its sharpness (making it either duller or sharper); or (ii) to affect its shape, essentialy to restore it to the desired shape; or (iii) to carry out both functions (i) and (ii).

Wheel Conditioning Element: Any member having an operative surface conforming to the desired shape of a grinding wheel to be conditioned, and which can be brought into contact with the face of the wheel to create both relative rubbing and feeding which causes material to be removed from the wheel (and in some cases undesirably causes material to be removed from the conditioning element). Throughout this specification the terms "truing" and "truing roll" will be used as synonymous with "conditioning" and "conditioning element" merely for convenience.

Relative Surface Speed: The relative surface velocity with which rubbing contact occurs at the interface of two surfaces, such as a grinding wheel and a workpiece. If a first surface is moving in one direction at 3000 feet per minute and a second surface is moving at 1000 feet per minute in the opposite direction, the relative surface speed is 4000 feet per minute. If the second surface is not moving, then the relative speed of rubbing is equal to the first surface speed. If the second surface is moving in the same direction as the first surface, the relative surface speed is the difference between the two surface velocities. If the two individual surface velocities are equal, the relative surface speed is zero, and there is no relative rubbing of the two surfaces, even though they are in contact. This latter situation is the ideal situation at the interface of a regulating wheel and a workpiece in centerless grinding.

Relative Feed: The relative bodily movement of two members, such as a grinding wheel and a workpiece, which causes progressive interference as the relative rubbing contact continues and by which material is progressively removed from one or both surfaces. It is of no consequence whether the first member is moved bodily with the second member stationary (although perhaps rotating about an axis) or vice versa, or if both members are moved bodily. Feeding is expressible in units of velocity, e.g., inches per minute.

Rate of Material Removal: This refers to the volume of material removed per unit time. It has dimensional units such as cubic centimeters per second or cubic inches per minute. In the present application alphabetical symbols with a prime symbol added designate first derivatives with respect to time, and thus the symbol W' represents volumetric rate of removal of material from a grinding wheel. In similar fashions, the symbol M' represents volumetric rate of removal of material from a part (workpiece), and the symbol $R'_p$ represents the rate of reduction of a part (workpiece) radius.

Specific Grinding Energy=SGE: The ratio of (i) energy consumed in removing workpiece material to (ii) the volume of such material removed. The same ratio is represented by the ratio of (i) power (energy per unit time) to (ii) rate of material removal (volume of material removed per unit time)—i.e., PWR/M'. Exemplary units: Horsepower per cubic inch per minute, or gram-centimeters per second per cubic centimeter per second.

Specific Truing Energy=STE: The ratio of (i) energy consumed in removing grinding wheel material to (ii) the volume of such material removed. The same ratio is represented by the ratio of (i) power expended (energy per unit time) to (ii) rate of material removal (volume of material removed per unit time)—i.e., PWR/W'. Exemplary units: Horsepower per cubic inch per minute, or gram-centimeters per second per cubic centimeter per second.

Systems for controlling SGE and/or STE in certain kinds of grinding operations are described in my U.S. Pat. No. 3,653,855 and my copending U.S. patent applications Ser. No. 249,192, filed Mar. 30, 1981 for "Grinding Control Methods and Apparatus"; Ser. No. 355,303, filed Mar. 5, 1982 for "Control System for Grinding Apparatus"; and Ser. No. 355,304, filed Mar. 5, 1982 for "Control System for Finish Grinding Methods and Apparatus".

From the introductory treatment of FIG. 1, it will also be apparent that the following symbols designate different physical variables as summarized below:

E=energy expended
$E_g$=energy expended for grinding action
$E_t$=energy expended for truing action
$F_g$=relative feed rate of workpiece and grinding wheel at grinding interface
$F_p$=feed rate (velocity) of workpiece
$F_t$=feed rate (velocity) of truing roll
$F_{ts}$=feed rate (velocity) of truing slide
$F_{xs}$=feed rate (velocity) of X-axis slide
FOR=the force, in a tangential direction, on a grinding wheel, a truing roll, or a workpiece due to rubbing action
G1,G2=signals from workpiece-sensing gages 60, 61
L=axial length of wheel face or region of grinding or truing contact M = volume of workpiece material removed by grinding M' = the volumetric rate of removal of material (metal) from the part being ground. Exemplary units: cubic inches per min.

PWR = power, i.e., energy expended per unit time $PWR_g$ = total power devoted to grinding action $PWR_r$ = power devoted by the regulating wheel motor to rotationally drive the regulating wheel $PWR_t$ = power devoted by the truing roll motor to drive or brake a truing roll to create, in part, rubbing contact with grinding wheel $PWR_t$ = total power devoted to truing action $PWR_w$ = power devoted by the grinding wheel motor to rotationally drive the grinding wheel $PWR_{wg}$ = that portion of PWRw devoted to grinding action $PWR_{wt}$ = that portion of PWRw devoted to truing action $R'_p$ = rate of radius reduction of workpiece $R_p$ = workpiece radius $R_t$ = radius of truing roll $R'_t$ = rate of radius reduction of truing roll $R_w$ = radius of grinding wheel $R'_w$ = rate of radius reduction of grinding wheel $R'_{wg}$ = rate of radius reduction of grinding wheel due to grinding $R'_{wt}$ = rate of radius reduction of grinding wheel due to truing $S_p$ = the surface speed of the workpiece $S_{rg}$ = the relative surface speed at the grinding interface $S_{rt}$ = the relative surface speed at the truing interface $S_w$ = the surface speed of the grinding wheel (typically in feet per minute)

$TOR_r$ = torque exerted to drive the regulating wheel $TOR_t$ = torque exerted to drive or brake the truing roll $TOR_w$ = torque exerted to drive the grinding wheel $TOR_{wg}$ = that portion of total wheel torque $TOR_w$ applied to rubbing action at the grinding interface, when truing and grinding are occurring simultaneously $TOR_{wt}$ = similar to $TOR_{wg}$, but that portion of $TOR_w$ applied to rubbing action at the truing interface W' = the volumetric rate of removal of material from the grinding wheel. Exemplary units: cubic inches per min.

$W_t$ = volume of grinding wheel material removed by truing $\omega_p$ = rotational speed of workpiece, i.e., the part to be ground (typically in units of r.p.m.)

$\omega_t$ = rotational speed of the truing roll $\omega_w$ = rotational speed of grinding wheel $\omega_r$ = rotational speed of regulating wheel NOTE: Any of the foregoing symbols with an added "d" subscript represents a "desired" or set point value for the corresponding variable; an added "o" subscript represents an "original" value; and an added "i" subscript represents an "instantaneous" value. For example, $w_d$ represents a commanded or set point value for the rotational speed of the wheel; $R_{po}$ represents an original workpiece radius; and $R_{wi}$ represents the instantaneous grinding wheel radius. Certain ones of the foregoing symbols will be explained more fully as the description proceeds.

DETAILED DESCRIPTION OF PREFERRED EMBODIMENT FOR CENTERLESS GRINDING OF SOLID WORKPIECES

With the grinding wheel 20 of FIG. 1 grinding on the workpiece or part 24, the wheel is driven by the motor WM and the workpiece 24 is braked by the regulating wheel 26 in order to create the relative rubbing contact of the grinding wheel face 20b and the workpiece surface 24b. The grinding wheel 20 and the regulating wheel 26 both rub against the workpiece 24 and tend to drive it clockwise, but the regulating wheel 26 is driven at a slower surface velocity than the grinding wheel 20. Consequently, the regulating wheel drive motor RM acts as a controllable regenerative brake whose current is fed back into its power source. The regulating wheel not only serves to brake the workpiece and thereby control its speed, but also serves as a continuous backup support or "steady rest" for the workpiece across the full length of the grinding wheel while the workpiece is being ground. The work rest blade 25 remains fixed during the grinding of any given workpiece, but the vertical position of the blade 25 can be adjusted prior to grinding so that the particular workpiece to be ground is located at the desired elevation relative to the axes of the regulating wheel and the grinding wheel. Also, different work rest blades can be used for different sets of workpieces.

In this particular embodiment, the grinding wheel 20 has a fixed axis of rotation, and the workpiece 24 is fed into the grinding wheel by advancing movement of the X-axis slide XS driven by the motor XFM at a feed rate $F_{xs}$ proportional to the voltage $V_{xfm}$. When this is occurring, the feed rate $F_{xs}$ of the X-axis slide is equal to the sum of the rates $D'_p$ and $R'_w$ at which the diameter of the workpiece 24 and the radius of the grinding wheel 20 are being reduced.

Figure 4:
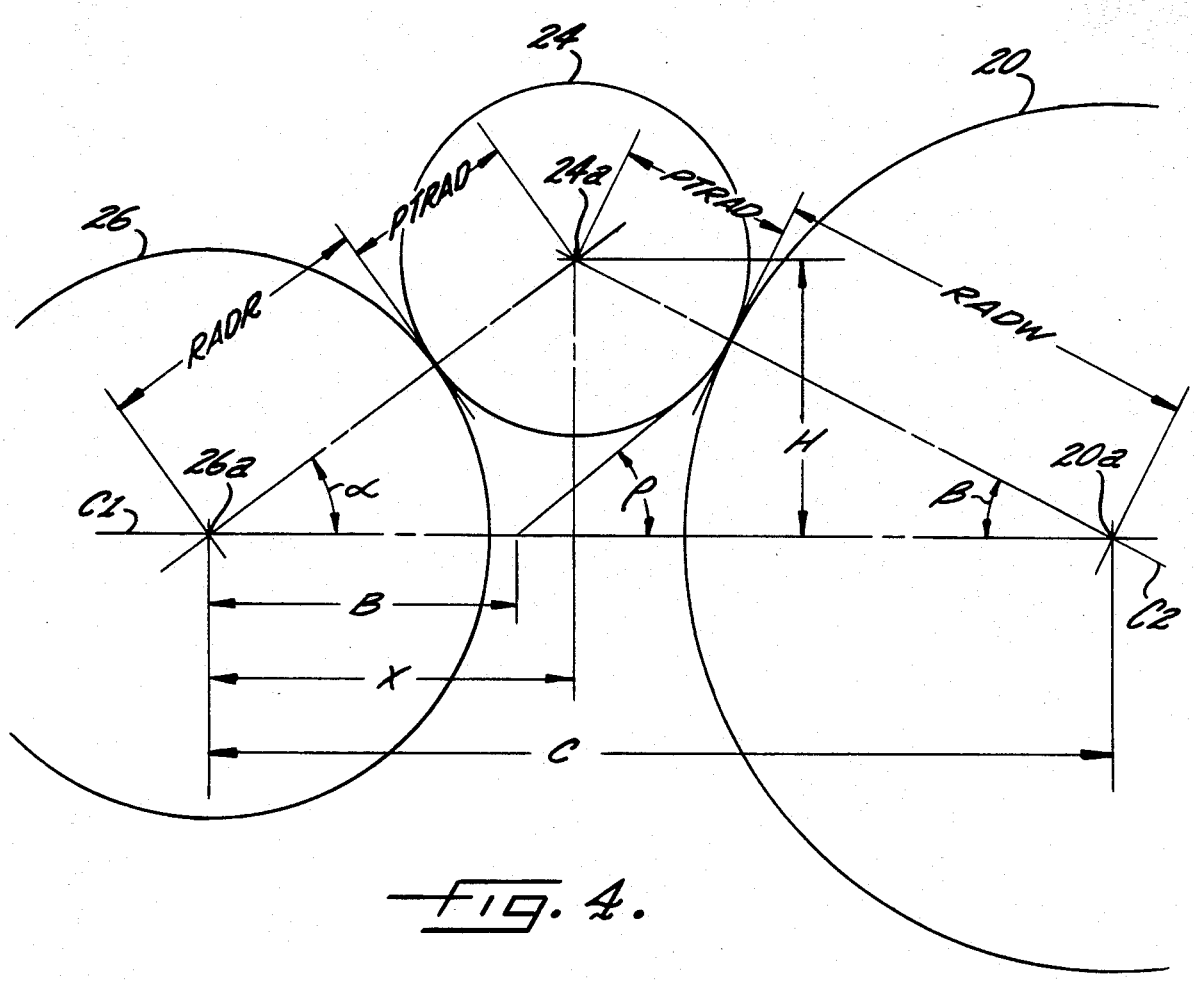
FIG. 4 is a schematic diagram of a portion of the grinding machine of FIG. 1.

It will be recalled that the regulating wheel slide RS is carried "piggyback" on the X-axis slide XS, as a result of which the distance between the regulating wheel axis 26b and the work rest blade 25 remains constant as the slide XS is advanced toward the grinding wheel. As the radii of the workpiece 24 and the grinding wheel 20 are reduced by the rubbing action at the grinding interface, the workpiece descends along the inclined top surface 25a of the work rest blade, as is typical of centerless grinding operations. The rotational axis of the workpiece 24 also gradually descends as grinding progresses, but it never drops below a centerline c1 (FIG. 4) connecting the axes 20a and 26a of the grinding wheel and the regulating wheel, respectively. Nor does the workpiece ever descend far enough to engage the rear support blade 25b.

The action which takes place at the rubbing interface between a grinding wheel and a workpiece is subject to many variables. The best indicator of the action at that interface, and of the "sharpness" of the wheel face, is the energy efficiency with which material is being removed from the workpiece. This is expressible as the ratio SGE, which is the amount of energy $E_g$ expended in removing a given volume M of workpiece material:

$$SGE = \frac{\text{Energy Expended}}{\text{Workpiece Volume Removed}} = \frac{E_g}{M} \quad (1)$$

The dimensional units of SGE are expressible, for example, as foot-pounds per cubic inch, watt-minutes per cubic centimeter, or horsepower-minutes per cubic inch.

If one divides the numerator and denominator in Equation (1) by the time span during which the volume M is removed, then SGE becomes the ratio of power applied in removing workpiece material to the volumetric rate of material removal. This is expressed:

$$SGE = \frac{PWR_g}{M'} \quad (2)$$

Consider that a grinding wheel 20 is rotationally driven in relative rubbing contact with, and with infeeding relative to, a workpiece 24 as shown in FIG. 1, and that certain physical variables are signaled as explained above with reference to FIG. 1. The power (rate of energy expended) in rotationally driving the wheel 20 is expressible:

$$PWR_w = 2\pi \cdot TOR_w \cdot \omega_w \quad (3)$$

Normally that power would be expressed in dimensional units of ft.-lbs./min. but it can easily be converted to other units such as horsepower.

Likewise, the power applied in braking the workpiece is the regulating wheel power, which is expressible:

$$PWR_r = 2\pi \cdot TOR_r \cdot \omega_r \quad (4)$$

The numerator of the SGE ratio, i.e., the total power $PWR_g$ applied to the rubbing contact at the interface between the wheel face 20b and the workpiece face 24b, thus becomes:

$$PWR_g = PWR_w - PWR_r = 2\pi[(TOR_w \cdot \omega_w) - (TOR_r \cdot \omega_r)] \quad (5)$$

Considering the denominator of the SGE ratio, i.e., the volumetric workpiece material removal rate M', it will be noted that the workpiece 24 is fed toward the grinding wheel 20 at a rate $F_{xs}$ (expressible, for example, in inches per minute). During this feeding movement, the wheel radius $R_w$ wears down at a rate $R'_w$ and the workpiece radius $R_p$ wears down at a rate $R'_p$. The volumetric material removal rate from the workpiece is determinable as:

$$M' = 2\pi \cdot L \cdot R_p \cdot R'_p \quad (6)$$

Using the above Equations (2), (5) and (6), if the value of M' is known, it can be determined what value of $PWR_g$ is required to keep the actual SGE ratio within a predetermined range or in agreement with a predetermined set point $SGE_d$. As explained previously, however, the instantaneous grinding rate $R'_p$ and workpiece radius $R_p$ are generally not known in a centerless grinding operation, and thus M' is not known.

In accordance with one aspect of the present invention, the values of $R_p$ and $R'_p$ are determined from the signals from a pair of workpiece-sensing means disposed on diametrically opposite sides of the workpiece. Thus, in the illustrative embodiment, a pair of position-measuring gages 60 and 61 are located adjacent the uppermost and lowermost surfaces, respectively, of the workpiece 24. The gage heads are biased toward each other so that they are always urged into engagement with the bottom and top surfaces, respectively, of the workpiece. As an alternative, non-contacting gage heads can be used; such gage heads are commercially available and normally use a double-acting air cylinder with a pneumatic servo-follower nozzle to maintain a constant air gap between the surface whose position is being measured (in this case, the workpiece surface) and the gage head. With either the contacting or non-contacting gage head, movement of the head is translated by an LVDT (linear variable differential transformer) and phase polarity discriminator into an electrical signal that is directly proportional to the extent of movement of the gage head. In the illustrative system of FIG. 1, the electrical signals produced by the two gages 60 and 61 have been designated G1 and G2, respectively.

Each time a new workpiece 24 is inserted into the illustrative centerless grinding system, the workpiece is positioned so that when the workpiece has been ground to the desired final diameter, the rotational axis of the workpiece will be in perfect vertical alignment with the centerlines of the two gages 60 and 61 so that the gages are sensing opposite ends of a diameter of the workpiece. The horizontal position of the workpiece axis relative to the gages 60 and 61 moves slightly away from the grinding wheel during grinding, due to the reducing radii of the workpiece 24 and (to a lesser extent) the grinding wheel 20 combined with advancing movement of the X-axis slide XS which carries both the regulating wheel 26 and the work rest blade 25. Consequently, there may be a slight difference between the actual workpiece diameter and the diameter represented by the gage signals G1 and G2 during the initial grinding of a new workpiece, but that differential or gage error diminishes as grinding progresses, and is reduced to zero when the workpiece reaches the desired final radius where gage accuracy is most critical. To ensure precise gage readings at the desired final radius, the gages 60 and 61 may be periodically referenced to a master workpiece of exactly the desired final diameter and surface finish.

If desired, the tips of the gages 60 and 61 can be equipped with small flat horizontal plates which are parallel to each other, assuring that the gages are always sensing the uppermost and lowermost surfaces of the workpiece even though the workpiece shifts slightly in the horizontal direction during grinding. The user of such plates also ensures that the gages are sensing the true diameter of the workpiece throughout the grinding thereof.

As can be seen in FIGS. 2 and 3, the lower gage 60 is mounted in the top surface of the slide XS between the blades 25 and 25b. The upper gage 61 is mounted on a plate 62 which extends parallel to the work rest blade 25, with the two ends of the plate 62 being attached to opposite sides of the slide XS via mounting frames 63 and 64. These frames 63 and 64 define openings which are large enough to permit workpieces to be inserted axially through the frames onto the top surfaces of the blades 25 and 25b. With this mounting arrangement, both gages 60 and 61 are carried by the same portion of the slide XS, so that any thermal expansion or contraction within the grinding machine tends to affect the two gages equally.

To permit adjustment of the vertical position of the gage 60 for different workpiece sizes, the gate 60 is mounted on a movable bracket 65. This bracket 65 is slidably mounted on a stationary bracket 66 fastened to the plate 62 and carrying an adjustment screw 67 for varying the vertical position of the bracket 65 and, therefore, the gage 60.

The magnitudes of the electrical output signals G1 and G2 from the gages 60 and 61 represent the displacements of the respective upper and lower surfaces of the workpiece from known reference positions along the common centerline through the two gages. If these reference positions are designated H1 and H2—relative to a common base line such as the top of the X-axis slide (see FIG. 2)—then the workpiece diameter $D_p = H2 - H1 - G1 - G2$. Thus, the two gages 60 and 61 form a diametral gage, and half of the diameter $D_p$ or any given instant is the workpiece radius $R_p$ at that instant.

The actual grind rate $R_p'$ in any time interval t is simply the change $R_p$ in the workpiece radius over that interval divided by $\Delta t$, or:

$$R_p' = (R_p/\Delta t) \qquad (7)$$

The change $R_p$ is the difference between the values of the workpiece radius at the beginning and the end of the selected time interval $\Delta t$.

The values of $R_p$ and $R_p'$ can be used in Equation (6) to compute the value of M', which in turn can be used in Equation (2) to control the value of SGE, which is the parameter of ultimate interest for controlling the grinding operation.

Controlling SGE in a centerless grinding operation, in accordance with the present invention, offers several significant advantages not heretofore available in centerless grinding. One such advantage is that the work rest blade can be positioned to maintain a relatively large distance between the center of the workpiece and a centerline connecting the centers of the grinding wheel and regulating wheel. That is, the workpiece can be made to "ride high" on the grinding wheel. This is desirable because in centerless grinding the rounding of the workpiece is generally accelerated as the axis of the workpiece is raised above the line of centers of the two wheels. As the workpiece axis is raised, however, grinding "chatter" also tends to increase because of the forces tending to lift the workpiece off the work rest blade. By controlling SGE, the latter forces are minimized because the grinding forces on the workpiece are minimized and controlled to be substantially constant at any given grinding power level. Thus, the workpiece can ride higher on the wheels without producing grinding chatter, thereby rounding the workpiece faster and increasing productivity.

Another significant advantage of SGE control in centerless grinding is that the need for diamond dressing of the grinding wheel is reduced or even eliminated. As the grinding wheel becomes dull in conventional centerless grinding, it tends to increase grinding chatter unless the grinding feed rate is reduced (reducing productivity). Sharpening the grinding wheel by dressing it in a centerless grinder requires the grinding operation to be shut down (again reducing productivity). With SGE control, however, the sharpness of the grinding wheel is maintained relatively constant; the need for diamond dressing of the wheel is minimized or even eliminated; there is no need to shut down the grinding operation to dress the wheel; and grinding feed rates need not be reduced to avoid grinding chatter.

A further advantage of SGE control in centerless grinding is a reduction in the amount of heat produced in the grinding operation, thereby minimizing the danger of metallurgical injury to the ground surface due to overheating. Because SGE control maintains relatively constant grinding conditions, including wheel sharpness, and at a relatively low power level, the heat produced is both small and constant. Consequently, the risk of workpiece "burn" is minimized, and operator skill and attention requirements are reduced. This results in both increased productivity and lower costs.

There are various ways to automatically control SGE in a centerless grinding operation, using the workpiece radius $R_p$ and grinding rate $R_p'$ values. One particularly preferred technique conjointly controls the relative surface speed of rubbing contact between the workpiece and the grinding wheel, and the relative infeed rate of the workpiece and the grinding wheel. For example, the values of $R_p$ and $R'_p$ may be used to control the X-axis feed rate $F_{xs}$ to maintain the actual grind rate $R'_p$ at a set point value. With $R'_p$ held constant in this manner, M' is directly proportional to $R_p$, which changes at the known rate $R'_p$. Thus, the denominator M' of the SGE ratio is known at all times, which means that the desired value of the numerator $PWR_g$ is also known for any set point value of SGE. Consequently, SGE can be held at the set point value by controlling one or more of the components of $PWR_g$, per Equation (5), to hold $PWR_g$ at the desired value.

If the workpiece radius $R_p$ does not change by a significant percentage in a given grinding operation (e.g., a workpiece ground from an initial radius of 4.00 inches to a final radius of 3.96 inches), the change in $R_p$ can be ignored. Thus, the SGE denominator M' can be expressed as:

$$M' = k\,R'_p$$

where k is a factor of proportionality equal to $2\pi L$ times the initial workpiece radius $R_p$.

Although there are various techniques for controlling $PWR_g$ (see my U.S. Pat. No. 3,653,855), one technique begins by controlling the grinding wheel workpiece speed to maintain $\omega_w$ in close agreement with a preselected but adjustable set point value. Then as the grinding wheel dulls, the torque $TOR_w$ will increase because the feed rate $F_{xs}$ remains constant but the wheel grits do not act as efficiently in abrading material from the workpiece 24. In other words, a duller wheel requires greater torque from the motor WM to maintain a constant grind rate—so consumed grinding power $PWR_g$ rises. This, in turn, makes SGE increases.

The control system senses this increase in $TOR_w$ (and SGE) and responds by decreasing the voltage $V_{wm}$ to the grinding wheel drive motor WM. This decreases the speed $\omega_w$ of the grinding wheel 20, which reduces the relative surface speed $S_{rg}$ at the grinding interface because:

$$S_{rg} = S_w - S_p \qquad (8)$$

where $S_w$ is the surface speed of the grinding wheel, and $S_p$ is the surface speed of the workpiece. A reduction in $S_{rg}$ increases grit and bond fracturing at the grinding wheel/workpiece interface so the wheel re-sharpens automatically—and this reverses the changes described above until SGE is restored to substantial equality with the set point value. The self-correcting action will be almost imperceptible to the human eye, but if the set point is changed to a different value, corrective adjustment of $\omega_w$ will take place to make the actual SGE agree with the new set point.

As an alternative to the control system just described, the grinding wheel speed may be held constant while the changes in the torque $TOR_w$ are used to adjust the feed rate $F_{xs}$. That is, changes in $TOR_w$ can be used to adjust the voltage $V_{wfm}$ to the X-axis slide feed motor XFM to produce the desired corrective action on the face of the grinding wheel. More specifically, increasing the feed rate $F_{xs}$ will increase grit and bond fracturing at the grinding interface to re-sharpen the grinding wheel automatically, thereby maintaining the actual SGE at the desired set point value.

During rough grinding of a workpiece, maximum productivity is achieved by a control system of the type outlined above, i.e., with a constant SGE at an optimum level. During finish grinding, however, the criteria change because grinding must be stopped at a desired final dimension, and the grinding conditions are preferably altered as that final dimension is approached, to produce a desired final surface finish.

In the preferred embodiment of the centerless grinding system of the present invention, finish grinding is preferably controlled in a manner similar to that described in the assignee's copending U.S. patent application Ser. No. 355,304, filed Mar. 5, 1982, for "Control Systems for Finish Grinding Methods and Apparatus". In that system the actual radius of the workpiece is monitored as the finish grinding progresses; the grinding wheel and the workpiece are infed at a rate which decreases as an exponential function of the remaining distance between the wheel face and the desired final radius of the workpiece; and the infeeding is terminated at the desired final radius of the workpiece. The grinding wheel is also trued, simultaneously with the finish grinding, by feeding a truing element into the grinding wheel at a rate that varies as a function of the decreasing infeed rate of the grinding wheel and the workpiece. As described in the aforementioned co-pending application, simultaneous truing is particularly desirable during finish grinding to control the shape of the grinding wheel and thereby control the final shape of the ground article, and to control the surface finish of the ground article.

In practicing simultaneous truing during finish grinding, the truing element is advanced toward the grinding wheel at a rate which has (1) a first component corresponding to the rate at which it is desired to remove material from the grinding wheel at the truing interface and (2) a second component corresponding to the wear rate of the grinding wheel due to grinding, the second component varying as a function of the infeed rate of the grinding wheel and the workpiece. The grinding wheel and the workpiece are infed at a rate which has (1) a first component corresponding to the desired decreasing infeed rate of the grinding wheel and the workpiece and (2) a second component corresponding the rate at which material is removed from the grinding wheel at the truing interface. The wear rate of the grinding wheel due to grinding is determined from a power function relationship between the wheel wear rate and the grinding infeed rate for a particular grinding operation, i.e., a particular grinding wheel, workpiece material, relative surface velocity at the grinding interface, and other specified conditions affecting the rate of wheel wear due to grinding. Finally, the ratio STE is controllably changed during the finish grinding so that the desired surface finish is achieved on the final ground part.

The primary operator-selected set points in the finish grinding operation are:

(1) the gain factor which determines the rate of deceleration of the grinding feed rate $F_g$, (2) the desired truing rate $R'_{wtd}$, i.e., the rate at which material is to be removed from the grinding wheel during the simultaneous truing and grinding, (3) the desired relative surface velocity $S_{rt}$ at the truing interface, to provide the desired degree of control of STE, (4) the desired grinding wheel speed $\omega_{wd}$, and (5) the desired workpiece speed $\omega_{pd}$, which is the same as the regulating wheel speed $\omega_{rd}$.

Controlled parameters include (4) and (5) above plus the X-axis feed rate $F_{xs}$, the truing slide feed rate $F_{ts}$, and the truing roll speed $\omega_t$, the set points for which are computed from the five operator-selected set points. The control of these latter three parameters is particularly important because they are the principal means of achieving the desired grinding feed deceleration rate, the desired truing rate $R'_{wt}$, and the desired relative surface velocity $S_{rt}$ at the truing interface.

The set points for the two servo-controlled slide feed rates $F_{xs}$ and $F_{ts}$ must be changed frequently to maintain the desired decelerating grinding rate and truing rate, but in order to compute these set points the wheel wear rate $R'_{wg}$ at the grinding interface must first be determined. From the commanded grinding feed rate $F_g$ at any given instant and predetermined values of a coefficient k and an exponent b, the wheel wear rate $R'_{wg}$ at the grinding interface can be computed from the equation:

$$R'_{wg} = \text{antilog}\,[k + (b \log F_g)] \quad (9)$$

The derivation of this Equation (9) is described in detail in the aforementioned copending application Ser. No. 355,304. The starting point is the basic equation defining the power function relationship between wheel wear rate $R'_{wg}$ and the grinding feed rate $F_g$ at the grinding interface in a simultaneous truing and grinding operation, which is:

$$R'_{wg} = kF_g^b \quad (10)$$

The truing slide must be advanced at a rate $F_{ts}$ that is equal to the sum of not only the two radius reductions $R'_t$ and $R'_{wt}$ taking place at the truing interface, but also the reduction $R'_{wg}$ in the radius of the grinding wheel effected at the grinding interface. That is:

$$F_{ts} = R'_t + R'_{wt} + R'_{wg} \quad (11)$$

The effective feed rate $F_t$ of the truing roll face at the truing interface, however, is equal to the sum of only the two radius reductions taking place at the truing interface. Thus:

$$F_t = R'_t + R'_{wt} \quad (12)$$

Similarly, at the grinding interface the grinding feed rate $F_g$ is not the same as the total workpiece feed rate $F_p$. The workpiece must be advanced at a rate $F_p$ that is equal to the sum of not only the two radius reductions taking place at the grinding interface, but also the reduction in the radius of the grinding wheel effected at the truing interface. That is:

$$F_p = R'_p + R'_{wg} + R'_{wt} \quad (13)$$

The effective grinding feed rate $F_g$, however, is equal to the sum of only the two radius reductions taking place at the grinding interface. Thus:

$$F_g = R'_p + R'_{wg} \quad (14)$$

If the grinding feed rate $F_g$ is known, the value of $R'_{wg}$ can be computed from Equation (9). The set point for the truing slide feed rate $F_{ts}$ can then be computed using Equation (11), because $R'_{wt}$ has a set point value and $R'_t$ is either known or, more commonly, assumed to be zero because the truing roll wears so slowly.

The desired value for the workpiece feed rate $F_p$ is the grinding feed rate $F_g$ plus the truing rate $R'_{wt}$ or:

$$F_p = F_g + R'_{wt} \quad (15)$$

per Equations (13) and (14) above. Both $F_g$ and $R'_{wt}$ have set point values, so the desired value of $F_p$ is simply the sum of those two set point values. It is this value of $F_p$ which determines the set point for the feed rate $F_{xs}$ of the X-axis slide during finish grinding with simultaneous truing. Although the actual workpiece feed rate $F_p$ will differ slightly from the X-axis slide feed rate $F_{xs}$, due to wheel wear and the gradual descent of the workpiece into the narrowing region between the regulating and grinding wheels, the difference between the two feed rates $F_p$ and $F_{xs}$ is extremely small; and, it is the gage, not the feed rate, that determines when the desired final workpiece radius has been reached. Thus, the slight differential between $F_p$ and $F_{xs}$ does not affect the accuracy of the control system.

Turning next to the truing operation which is carried out simultaneously with finish grinding, the removal of material at the truing interface is controlled according to the ratio defined as "STE"—Specific Truing Energy. As mentioned previously, STE is a measure of the energy efficiency with which material is removed from the grinding wheel at the truing interface, and is expressible as a ratio of an amount of energy $E_t$ expended in removing a given volume $W_t$ of wheel material at the truing interface:

$$STE = \frac{\text{Energy Expended}}{\text{Wheel Volume Removed}} = \frac{E_t}{W_t} \quad (16)$$

If one divides the numerator and denominator in Equation (16) by the time span during which the volume $W_t$ is removed, then STE becomes the ratio of power applied in removing wheel material to the volumetric rate of material removal. This is expressed:

$$STE = \frac{PWR_t}{W'_t} \quad (17)$$

For simultaneous truing and grinding, the above equation becomes:

$$STE = \frac{PWR_{wt} - PWR_t}{2\pi(L)(R_w)(R'_{wt})} \quad (18)$$

By maintaining STE within a predetermined range or at a predetermined value, the wheel face can be kept in a desired shape and at a desired degree of sharpness (or dullness), so that the consequences of the wheel face condition on the workpiece can be controlled with quantitative predictability. In order to maintain the requisite degree of control over the grinding conditions, the control system continuously monitors the actual STE and automatically varies the truing roll speed $\omega_t$ in response to any deviations of the actual STE from the set point value $STE_d$. If the actual STE rises above the set point value $STE_d$, the motor voltage $V_{tm}$ is increased, causing the braking torque applied to the truing roll 50 by the motor TM to decrease and thereby increasing the truing roll speed $\omega_t$. The increase in the truing roll speed $\omega_t$ decreases the relative surface speed $S_{rt}$ at the truing interface so that the grinding wheel becomes sharper, resulting in a reduction in the torque $TOR_t$. This reverses the changes described above until the actual STE is restored to substantial equality with the set point $STE_d$. That is, the reduction in $TOR_t$ reduces the actual STE, which in turn causes the voltage $V_{tm}$ to be reduced so that the truing roll speed $\omega_t$ is returned to its original level. The incremental increases in $V_{tm}$ are preferably integrated over successive cycles of this corrective action so that $V_{tm}$ is held at a nearly constant value. The self-correcting action of this servo loop will be almost imperceptible to the human eye after the actual STE and the set point $STE_d$ have initially become equal.

By controlling the STE in this manner, both the geometry and the sharpness of the grinding wheel can be accurately controlled.

The starting point for ascertaining the actual value STE is the basic STE equation:

$$STE = \frac{PWR_t}{W'_t} = \frac{PWR_{wt} - PWR_t}{2\pi(L)(R_w)(R'_{wt})} \quad (19, 20)$$

It is possible to determine the total power $PWR_w$ applied to the grinding wheel 20 by the motor WM according to the equation:

$$PWR_w = 2\pi(TOR_w)(\omega_w) \quad (21)$$

However, a portion $PWR_{wg}$ of the total wheel driving power $PWR_w$ is taken up at the grinding interface between the grinding wheel and the workpiece and another portion $PWR_{wt}$ is expended at the truing interface between the grinding wheel and the truing roll. The latter portion $PWR_{wt}$ of the total wheel power can be expressed as:

$$PWR_{wt} = 2\pi(TOR_{wt})(\omega_w) \quad (22)$$

Similarly, the power $PWR_t$ devoted by the motor TM to brake the truing roll can be expressed as $$PWR_t = 2\pi(TOR_t)(\omega_t) \quad (23)$$

One may note that at the truing interface the tangential force $FOR_1$ which is transferred from the wheel face to the truing roll face is equal and opposite (absent acceleration effects) to the tangential force $FOR_2$ which, in effect, is applied to the truing roll by the motor TM acting as a brake. And, the torques $TOR_{wt}$ and $TOR_t$ in the above equations can be defined as:

$$TOR_{wt} = (FOR_1) R_w \tag{24}$$

$$TOR_t = (FOR_2) R_t \tag{25}$$

Since $FOR_1 = FOR_2$, $$TOR_{wt} = (TOR_t)\left(\frac{R_w}{R_t}\right) \tag{26}$$

The value of $TOR_{wt}$ can be computed from this last equation because the value of $TOR_t$ is signalled by the transducer 57; the value of the wheel radius $R_w$ is the initial wheel radius $R_{wo}$ minus the amounts removed by grinding and truing, which for simultaneous truing and grinding is the same as the distance advanced by the truing slide after making contact with the grinding wheel, so:

$$R_w = R_{wo} - (F_{ts})(\Delta T) \tag{27}$$

and the value of the truing roll radius $R_t$ can be assumed to remain constant at its initial value $R_{to}$. Thus, the total power $PWR_{wt}$ applied by the motor WM via the grinding wheel into the truing interface may be written:

$$PWR_{wt} = 2\pi(TOR_{wt})(\omega_w) \tag{28}$$

and by substitution from Equation (26):

$$PWR_{wt} = 2\pi(TOR_t)(R_w/R_t)(\omega_w) \tag{29}$$

The power expended as work and friction-generated heat due to the rubbing contact at the truing interface is the input power less that removed to the motor TM acting as a brake. The motor TM acts as a brake because its torque is in a direction opposite to its rotation. Thus, the power $PWR_t$ (producing work to remove material and heat at the truing interface) is found by taking the $PWR_w$ sign as + and the $PWR_t$ sign as −:

$$PWR_t = PWR_{wt} - PWR_t = 2\pi[(TOR_{wt})(\omega_w) - (TOR_t)(\omega_t)] \tag{30}$$

Substituting from Equation (26), Equation (30) becomes:

$$PWR_t = 2\pi TOR_t\left[\left(\omega_w \frac{R_w}{R_t}\right) - \omega_t\right] \tag{31}$$

Thus, the STE equation becomes:

$$STE = \frac{PWR_t}{W'_t} = \frac{PWR_{wt} - PWR_t}{W'_t} \tag{32}$$

$$= \frac{2\pi(TOR_{wt})(\omega_w) - 2\pi(TOR_t)(\omega_t)}{2(L)(R_w)(R'_{wt})} \tag{33}$$

$$= \frac{(TOR_t)\left(\frac{R_w}{R_t}\right)(\omega_w) - (TOR_t)(\omega_t)}{L(R_w)(R'_{wt})} \tag{34}$$

$$= \frac{(TOR_t)\left(\frac{R_w}{R_t}\right)(\omega_w) - (\omega_t)}{L(R_w)(R'_{wt})} \tag{35}$$

All the factors in the above equation are known from transducer signals or previously described measurements or computations except the wheel length L, which is a known constant for any grinding wheel; the wheel radius $R_w$, which can be computed for any given instant by subtracting the total wheel wear up to that instant from the starting radius $R_{wo}$; and the wheel wear rate $R'_{wt}$ at the truing interface.

Total wheel wear $\Delta R_w$ over any given time T can be defined as:

$$\Delta R_w = T(R'_{wg} + R'_{wt}) \tag{36}$$

so $R_{wi}$ at any instant is:

$$R_{wi} = R_{wo} - T_i(R'_{wg} + R'_{wt}) \tag{37}$$

The wheel wear rate $R'_{wt}$ at the truing interface normally has a set point value, or it can be computed as the difference between the truing slide feed rate $F_{ts}$ and the wheel wear rate $R'_{wg}$ at the grinding interface:

$$R'_{wt} = F_{ts} - R'_{wg} \tag{38}$$

The wheel wear rate $R'_{wg}$ can be computed using Equation (9).

Thus, the actual value of STE can be iteratively computed during the grinding operation and compared with the set point $STE_d$ to determine what, if any, adjustment of the truing roll speed $\omega_t$ is needed to keep the actual STE at the set point $STE_d$.

As an alternative to the control system described above, the truing roll speed $\omega_t$ may be maintained constant at a set point value and the STE error used to correctively energize the motor TFM to adjust the truing slide feed rate $F_{ts}$ rather than $\omega_t$. Or, the truing slide feed rate $F_{ts}$ may be adjusted only in the event that the STE error becomes excessively negative, indicating that STE has fallen to an extent that changes in $\omega_t$ will not restore STE to agreement with the set point $STE_d$. Adjusting $F_{ts}$ rather than $\omega_t$ offers the advantage that as an incident to keeping STE at the set point $STE_d$, the truing roll will always be infed sufficiently fast to maintain rubbing contact with the wheel face regardless of the wheel radius reduction rate caused by the grinding action.

It will be recalled that the SGE ratio for grinding action at the work interface is the ratio of (i) power $PWR_g$ applied to such action, to (ii) the volumetric rate M′ of material removal from the workpiece 24. This is expressed:

$$SGE = PWR_g/M' \tag{39}$$

During simultaneous truing and grinding, the power $PWR_g$ devoted to the grinding action (for the reasons explained above) is the algebraic sum of (i) the $PWR_r$ applied to rotationally brake the regulating wheel 26 and (ii) some portion $PWR_{wg}$ of the $PWR_w$ applied to the rotational drive of the grinding wheel. That is, the aggregate wheel power $PWR_w$ may be determined according to Equation (3) using the signals $TOR_w$ and $\omega_w$ from the transducer 35 and the tachometer 36 (FIG. 1); but the proportion of that aggregate power which goes into the grinding interface is not directly computable from the torque transducer signals. One may note, however, that at the grinding interface the tangential force $FOR_3$ which is applied from the wheel face to the workpiece 24 is equal and opposite to the tangential force $FOR_4$ which, in effect, is applied to the wheel by the workpiece 24 (absent acceleration effects). Since the torque $TOR_r$ is signaled by the transducer 37, $R_p$ is ascertainable from the gage reading, and $R_w$ is ascertainable from Equation (27), it is possible to compute the torque $TOR_{wg}$ which is applied by the wheel motor WM at the grinding interface (and which is only a part of the torque $TOR_w$). Thus, it may be written:

$$FOR_3 = FOR_4 \qquad (40)$$

$$FOR_3 \cdot R_w = TOR_{wg} \qquad (41)$$

$$FOR_4 \cdot R_p = TOR_r \qquad (42)$$

$$TOR_{wg} = TOR_r \cdot \frac{R_w}{R_p} \qquad (43)$$

Now, the grinding power $PWR_{wg}$ applied via the grinding wheel 20 into the grinding interface may be written:

$$PWR_{wg} = 2\pi \cdot TOR_{wg} \cdot \omega_w \qquad (44)$$

$$= 2\pi \cdot TOR_r \cdot \frac{R_w}{R_p} \cdot \omega_w \qquad (45)$$

Because the motor RM brakes the workpiece, the total power consumed at the grinding interface (to produce work which removes workpiece and wheel material and to create heat due to friction) is found by taking the $PWR_{wg}$ sign as + and the $PWR_r$ sign as −:

$$PWR_g = PWR_{wg} - PWR_r \qquad (46)$$

$$= \left(2\pi \cdot TOR_r \cdot \frac{R_w}{R_p} \cdot \omega_w\right) - (2\pi \cdot TOR_r \cdot \omega_r) \qquad (47)$$

$$= 2\pi \cdot TOR_r \left[\left(\frac{R_w}{R_p} \cdot \omega_w\right) - \omega_r\right] \qquad (48)$$

And by substitution of Equations (48) and (6) into Equation (2), SGE during simultaneous truing and centerless grinding is expressed:

$$SGE = \frac{PWR_g}{M'} = \frac{TOR_r\left[\left(\omega_w \cdot \frac{R_w}{R_p}\right) + \omega_r\right]}{L \cdot R_p \cdot R'_p} \qquad (49)$$

Although SGE is not controlled during the simultaneous-truing-and-grinding stage of the exemplary control system to be described in more detail below, the SGE Equation (49) is presented here to show that such SGE control could be provided if desired. This equation can be used to control SGE indirectly during simultaneous truing and grinding by controlling the parameters of the wheel conditioning action taking place at the truing interface, rather than controlling the relative surface speed and/or the relative infeed rate at the grinding interface. For example, a departure of SGE from its set point value can be corrected by adjusting the truing roll speed $\omega_t$ to change the relative rubbing surface speed $S_{rt}$ at the truing interface. If the grinding wheel dulls, for instance, the resulting increase in SGE can be corrected by increasing the drive voltage $V_{tm}$ to the truing roll drive motor TM to increase the truing roll speed $\omega_t$. This reduces the relative speed $S_{rt}$ at the truing interface, which in turn increases grit and bond fracturing at the truing interface to re-sharpen the wheel. The re-sharpening of the wheel causes the changes just described to reverse themselves, restoring SGE to its set point value.

During finish grinding of a workpiece, it is often desirable to change the surface condition of the grinding wheel to produce a desired surface finish on the workpiece as it approaches the desired final ground dimension. As described in my copending U.S. patent application Ser. No. 355,304, filed Mar. 5, 1982 and entitled "Control System for Finish Grinding Methods and Apparatus", the desired change in the surface condition of the grinding wheel can be achieved by controllably altering (1) the relative surface speed of the rubbing contact at the truing interface and/or the relative infeeding rate at the truing interface. For example, the grinding wheel can be dulled, to produce a smoother surface finish on the workpiece at the end of finish grinding by increasing the relative surface speed $S_{rt}$ at the truing interface. This relative surface speed $S_{rt}$ is equal to the algebraic sum of the individual surface speeds $S_w$ and $S_t$, or:

$$S_{rt} = S_w - S_t \qquad (50)$$

$$= (Tor_w \cdot \omega_w) - (TOR_t \cdot \omega_t) \qquad (51)$$

Consequently, it can be seen that adjustment of any of the parameters $TOR_w$, $\omega_w$, $TOR_t$ and $\omega_t$ will effect a change in $S_{rt}$.

The preferred means for controlling the grinding apparatus of FIG. 1, using the control methods described above, is a software-programmed digital minicomputer or microcomputer illustrated in FIG. 5, although it could, if desired, be implemented in an analog computer using d-c. voltages to indicate signal values, or as a hard-wired iterative computer programmed by its wiring connections. The internal construction details of digital minicomputers are well known to those skilled in the art, and any of a wide variety of such computers currently available in the U.S. market may be chosen.

By way of background, and as is well known, the computer includes a clock oscillator 70 (FIG. 5) which supplies pulses at a relatively high and constant frequency to a timing signal divider 71 which in turn sends timing signals to the other computer components so that elementary steps of fetching signals from memory, performing arithmetic operations, and storing the results are carried out in rapid sequence according to a stored master program of instructions. For this purpose, the computer includes an arithmetic-logic unit (ALU) 72 served by an input trunk 73. An accumulator 75 receives the output from the ALU and transmits it over an output trunk 76. The output from the accumulator is sent back as an operand input to the ALU in certain arithmetic or comparing steps. These trunks are multi-conductor wires which carry multi-bit signals representing in binary or BCD format numerical values of variables which change as a result of inputs from a tape reader 77 or computations performed by the ALU 72. The tape reader 77 is coupled to the computer via a decoder 78 and an input/output interface 79.

The computer includes signal storage registers within a system storage or "memory" 80 which functionally is divided into sections containing instruction units 80a and data units 80b, as explained more fully below. The memory registers in the instruction section 80a are set by reading in and storage of a "master program" to contain multi-bit words of instruction which designate the operations to be performed in sequence, with logic branching and interrupts. The instruction memory contains the master program and sets up the gates and controls of the general purpose minicomputer to convert it into a special purpose digital control apparatus, the pertinent portion of that program being described hereinafter. Although a single minicomputer has been illustrated in FIG. 5 for carrying out all the functions needed to control the grinding machine of FIG. 1, it will be understood that these functions can be split among separate minicomputers arranged to share tasks by cross-talking through a common bus.

Since the organization and operation of the digital computer is well known, it will suffice to observe briefly that advancement of a program counter 81 to an address number will cause address selection and routing gates 82 to read the addressed memory instruction onto the input trunk 73 and into an instruction register 84. The operation code in the latter is decoded and sent to the ALU 72 to designate the operation to be performed next (e.g., add, subtract, complement, compare, etc.). It is herein assumed for ease of discussion that the ALU will algebraically add two operands unless instructed to subtract, multiply, divide, and so on. The data address in the instruction register is transferred to and conditions the storage address and routing gates 85 to fetch from memory the data word to be used next as an operand, the multi-bit signals being sent via the trunk 73 to the input of the ALU. At the conclusion of an arithmetic or logic sequence, the result or answer appears in the accumulator 75 and is routed via the trunk 76 through the gates 85 to an appropriate location or register in the memory 80. The gates 85 are controlled by the data address output of the instruction register, so that an answer is sent for storage to the proper memory location, replacing any numeric signals previously stored there.

FIG. 6 is an expanded diagrammatic illustration of the computer memory, with the pertinent storage registers or locations having acronym labels to make clear how certain signals are created and utilized. The program instruction section 80a contains a very large number of instruction words which are formulated to cause orderly sequencing through the master program, with branching and interrupts. To avoid a mass of detail and yet fully explain the invention to those skilled in the art, the pertinent program instructions are not labeled in FIG. 6 but are set out in flow charts to be described below.

As indicated in FIG. 6, the primary command signals in this particular example are labeled "XVC", "RVC", "UVC", "VWM", "VRM" and "VTM". These six digital signals are passed through respective digital-to-analog converters DAC to produce the six voltages $V_{xfm}$, $V_{rfm}$, $V_{tfm}$, $V_{wm}$, $V_{rm}$ and $V_{tm}$ which drive the respective motors XFM, RFM, TFM, PM, WM and TM in FIG. 1. Thus, the command signals XVC, RVC, UVC, VWM, VRM and VTM control the X-axis slide feed rate $F_{xs}$, the regulating wheel slide feed rate $F_{rs}$, the truing slide feed rate $F_{ts}$, the rotational velocity $\omega_w$ of the grinding wheel 20, the rotational velocity $\omega_r$ of the regulating wheel 26, and the rotational velocity $\omega_t$ of the truing roll 50.

FIG. 6 also shows that the transducer signals XR, RR, UR, $\omega_w$, $\omega_r$, $\omega_t$, TOR$_w$, TOR$_r$, TOR$_t$, G1 and G2 from FIG. 1 are brought into the storage section 80b from the resolvers 29, 32 and 53, the tachometers 36, 38 and 58, the transducers 35, 37 and 57, and the gages 60 and 61, respectively. These analog signals are passed through respective analog-to-digital converters ADC to produce corresponding digital signals labeled "XR", "RR", "VR", "WHV", "RGV", "TRV", "TORW", "TORR", "TORT", "GST" and "GSB" respectively. These signals are treated as if they came from storage units, and thus by appropriate instruction they can be retrieved and sent to the ALU 72.

The diagonal lines at the corners of certain rectangles in FIG. 6 are intended to indicate that the word stored and signaled in that register is a predetermined numerical constant. Of course, the stored number or constant is readily adjustable by reading into the register a different value via a manual data input keyboard or as a part of the master program. As in the case of the transducer signals, these predetermined constant but adjustable signals can also be retrieved and sent to the ALU 72 by appropriate instructions.

The storage section 80b in the memory diagram in FIG. 6 contains means for producing various signals which are utilized and changed periodically, to the end objective of energizing correctly the six motors XFM, RFM, TFM, WM, RM and TM. Such means include memory or storage units which are identified by acronyms which signify not only the storage units but also the signals produced thereby. The quantity represented by the changeable number in any register may be represented by the same acronym, and these numbers can be changed in value by programmed computations or transfers effected by the ALU under control of the stored master program. The acronyms are too numerous to permit all of them to be identified in FIG. 6, but a complete listing is as follows:

ANGL=a preselected constant, but adjustable, signal representing the angle between (1) a centerline passing through the centers of the regulating and grinding wheels and (2) a centerline passing through the centers of the grinding wheel and a master workpiece CORΔ=sum of PFACTOR, IFACTOR and DFACTOR, used to artificially adjust XAP to compensate for grinding wheel wear CV=preselected constant, but adjustable, signal representing value to be added to COR to derive the desired value of UFRA during advancement of the truing roll into engagement with the grinding wheel, and during retracting movement of truing roll DD=a preselected constant, but adjustable, signal representing a particular value of DTG at which a commanded event is to occur DFACTOR=derivative gain factor in PID servo loop controlling wheel slide motor WFM DTG=the difference between the current workpiece radius PTRAD and the desired final radius PTRADD FD=GR/DDI, a computed value used as the desired X-axis feed rate during the initial portion of finish grinding FGRFIN=preselected constant, but adjustable, signal representing the desired value of XFRA during a finish grinding mode FRT=preselected constant, but adjustable, signal representing the desired value of XFRA during return movement of the wheel to its "parked" position FSR=desired force to be exerted on workpiece by steady rests GAP=preselected constant, but adjustable, signal representing desired distance between truing roll face and grinding wheel face when truing roll is "following with a gap"

GD=preselected constant, but adjustable, signal representing derivative gain factor to be applied to RADERR in deriving DFACTOR GI=preselected constant, but adjustable, signal representing integral gain factor to be applied to RADERR in deriving IFACTOR GP=preselected constant, but adjustable, signal representing proportional gain factor to be applied to RADERR in deriving PFACTOR GPSR=preselected constant, but adjustable, signal representing gain factor to be applied to desired value of FSR in deriving desired value of PSR GPV=preselected constant, but adjustable, signal representing gain factor to be applied to PTVERR in deriving VPM GR=preselected constant, but adjustable, signal representing the desired rough grinding rate GRV=preselected constant, but adjustable, signal representing gain factor to be applied to RGVERR in deriving VRM GSB=signal from gage 50, proportional to current distance between bottom of workpiece and a fixed reference point GST=signal from gage 51, proportional to current distance between top of workpiece and a fixed reference point GT=preselected constant, but adjustable, signal representing gain factor to be applied to SURVERR in deriving VTM GT=preselected constant, but adjustable, signal representing gain factor to be applied to TRVERR in deriving VTM GU=preselected constant, but adjustable, signal representing gain factor to be applied to VERR in deriving UVC GVSR=preselected constant, but adjustable, signal representing gain factor to be applied to PSRERR in deriving VSR GW=preselected constant, but adjustable, signal representing gain factor to be applied to WHVERR in deriving VWM HSO=a preselected constant, but adjustable, signal representing the distance between two known reference points for the signals from two workpiece gages 50 and 51

IFACTOR=integral gain factor in PID servo loop controlling wheel slide motor WFM KNORAD=known radius of master part PFACTOR=proportional gain factor in PID servo loop controlling wheel slide motor WFM PSR=pressure supplied to steady rest cylinders to produce force FSR PSRERR=difference between actual and desired values of PSR PTDIA=workpiece diameter PTRAD=$R_p$=workpiece radius PTRADD=$R_{pd}$=desired final workpiece radius (after grinding)

PTRADI=a preselected constant, but adjustable, signal representing a workpiece radius gage signal value for a master workpiece of known radius PTV=actual rotational velocity of workpiece PTVD=desired rotational velocity of workpiece PTVERR=difference between PTV and PTVD PTWT=downward force exerted by a given workpiece on a given steady rest due to workpiece sag between its supporting spindles ΔR=the increment by which RCP is changed for each ΔT, i.e., the commanded R-axis slide feed rate in inches per ΔT RADERR=difference betwen actual workpiece radius PTRAD and actual X-axis slide position XAP RADR=$R_r$=radius of regulating wheel RADT=$R_t$=truing roll radius RADW=$R_w$=grinding wheel radius RADWI=starting value of actual workpiece radius RCEP=a commanded end position to which R-axis slide RS is to be moved RCP=commanded position of regulating wheel slide RS relative to X-axis slide RGV=actual rotational velocity of regulating wheel RGVD=desired rotational velocity of regulating wheel RGVERR=difference between RGV and RGVD RJOG=preselected constant, but adjustable, signal representing the desired value of RRFA during a "jogging" mode.

RR=resolver signal indicating actual position of R-axis slide RS

RRPR=a preselected constant, but adjustable, signal representing a "parked" position to which the R-axis slide RS is returned before the grinding of any new workpiece is started RSO=a preselected constant, but adjustable, signal representing distance between center x1 of work rest blade and rotational axis of regulating wheel when regulating wheel is in reference position (engaging RRLS)

RSUR1=a preselected constant, but adjustable, signal representing a first set point for RSURA RSUR2=preselected constant, but adjustable, signal representing a second set point for RSURA RSURV=$S_r$=actual relative surface velocity at truing interface RVC=drive signal for regulating wheel slide feed motor RFM SGED=desired value of the ratio SGE SGV=preselected constant, but adjustable, signal representing the desired value of UFRA during movement of truing slide to establish GAP SURVERR=difference between RSURA and either RSUR1 or RSUR2

ΔT=iteration interval for the iterative control system

TDIS=a preselected constant, but adjustable, signal representing the value of DTG at which it is desired to initiate simultaneous truing and grinding TORR=$TOR_r$=torque exerted to drive regulating wheel TORT=$TOR_t$=torque exerted to drive truing roll TORW=$TOR_w$=torque exerted to drive grinding wheel TRV=actual rotational velocity of truing roll ΔU=the commanded truing slide feed rate in inches per ΔT UAP=actual position of truing roll slide relative to rotational axis of grinding wheel UCEP=a commanded end position to which truing roll face is to be moved UCP=commanded position of truing roll slide relative to rotational axis of grinding wheel UERR = difference between UCP and UAP
UFRA = commanded truing slide feed rate in inches per minute
UR = resolver signal indicating actual position of truing slide
UVC = drive signal for truing roll slide feed motor TFM
VPM = drive signal for workpiece motor PM
VRM = drive signal for regulating wheel motor RM
VSR = drive signal for regulating pressure source producing PSR
VTM = drive signal for truing roll motor TM
VWM = drive signal for grinding wheel motor WM
VWMI = a preselected constant, but adjustable, signal representing a suitable idling speed for the grinding wheel drive motor WM when no grinding is taken place
WHV = actual rotational velocity of grinding wheel
WHVD = desired rotational velocity of grinding wheel
WHVERR = difference between WHV and WHVD
WWRG = $R'_{wg}$ = wheel wear rate due to grinding
WWRT = $R'_{wt}$ = wheel wear rate due to truing
$\Delta X$ = the increment by which XCP is changed for each $\Delta T$, i.e., the commanded X-axis slide feed rate in inches per $\Delta T$
XAP = actual position of X-axis slide relative to rotational axis of grinding wheel, sometimes artificially adjusted by a quantity COR to make distance from rotational axis of workpiece seem smaller than it actually is
$\Delta XAP$ = change in XAP in $\Delta T$
XCEP = a commanded end position to which X-axis slide XS is to be moved
XCP = commanded position of X-axis slide XS relative to rotational axis of grinding wheel
XERR = difference between XCP and XAP
XFRA = commanded X-axis slide feed rate in inches per minute
XJOG = preselected constant, but adjustable, signal representing the desired value of XFRA during a "jogging" mode
XP = the distance between the center x1 of the work rest blade and the rotational axis of the grinding wheel
XPRK = a preselected constant, but adjustable, signal representing a "parked" position to which the X-axis slide XS is returned before the grinding of any new workpiece is started
XR = resolver signal indicating actual position of X-axis slide XS
XSI = distance between the center x1 of the work rest blade and the grinding wheel face
XSO = a preselected constant, but adjustable, signal representing distance between rotational axis of grinding wheel and center x1 of work rest blade when work rest blade is in reference position (engaging XRLS)
XVC = drive signal for X-axis slide feed motor XFM
YP = a preselected constant, but adjustable, signal representing the distance between the center of a master workpiece and a centerline passing through the centers of the regulating and grinding wheels The foregoing acronyms will be used hereinafter with various subscripts, suffixes and prefixes which are conventional and have readily apparent meanings. For example, the subscript i signifies the instantaneous value in the current iteration interval $\Delta T$, the subscript (i−1) signifies the value in the preceding interval $\Delta T$, etc. The suffix "AVG" or "AV" added to any of the acronyms indicates an average value of that quantity, usually an average of ten values for the last ten iteration intervals $\Delta T$; the suffix "I" indicates an initial value of that particular quantity; and the suffix "D" indicates a desired value of that quantity. The prefix "$\Sigma$" added to any of the acronyms indicates a sum of several such values, usually the sum of the ten values measured or computed during the last ten iteration intervals $\Delta T$.

In carrying out this particular embodiment of the invention, the minicomputer system of FIG. 5 is conditioned by a master program to constitute a plurality of means for performing certain functions and to carry out the method steps which are involved. The minicomputer system is not the only apparatus involved, however, since the resolvers XR, RR, and TR, the tachometers WHV, RGV and TRV, the gages, the ADC converters, the DAC converters, and the drive motors RM, WM, TM, XFM, RFM, and TFM are all outside the computer system. With this in mind, a detailed understanding of this embodiment of the invention may best be gained from a narrative sequence of the operations which repeatedly recur, the pertinent subroutines of the master program thereby being explained in detail with reference to the flow charts in FIGS. 7–13.

FIG. 7 illustrates a main program which the computer system follows while being interrupted at successive intervals for executive of the subroutines illustrated in FIGs. 8–13. For example, the successive time periods $\Delta T$ measured off by the clock 70 and the timing signal generator 71 may be 40 milliseconds in duration. Within each such period, sub-periods are marked off by timing pulses so that a sub-routine may be executed during a fraction of every $\Delta T$, although there will almost always be time remaining at the end of each such sub-period during which the system returns to the main program and proceeds therethrough. Thus, each sub-routine is executed once during each of the main iteration periods $\Delta T$; e.g., every 40 ms. Computational step pulses typically appear every 20 microseconds, so that 2000 fetch, compute or store steps may be executed during each 40-ms interval. The various servo motors are preferably updated multiple times within each iteration interval $\Delta T$, in accordance with the "micromove-macromove" system described in U.S. Pat. No. 3,656,124. The particular time periods mentioned here are exemplary only, and these periods can be chosen to have other specific values.

Referring now to FIG. 7, there is shown a main program which the system follows whenever power to the grinding machine is turned on. The first step 001 clears all flags in the system, after which step 002 produces a prompting message instructing the operator to enter the desired predetermined values for the various set points and constants required in later steps. This prompting message is typically displayed on the CRT 86 (FIG. 5) located adjacent the manual data input keyboard 87. The particular values that must be entered by the operator are those values contained in the rectangles with the diagonal corner lines in the memory diagram of FIG. 6. These values may be manually keyed into the memory 80, or they may be previously recorded on a tape and entered via the tape reader 77.

At step 003, the system produces another prompting message which instructs the operator to load a workpiece of known radius and to key-in the value KNORAD of that known radius. This workpiece of known radius is normally a "master" part which has been previously ground to a smooth surface finish, and whose radius has been precisely measured with a micrometer. As will be seen from the ensuing description, the use of such a "master" part is desirable because it permits the gage signals to be converted to an actual workpiece radius with a high degree of precision.

At step 004, the system displays yet another prompting message which instructs the operator to "Perform Machine Reference", which the operator initiates by simply closing an "MREF" switch, which is one of the switches 87 indicated generally in FIG. 5 and typically located on the keyboard. This prompting message might be displayed before the operator has completed all the set-up steps indicated by the previous messages at steps 002 and 003, and thus the system sustains the message to "Perform Machine Reference" until step 005 senses the closing of the "MREF" switch. When this switch is closed, the system proceeds to step 006 and sets a "Mode 1" flag MD1 which enables the subroutines for the X and R axes to move their respective slides XS and RS at "jogging" rates XJOG and RJOG whenever the operator closes a corresponding switch. These switches are included in the bank of switches 87 (FIG. 5) located on the operator's keyboard and are typically labelled "Jog XFM", and "Jog RFM", respectively. The direction of movement of the slides XS, and RS in this mode depends upon whether the operator moves the corresponding "jog" switch to the "forward" position (producing a minus "jogging" signal which causes the slide XS or RS to move toward the grinding wheel) or to the "reverse" position (producing a plus "jogging" signal which causes the slide XS or RS to move away from the grinding wheel). Energization of the motors XFM and RFM to move the corresponding slides, when one or more of the "jog" switches are closed by the operator, is effected by the X-axis and R-axis subroutines of FIGS. 8 and 9, respectively.

The purpose of referencing the grinding machine, with the master workpiece of known radius KNORAD inserted therein, is to reference the system to the current actual sizes of the grinding wheel radius $R_w$ and regulating wheel radius $R_r$, and to re-reference the workpiece gage signals G1 and G2 with respect to the known radius KNORAD. Although the regulating wheel radius is usually reduced only when that wheel is dressed, and the grinding wheel radius is normally monitored by computations performed during each grinding operation, it is nevertheless desirable to periodically reference the entire grinding system to the current actual sizes of these wheels.

Known values which are used in conjunction with the known radius KNORAD of the master workpiece to reference the grinding system are (1) the horizontal distance XSO between the rotational axis of the grinding wheel and a point x1 midway between the blades 25, 25b when the X-axis slide XS is in engagement with a reference limit switch XRLS, (2) the horizontal distance RSO between the mid-point x1 and the rotational axis of the regulating wheel when the R-axis slide RS when the latter is in engagement with a reference limit switch RRLS, (3) the height YP of the center of the master workpiece above the centerline c1 passing through the centers of the regulating and grinding wheels, and (4) the angle ANGL between the wheel centerline c1 and a centerline c2 passing through the centers of the master workpiece and the grinding wheel. These values are all known for any given grinding machine, and are keyed-in constants stored in the system memory.

After the mode 1 flag MD1 has been set at step 006, the system proceeds to step 007 which displays another prompting message to the operator, this time instructing the operator to "jog XFM and RFM until XRLS and RRLS are closed." It will be recalled that XRLS and RRLS are the limit switches which establish the retracted reference positions of the X-axis and R-axis slides. In response to the prompting message at step 007, the operator proceeds to use the "jog" switches to retract the slides XS and RS until they close the limit switches XRLS and RRLS. The closing of these switches is sensed at steps 008 and 009 and advances the system to step 011 which displays a prompting message instructing the operator to "jog XFM until master part kisses grinding wheel." The operator thus proceeds to use the "Jog XFM" switch again, this time slowly advancing the X-axis slide until the master workpiece just lightly engages the grinding wheel. This is still part of mode 1, i.e., the flag MD1 is still on, and thus the subroutine of FIG. 7 still sets the commanded feed rate XFRA at the "jogging" rate XJOG, though this value XJOG will now be negative becase the operator will be moving the "Jog XFM" switch to the "forward" position. During the advancing jogging movement of the X-axis slide, the values of XAP and XCP are continually changed at step 106; that is, in each ΔT of jogging movement, XCP is changed by the value of ΔX, and XAP follows with the same change due to the changing resolver signal XR as the X-axis slide is advanced in response to the changes in XCP.

The operator is next instructed to "perform part reference", which is the prompting message displayed at step 012. The operator initiates this procedure by simplying closing a "PTREF" switch, which is another one of the switches 87 in FIG. 5. Step 013 of the main program senses when the PTREF switch is closed, maintaining the prompting message at step 012 in the meantime, and clears the flag MD1 at step 014 when closure of the PTREF switch is detected. This is the end of mode 1.

Immediately after clearing the flag MD1, the system sets the flag DISABL at step 015, and then sets the "mode 2" flag MD2 at step 016. In mode 2, the X-axis slide feed motor XFM is disabled while the system (1) initializes the values of both XCP and XAP to a computed value x, (2) computes the current value of the actual wheel radius RADW, and (3) sets a gage reference signal PTRADI equal to the known radius KNORAD being read by the gages 50 and 51 at this time. As indicated at step 017 in FIG. 7, the distance XP between the mid-point x1 on the slide XS and the center 20a of the grinding wheel can be computed as:

$$XP = YP \cot ANGL \tag{52}$$

The second computation at step 017 determines the starting value of the actual workpiece radius RADWI as:

$$RADWI = (YP/\sin ANGL) - KNORAD \tag{53}$$

The distance XSI between the slide mid-point x1 and the grinding wheel face is then computed as:

$$XSI = XP - RADWI \tag{54}$$

Both XAP and XCP are initialized at this value XSI, as indicated as step 017. Finally, as also indicated at step 017, the gage reference signal PTRADI is set equal to KNORAD.

From step 017 the main program advances to step 018 which displays another message, this time prompting the operator to "jog RFM until regulating wheel kisses master part." The operator then proceeds to use the "Jog RFM" switch to advance the R-axis slide RS until the regulating wheel is in kissing contact with the master workpiece. As the slide RS advances, its resolver signal RR constantly increases, so that the final value of the resolver signal RR when the regulating wheel is in contact with the master workpiece represents the distance traversed by the slide RS from its retracted reference position. Thus, it is known that the current actual radius $RADR_i$ of the regulating wheel is equal to the value RSO minus the resolver signal value $RR_i$ and the master workpiece radius KNORAD. This is the computation performed at step 019.

This is the end of mode 2, which completes the "set up" procedure, and the main program proceeds to step 020 which clears the flags MD2 and DISABL. The system then proceeds to step 021 where a "mode 6" flag MD6 is set. In this mode, which is repeated at the end of the grinding of each workpiece, the X-axis slide is retracted from its known position XAP=KNORAD to a predetermined "parked" position so that the operator has enough room to remove the master workpiece and insert the actual workpiece to be ground. This actual workpiece will, of course, usually have a radius slightly different from that of the master workpiece, but the actual position of the face of the grinding wheel relative to the X-axis slide is still precisely known because all movements of the wheel from its known starting position XAP=XSI are continually measured by monitoring the resolver signals XR and updating the value of the actual position signal XAP.

In order to retract the grinding wheel to the predetermined "parked" position, step 022 of the main program sets sets commanded X-axis and R-axis "end point" position values XCEP and RCEP equal to keyed-in values XRPK and RRPk, respectively. As will be apparent from the ensuing description, these values represent the desired retracted positions of the X-axis and R-axis slides when grinding is not in progress.

Turning next to the X-axis subroutine of FIG. 8 for a more detailed description of how the feed motor XFM is controlled in response to actuation of the "JOG XFM" switch by the operator, this subroutine begins at step 101 which samples a disabling flag XDISABL. If this flag is off, the subroutine proceeds to step 102 which determines whether or not the mode 1 flag MD1 is on. If it is, the system proceeds to step 103 which determines whether or not the operator has closed the "jog XFM" switch. If the answer is affirmative, the system sets a commanded feed rate XFRA (in inches/minute) equal to the jogging rate XJOG at step 104, and this commanded feed rate XFRA is then used at step 105 to determine the value of $\Delta X_i$, which is the commanded feed rate in inches/$\Delta T$. That is, the commanded inches-per-minute signal XFRA is converted to an inches-per-$\Delta T$ signal by dividing XFRA by 1500, because there are 1500 40-ms. $\Delta T$'s in each minute. In other words, $\Delta X_i$ represents the incremental distance through which the X-axis slide must be advanced in one iteration interval $\Delta T$ of 40 ms in order to achieve the desired feed rate XJOG, which is keyed into the memory in units of inches per minute.

It will be helpful to note at this point that the different X-axis slide feed rates required during the different modes of operation are achieved by simply changing the value of the commanded feed rate signal XFRA in the X-axis subroutine of FIG. 8. Changing the value of XFRA always results in a corresponding change in the value of $\Delta X_i$, which in turn changes the level of the energizing voltage $V_{xfm}$ supplied to the X-axis slide feed motor XFM.

After the value of XFRA has been set equal to XJOG at step 104, the subroutine of FIG. 8 proceeds to step 105, where the resolver signal XR is read. This resolver signal represents the changing position of the output shaft of the motor XFM, and the first computation at step 105 determines the change $\Delta XAP_i$ represented by the difference between each pair of successive readings $XR_i$ and $XR_{i-1}$ of the resolver signal. The resulting value of $\Delta XAP_i$ represents the actual change in position of the X-axis slide in the iteration interval between the readings $XR_i$ and $XR_{i-1}$. The second computation at step 105 continually updates the value of a signal $XAP_i$ representing the current actual position of the X-axis slide, by adding each new $\Delta XAP_i$ to the value of the previous position signal $XAP_{i-1}$.

Following the computation of $\Delta X_i$ at step 105, the X-axis subroutine proceeds to step 107 where a signal $XCP_i$ representing the current commanded position of the X-axis slide is updated in each iteration interval by adding the value $\Delta X_i$ to the previous command position signal $XCP_{i-1}$. This is the first computation at step 107. The second computation at step 107 determines the value of an error signal $XERR_i$, which is the difference between the current commanded position signal $XCP_i$ and the current actual position signal $XAP_i$. This error signal $XERR_i$ is then used in the final computation of step 107, which computes the value of the voltage command signal $XVC_i$ to be converted by the DAC converter 101 to the drive voltage $V_{wfm}$ for the X-axis slide feed motor XFM. As illustrated in FIG. 8, the value of this command signal $XVC_i$ is the value of the error signal $XERR_i$ multiplied by a keyed-in proportionality or gain factor GX. From step 107, this subroutine returns to the main program at step 108.

When the "jog" switch is not closed—e.g., due to intermittent operation of the switch by the operator—step 103 produces a negative response which causes the system to set $\Delta X_i$ to zero at step 109. As will be appreciated from the foregoing description, the X-axis slide feed motor XFM will be de-energized, thus simply holding the slide at a fixed position, as long as $\Delta X_1$ is zero.

It can be noted here that the computations just described as being carried out at step 107 of the X-axis subroutine of FIG. 8 are the same whenever the X-axis slide feed motor XFM is energized in any of the modes 1, 3, 4, 5 or 6. The value of $\Delta X_i$ changes depending upon the mode in which the system is operating at any given instant.

Whenever the slide XS is retracted far enough to close the limit switch XRLS, the closing of that switch sets the flag XDISABL which is read at step 101 of the X-axis subroutine. When this flag is set, the system immediately sets $\Delta X_i$ to zero at step 109 and exits the X-axis subroutine at step 108 to return to the main program. This ensures that the feed motor XFM is de-energized when the switch XRLS is closed, even if the operator accidentally keeps the "jog XFM" switch closed.

Whenever the "mode 6" flag MD6 has been set by the master program, the X-axis subroutine proceeds through steps 101, 102, 110, 111, 112, 113 and finally detects the presence of the flag MD6 at step 113. The subroutine then proceeds to step 114 which sets the commanded feed rate signal XFRA equal to a keyed-in value FRT representing the desired velocity of the X-axis slide during retracting movement of this slide to the "parked" position. As described previously, the value of XFRA determines the actual rate of movement of the X-axis slide by determining the value of $\Delta X_i$ at step 105.

Step 023 of the main program senses when the X-axis slide has reached the desired "parked" position by detecting when the difference between the set "end point" position XCEP and the current commanded position $XCP_i$ is less than the value of $\Delta X_i$. When the answer at step 023 is affirmative, step 024 sets the value of the commanded position signal $XCP_i$ for step 107 of the subroutine of FIG. 8 equal to the value of the "end point" position signal XCEP, which causes the retracting movement of the X-axis slide to be terminated at the position represented by XCEP; this is the desired "parked" position represented by the keyed-in value XRPK.

As will be described below, the R-axis subroutine proceeds through a similar "parking" routine in mode 6. Step 025 of the main program senses when the R-axis slide RS reaches the desired parked position by detecting when the difference between the set "end point" position RCEP and the current commanded R-axis position $RCP_i$ is less than the value of $\Delta R_i$. When step 025 yields an affirmative answer, step 026 sets the value of the commanded position signal $RCP_i$ equal to the value of RCEP, thereby terminating retracting movement of the R-axis slide at the position represented by RCEP.

The main program then advances to step 027 which clears the flag MD6, thereby ending mode 6. Another prompting message for the operator is then displayed at step 028, this time instructing the operator to unload the master workpiece, load an unground workpiece, and then "perform cycle start."

The "cycle start" operation by the operator, which initiates the actual grinding of the workpiece, is accomplished by simply closing a "cycle start" switch, which is another one of the switches 87 in FIG. 5. Step 029 of the main program senses when the operator has closed the "cycle start" switch, and then proceeds to energize the drive motors WM and RM at step 030 and to set the "mode 3" flag MD3 at step 031.

When the "mode 3" flag MD3 is on, the X-axis subroutine of FIG. 8 produces an affirmative response at step 110 and proceeds to step 116 which sets the commanded feed rate signal XFRA equal to two times a keyed-in value GR representing the desired radial grind rate for rough grinding. That is, the desired radial grind rate GR is converted to a desired diametral grind rate 2GR because the feeding movement of the work rest blade 25 and the regulating wheel 26 along the X axis must allow for reductions in the workpiece diameter, not just the radius, due to grinding.

It should be pointed out that setting the actual feed rate equal to the desired grind rate would not actually effect grinding at the desired rate 2GR because no allowance would have been made for wearing of the grinding wheel. However, the actual feed rate is determined by the values of $XCP_i$ and $XAP_i$, the latter of which is modified in each iteration interval $\Delta T$ by adding a value $CORA_i$ in order to compensate for wheel wear. Thus, although the commanded feed rate signal XFRA is set exactly equal to the value of the desired grind rate 2GR, feeding of the X-axis slide, and thus of the workpiece, will actually proceed at a different rate to compensate for wheel wear. This compensation is provided by the factor $CORA_i$, the value of which is computed in the subroutine of FIG. 9 and added to the current $\Delta XAP_i$ as step 118 of the subroutine of FIG. 8.

Even with the compensation for grinding wheel wear, the actual grinding rate can deviate from the desired grinding rate GR because the workpiece descends along the inclined top surface of the work rest blade 25 as grinding progresses. Thus, in each iteration interval of mode 3, step 118 of the X-axis subroutine (FIG. 8) determines the desired workpiece diameter $PTDIAD_i$ at that instant by subtracting the desired diameter reduction XFRA/1500 for one $\Delta T$ from the desired workpiece diameter $PTDIAD_{i-1}$ for the preceding iteration interval. The actual workpiece diameter $PTDIA_i$, as determined from the gage signals $GST_i$ and $GSB_i$ (see FIG. 9 described below), is subtracted from the updated desired value $PTDIAD_i$ to determine the error $PTDERR_i$ (if any) between the actual and desired values. The resulting error value $PTDERR_i$ is then added to the nominal desired feed rate XFRA/1500 (in inches/T) in computing the value of $\Delta X_i$. The net effect of this series of computations is to adjust the current commanded position signal $XCP_i$ at step 107 by the value of any error between the actual and desired rates of reduction in the workpiece radius. Consequently, the workpiece will actually be ground at a rate which closely approximates the desired grind rate.

Turning now to FIG. 9, this subroutine uses the gage signals GST and GSB to continually update the signals $PTDIA_i$ and $PTRAD_i$ representing the actual workpiece diameter and radius, respectively. The latter value is needed not only to compute the grinding wheel radius RADW and the value of the wheel wear compensation factor CORA used in mode 3, but also to compute the value of the "distance to go" signal $DTG_i$ in modes 4 and 5. Thus, the subroutine of FIG. 9 is active only during modes 3 through 5, which are the only modes during which grinding is taking place.

The first step 150 of the subroutine of FIG. 9 detects whether any of the flags MD3, MD4 or MD5 is on, and if the answer is negative the system immediately exits from this subroutine. If the answer is "yes" at step 150, the system proceeds to step 151 where the values of the gage signals $GST_i$ and $GSB_i$ are read from the gage ADC's. Running averages of the gage signal values GST and GSB, for the last ten $\Delta T$'s, are continually updated and stored as the values $GST_i$ and $GSB_i$ at step 152.

One of the keyed-in constants is HSO, which is the known and fixed distance between the two reference points H2 and H1 of the respective gages 60 and 61. That is, the lower gage 61 produces a signal GSB (G1) representing the distance between the lowermost surface of the workpiece and a known bottom reference point; and the upper gage 60 produces a signal GST (G2) representing the distance between the uppermost surface of the workpiece and a known top reference point. The vertical distance between those two reference points, H2−H1, is the value of the keyed-in constant HSO, and thus the actual workpiece diameter PTDIA at any given instant is, as computed at step 153:

$$PTDIA = HSO - GSB - GST \qquad (55)$$

The workpiece radius PTRAD is PTDIA/2. Consequently, the second computation at step 153 determines the value of PTRAD by dividing PTDIA by two.

At step 154 the subroutine tests the flag MD3, and if the answer is negative it means that the system is in mode 4 or 5. Both of these modes 4 and 5 require only the updated workpiece diameter and radius values $PTDIA_i$ and $PTRAD_i$, not the wheel wear compensation factor CORΔ, and thus the system exits from the subroutine of FIG. 9 in response to a negative answer at step 154 and returns the system to the main program at step 166. An affirmative response at step 154 means that the system is in mode 3, and thus the subroutine proceeds to steps 155-162 where the value of $PTRAD_i$ is used in an iterative calculation of the height H of the workpiece axis above the centerline of the regulating and grinding wheels (see FIG. 4). This iterative calculation begins at step 155 with a calculation of the horizontal distance X between the centers of the regulating wheel and the workpiece, as a function of the current workpiece radius $PTRAD_i$, the height H of the workpiece axis above the wheel centerline, the distance B between the center of the regulating wheel and the lower end of the top surface of the work rest blade, and the angle $p$ of the top surface of the work rest blade. For the first calculation of X at step 155 in the grinding of each new workpiece, the value of H is initially set equal to a keyed-in value HI. The next two calculations, carried out at steps 156 and 157 of the subroutine of FIG. 9, calculate the angle $\alpha$ (see FIG. 4) as a function of H and X, respectively. These two values are identified as ANGL 1 and ANGL 2. Then at step 158 the ratio of ANGL 1 to ANGL 2 is computed as a value ANGLR. If the value of this ratio ANGLR is less than 1, it means that the estimated value of H is too low; and, conversely, if the value of ANGLR is greater than 1, it means that the estimated value of H is too high.

Accordingly, steps 159 and 161 of the subroutine of FIG. 9 determine whether the value of ANGL R is significantly less than 1 (step 159) or significantly greater than 1 (step 161). If either step 159 or 161 produces an affirmative answer, the value of H is increased or decreased by an increment ΔH at step 160 or 162, respectively. The subroutine then returns to step 155 to repeat the calculations of X, ANGL 1, ANGL 2, and ANGLR. This series of steps is carried out iteratively until both steps 159 and 161 produce negative answers, indicating that the value of ANGL R is near 1. This in turn indicates that the values of both H and X are accurate within acceptable tolerances.

Having iteratively determined the value of H, the subroutine of FIG. 9 proceeds to step 163 where the current actual grinding wheel radius $RADW_i$ is calculated according to the equation written at step 163 in FIG. 9, using the values of H from steps 155-162, the value of the angle ANGL 1 from step 156, and the value of the current workpiece radius $PTRAD_i$ from step 153. From step 163, the subroutine proceeds to step 164 which first moves an error signal $RADERR_i$ to memory location RADERRI (thereby "saving" that signal), and then computes a new value for the error signal $RADERR_i$ by subtracting the current grinding wheel radius $RADW_i$ from the value of the grinding wheel radius RADWI from the preceding iteration interval. Thus, the value of $RADERR_i$ represents the incremental reduction in the grinding wheel radius in the latest iteration interval, as determined from the current workpiece gauge readings used to arrive at the value $PTRAD_i$. That is, the value of $RADERR_i$ represents the degree of compensation required in the workpiece feed rate to allow for grinding wheel wear.

The error signal $RADERR_i$ is then used at step 165 to compute conventional "PID" control factors $PFACTOR_i$, $IFACTOR_i$ and $DFACTOR_i$ which, as is well known, represent proportional, integral and derivative control terms which are used to control the X-axis feed motor XFM in a stable manner. Such "PID" control of servo motors is well known per se and need not be explained in detail herein. As indicated in FIG. 9, the proportional factor $PFACTOR_i$ is computed by multiplying the value of $RADERR_i$ by a keyed-in gain factor GP; the integral factor $IFACTOR_i$ is computed by multiplying $RADERR_i$ by a keyed-in integral gain factor GI and adding the resulting product to the previous value $IFACTOR_{i-1}$; and the derivative factor $DFACTOR_i$ is computed by subtracting the previous value $RADERR_{i-1}$ from the current value $RADERR_i$ and multiplying the resulting difference by a keyed-in derivative gain factor GD. The value of $CORΔ_i$ is then the sum of the three factors $PFACTOR_i$, $IFACTOR_i$, and $DFACTOR_i$.

Returning now to the X-axis subroutine of FIG. 8, step 117 computes the value of a signal $DTG_i$ representing the distance to go to the desired final workpiece radius PTRADD. This value $DTG_i$ is the difference between the current actual workpiece radius $PTRAD_i$ and the desired final radius value PTRADD.

A second computation performed at step 117 determines the value of a signal $FD_i$ which represents the decelerating rate at which it is desired to feed the workpiece into the grinding wheel during finish grinding (modes 4 and 5 described below). As will be apparent from the ensuing description, this feed rate FD decelerates exponentially with time. As indicated at step 117 in FIG. 8, the value of $FD_i$ at any given instant is the current value of the "distance to go" signal $DTG_i$ multiplied by the ratio GR/DD1. The ratio GR/DD1 is actually a constant for any given grinding system, because GR is the constant value representing the rate at which it is desired to grind the workpiece in mode 3, and DD1 is the constant value representing the DTG value at which it is desired to initiate simultaneous truing. Since both of these values GR and DD1 are constants, the ratio GR/DD1 is obviously also a constant. The value of $DTG_i$, however, is constantly decreasing as the grinding operation reduces the workpiece radius closer and closer to the desired final radius PTRADD. Consequently, the value of $FD_i$ will also be constantly reducing, and this reduction occurs at an exponential rate with respect to time. The manner in which this exponentially decreasing feed rate value $FD_i$ is used to control the feed rate of the X-axis slide will be described in more detail below in the description of modes 4 and 5.

In order to maintain the specific grinding energy SGE at its set point value SGED during the rough grinding carried out in mode 3, the subroutine of FIG. 10 monitors the output torque TORW of the grinding wheel drive motor WM and varies the input voltage to this motor WM as required to maintain the actual SGE equal to the desired value SGED. The rotational velocity RGV of the regulating wheel is kept constant at a set point value RGVD by the subroutine of FIG. 13 to be described below, and the grinding rate is held constant at the set point value GR by the X-axis subroutine described above. Consequently, the output torque TORW of the grinding wheel drive motor WM will increase as the grinding wheel dulls, due to the reduced efficiency of the abrasive grits of the grinding wheel in removing material from the workpiece 24. The subroutine of FIG. 10 senses this increase in torque TORW and decreases the rotational velocity WHV of the grinding wheel accordingly. This decrease in the grinding wheel velocity reduces the relative surface speed at the grinding interface, which causes the grinding wheel to re-sharpen automatically. As the wheel re-sharpens, the changes just described are reversed, increasing the rotational velocity of the grinding wheel and maintaining the actual SGE at the desired value SGED.

The first step 200 of the VM subroutine of FIG. 10 reads the value of the signal $WHV_i$ which is the digital counterpart of the analog signal $\omega_w$ received from the grinding wheel tachometer 36. This signal represents the actual speed of the grinding wheel at any given instant. Step 201 computes and stores a running average WHVAV of the speed signal WHV over, for example, the last ten $\Delta T$'s, using the aforementioned "stacking" procedure which continuously stores the latest ten readings, adding the new value $WHV_i$ and discarding the oldest value $WHV_{i10}$ in each $\Delta T$. The ten values stored at any given time are summed and divided by 10 to provide the desired average value $WHVAV_i$. This averaging procedure is used simply to enhance the reliability of the value of WHV by using a running average of the last ten signal values rather than relying on the single value of only the latest signal.

Steps 202, 203 and 204 of the WM subroutine read the flags MD3, MD4 and MD5, respectively, to determine whether the system is in mode 3, 4 or 5. Each of these modes has a different grinding feed rate and, therefore, a different rate M′ of metal removal from the workpiece at the grinding interface. This metal removal rate M′ is important because it is the denominator of the SGE ratio. Accordingly, a gain factor GW is set to a different value for each different grinding mode, i.e., modes 3, 4 and 5. This gain factor GW controls the magnitude of the change effected in the grinding wheel velocity set point value WHVD in response to any given change in the output torque TORW of the grinding wheel drive motor WM. In other words, TORW and WHV are the controlling and controlled parameters, respectively, in the numerator of the SGE ratio, and thus the value of the gain factor GW, which establishes the set point value WHVD for any given value of $TORW_i$, in effect sets the SGE value maintained in each different grinding mode.

To change the value of the gain factor GW for the three different grinding modes 3, 4 and 5, steps 205, 206 and 207 of the subroutine of FIG. 10 set GW to three different values GW1, GW2 and GW3 in response to affirmative answers at steps 202, 203 and 204, respectively. The values GW1, GW2 and GW3 are all keyed-in constants which are changed for different grinding operations.

After setting GW to the appropriate value, the subroutine of FIG. 10 proceeds to step 208 where it reads the current value of the signal $TORW_i$ which is the digital counterpart of the analog signal $TOR_w$ received from the torque sensor 35 on the output of the drive motor WM. From step 208 the WM subroutine advances to step 209 where it carries out three computations. The first computation determines the current desired value $WHVD_i$ of the rotational velocity of the grinding wheel by multiplying the current value $TORW_i$ by the gain factor GW set at step 205, 206 or 207. The second computation at step 209 computes an error signal $WHVERR_i$ as the difference (if any) between the computed set point value $WHVD_i$ (in rpm) and the latest average value $WHVAV_i$. This error signal $WHVERR_i$ is then used to effect any adjustment required in the command signal VWM which controls the driving voltage $V_{wm}$ supplied to the grinding wheel drive motor WM. More specifically, the error signal $WHVERR_i$ is used to make an integrating correction by multiplying it by a proportionality or gain factor GW (a keyed-in constant), and then adding the resulting product to the value of the command signal $VWM_{i-1}$ for the previous $\Delta T$. The resulting new value $VWM_i$ of the command signal will produce an actual grinding wheel speed WHV equal to the set point speed WHVD. The command signal will remain at this value unless and until there is a further deviation of either the actual speed as represented by the signal $WHV_i$ or the set point speed value $WHVD_i$. Step 210 of this subroutine returns the system to the main program.

When the control system is not in any of the modes 3, 4 or 5 while the drive motor is energized, step 204 of the WM subroutine yields a negative answer. This advances the system to step 211 which sets the command signal $VWM_i$ equal to the keyed-in value VWMI representing a suitable "idling" speed for the wheel drive motor WM when no grinding is taking place.

During the rough grinding mode MD3, the truing roll has not yet engaged the grinding wheel, because there is no simultaneous truing during rough grinding, but it is desired to maintain a constant gap between the truing roll and the grinding wheel so that the truing roll can be quickly and smoothly brought into engagement with the grinding wheel when it is desired to initiate simultaneous truing. To accomplish this, the truing roll is initially set at a position which establishes the desired gap between the opposed faces of the truing roll and the grinding wheel, and then the truing slide is advanced at a rate set by the value of COR during mode 3. The desired gap is initially set in mode 6, after which the truing slide remains stationary until its advancing movement at the rate CORΔ is started at the beginning of mode 3. Although the value of CORΔ does not change at exactly the same rate at which the grinding wheel radius decreases due to wear, it is sufficiently close that the gap between the surfaces of the grinding wheel and the truing roll remains essentially constant. The U-axis subroutine for controlling movement of the truing slide is shown in FIG. 11.

Turning now to FIG. 11, the first step 300 of this subroutine clears a series of flags GOK6, GOK3, GOK45, CTG and OTG. The subroutine then proceeds to step 301 to determine whether or not the system is in mode 6. If the answer is negative, the system proceeds to step 302 to test for mode 3, and a negative response causes the system to move on to step 303 to test for mode 4, and then on to 304 to test for mode 5. It is only in these four modes, namely modes 3, 4, 5 and 6, that the truing slide feed motor is energized.

When the system is in mode 6, step 301 yields an affirmative answer, and the subroutine proceeds to step 305 where a flag GOK6 is read to determine whether the truing slide has reached the end of its desired movement for this particular mode; this flag will be discussed in more detail below. If the flag GOK6 is clear, the system proceeds to step 306 to test a flat SGFL which is normally clear the first time this subroutine is entered in mode 6. A negative response at step 306 advances the system to step 307 which sets the flag SGFL so that the next two steps 308 and 309 are bypassed for the balance of this particular mode.

Step 308 sets the endpoint UCEP for the truing slide movement in mode 6. More specifically, in order to retract the truing slide to a position where the face of the truing roll is spaced a predetermined distance away from the face of the grinding wheel, this endpoint UCEP is set to a value that is equal to the sum of the signal $RADW_i$ representing the current wheel radius (see FIG. 9), the signal RADT representing the truing roll radius (one of the keyed-in constants), and a signal GAP representing the desired distance between the truing roll and the grinding wheel (another keyed-in constant). Having set the desired endpoint UCEP, the system advances to step 309 which sets the U-axis feed rate command signal UFRA equal to a keyed-in value SGV representing a rate of movement that is fast enough to move the truing slide to the desired position before mode 6 ends. Once the value of UFRA has been set at step 309, there is no need to repeat steps 308 and 309 for the balance of this particular mode 6, and that is why the flag SGFL is set at step 307. As a result, in the next iteration interval step 306 produces an affirmative response which causes the system to bypass steps 308 and 309.

From step 309 or 306, the system proceeds to step 310 where a value $\Delta U_i$ is set equal to the command signal UFRA, which is in units of inches per minute, divided by 1500 to convert the UFRA value to inches per $\Delta T$ (still assuming a $\Delta T$ of 40 ms.). It will be recognized that this value $\Delta U_i$ is the U-axis counterpart of the value $\Delta X_i$ already discussed above in connection with the X-axis subroutine. That is, the command signal UFRA is set at different values in different modes, always expressed in inches per minute, and $\Delta U_i$ is simply the commanded value UFRA divided by 1500 to convert the units to inches per $\Delta T$.

Step 311 determines when the truing slide is within one $\Delta T$ of the desired endpoint UCEP. This is determined by comparing the absolute value of $\Delta U_i$ with the absolute value of the difference between the desired endpoint UCEP and the current commanded truing slide position $UCP_i$. When the difference between UCEP and $UCP_i$ is less than $\Delta U_i$, step 311 produces an affirmative response which causes the system to proceed to step 312 where the value of $\Delta U_i$ is set to zero and the new commanded position $UCP_i$ of the truing slide is set at the value of the desired endpoint UCEP. This will cause the truing slide feed motor to be advanced only to the desired endpoint UCEP in the current $\Delta T$, thereby stopping the truing slide at the desired endpoint UCEP with the truing roll face spaced the desired distance GAP away from the grinding wheel face.

From step 312, the system advances to step 313, which determines whether or not the flag MD6 is on. An affirmative response advances the system to step 314 which sets the flag GOK6 tested at step 305. The setting of this flag indicates that the truing slide is in its last $\Delta T$ of movement in mode 6. Consequently, if mode 6 continues for one or more iteration intervals, an affirmative answer will still be produced at step 301 because the flag MD6 will still be on, but the setting of the flag GOK6 will produce an affirmative answer at step 305. As a result, the system will proceed directly from step 305 to step 315 which sets $\Delta U_i$ to zero for the balance of this mode.

Up until the time the truing slide moves to within one $\Delta T$ of the endpoint UCEP in mode 6, step 311 produces a negative response which advances the system to step 316. Step 316 reads the U-axis resolver signal UR, which represents the changing position of the output shaft of the motor TFM. Thus, the change $\Delta UAP_i$ represented by the difference between each pair of successive readings $UR_i$ and $UR_{i-1}$ of the resolver signal represents the actual change in position of the truing slide in the iteration interval between the readings $UR_i$ and $UR_{i-1}$. The value $\Delta UAP_i$ is used to continually update the signal $UAP_i$ representing the current actual position of the truing slide, by adding each new $\Delta UAP_i$ to the value of the previous position signal $UAP_{i-1}$, which is the second computation carried out at step 316 as illustrated in FIG. 11. The signal $UCP_i$ representing the current commanded position of the truing slide is similarly updated in each iteration interval by adding the value $\Delta U_i$ to the previous commanded position signal $UCP_{i-1}$, which is the third computation carried out at step 316 in FIG. 11. The fourth computation determines the value of an error signal $UERR_i$, which is the difference between the current commanded position signal $UCP_i$ and the current actual position signal $UAP_i$. This error signal $UERR_i$ is then used in the final computation of step 316, which computes the value of the voltage command signal $UVC_i$ to be converted by a DAC converter to the drive voltage $V_{tfm}$ for the truing slide feed motor TFM. As illustrated in FIG. 11, the value of this command signal $UVC_i$ is the value of the error signal $UERR_i$ multiplied by a keyed-in proportionality or gain factor GU.

As in the case of the X-axis subroutine described previously, the computations just described as being carried out at step 316 are the same whenever the truing slide feed motor TFM is energized in any of the modes 3, 4, 5 or 6. The value of $\Delta U_i$ changes depending upon the mode in which the system is operating at any given time, and in most cases a desired change in the value of $\Delta U_i$ is effected by simply changing the value of the commanded feed rate signal UFRA.

In mode 3, the U-axis subroutine of FIG. 11 controls the truing slide motor TFM to advance the truing slide at a rate which maintains the constant distance GAP between the truing roll face and the face of the grinding wheel. This constant "following gap" is maintained until it is desired to start closing the gap in order to initiate simultaneous truing and grinding. In this particular example, the preselected, keyed-in "distance to go" value DD1 is used as an indication of when it is desired to initiate simultaneous truing and grinding, and the advancing movement of the truing slide is accelerated to close the "following gap" 100 T's before the "distance to go" signal $DTG_i$ reaches the keyed-in value DD1. It will be recalled that the signal $DTG_i$ is continually updated during mode 3 at step 117 of the X-axis subroutine of FIG. 8. Step 032 of the main program continually compares the current value $DTG_i$ with the sum of the keyed-in value DD1 plus the value 100 $\Delta X_i$; since $\Delta X_i$ remains relatively constant during mode 3, the value 100 $\Delta X_i$ represents the distance that will be traversed by the X-axis slide in 100 $\Delta T$'s, which means that the sum (DD1+100 $\Delta X_i$) represents the X-axis slide position 100 $\Delta T$'s before the X-axis slide reaches the position at which the distance to go to the desired final radius PTRADD is equal to the value DD1. When the signal $DTG_i$ reaches this value (DD1+100 $\Delta X_i$), step 035 of the main program produces an affirmative response and advances the system to step 033, where a flag CTG is set. This flag CTG is then read in the mode 3 channel of the U-axis subroutine of FIG. 11.

Returning to the beginning of the U-axis subroutine, when the system is in mode 3 negative responses are produced at both steps 300 and 301, and an affirmative response is produced at step 302. This causes the system to proceed to step 320 which reads a flag GOK3, which will be described below. If an affirmative response is produced at step 320, the system is advanced directly to step 322 which sets the value of $\Delta U_i$ equal to CORΔ. A negative response at step 320 advances the system to step 321 to read the flag CTG, which is the flag set by the main program at the point where it is desired to accelerate the advancing movement of the truing slide to close the "following gap". A negative response at step 321 again advances the system to step 322 where the value of $\Delta U_i$ is set equal to the value of CORΔ.

It will be recalled that CORΔ is the value used to adjust the feed rate of the X-axis slide to compensate for grinding wheel wear. It will also be recognized that as long as it is desired to simply have the truing roll remain at a constant distance GAP from the surface of the grinding wheel, the truing slide would have to be advanced at exactly the same rate at which the grinding wheel is wearing. Although the value of CORΔ is not exactly the same as the wheel wear rate, it is sufficiently close that setting $\Delta U_i$ equal to CORΔ will maintain a relatively constant distance GAP between the truing roll and the grinding wheel.

When the flag CTG is set, step 321 produces an affirmative response which causes the system to proceed to step 326 which sets the U-axis feed rate command signal UFRA equal to a new value which is the sum of a preselected, keyed-in constant value CV and a term which is 1500 times the value of CORΔ. The latter term, 1500 COR, is simply the factor CORΔ converted from inches per $\Delta T$ to inches per minute, and the value CV represents a preselected rate (in inches per minute) at which it is desired to close the gap between the truing roll and the grinding wheel.

While the truing roll is being advanced toward the grinding wheel at the closing velocity CV, steps 321a and 321b of the U-axis subroutine monitor the output torque of the truing roll drive motor TM and sense when the truing roll engages the grinding wheel. This is accomplished by setting the value of an "initial truing torque" signal TORTI equal to the value of the signal $TORT_{i-1}$ received from the torque transducer 57 in the previous iteration interval. When the truing roll has no load on it, the value of the signal $TORT_i$ is relatively low. From step 321a, the subroutine advances to step 321b which senses when the actual truing roll torque exceeds a predetermined multiple, e.g., 1.3, of the value TORTI.

When an affirmative response is produced at step 321b, it is known that the truing roll has been brought into rubbing contact with the grinding wheel, and the system sets the flag GOK3 to terminate advancing movement of the truing roll at the accelerated rate set at step 326. The flag GOK3 is set at step 321c, thereby causing the system to proceed directly from step 320 to step 322 in the next iteration interval (if the flag MD3 remains on).

During the period when the gap between the truing roll and the grinding wheel is being eliminated, the values of the exponent b and the coefficient k are also computed. These computations are carried out as part of the main program, at step 036a following the setting of the flag CTG at step 036. The value of the exponent b is computed from the values CORΔ and GR used in the X-axis subroutine during mode 3. These values are used in Equation (9) described above, as rewritten at step 036A, to compute the value of the exponent b, and then the value of the coefficient k is computed from b, using Equation (10) described above, again as rewritten at step 034. It will be noted that the value CORΔ used in these Equations is multiplied by 1500 to convert the units from inches/T to inches/minute.

It will be recalled that the decelerating feed rate $FD_i$ is continually computed, as a function of the decreasing "distance to go" value $DTG_i$, throughout mode 3 of the X-axis subroutine (FIG. 8). The value of $FD_i$ continuously decreases at an exponential rate, and step 035 of the main program determines when the value of $FD_i$ has been reduced to the value GR representing the desired radial grinding rate during mode 3. An affirmative response at step 037 is used to clear the flag MD3 at step 036 and to set the "mode 4" flag MD4 at step 037. Mode 3 is thus terminated, and mode 4 is started.

Mode 4 is the initial stage of finish grinding, in which finish grinding is carried out at an exponentially decelerating feed rate with simultaneous truing. When the mode 4 flag MD4 is set, the X-axis subroutine of FIG. 8 produces an affirmative response at step 111, which advances the system to step 119 to carry out the same computations of $DTG_i$ and $FD_i$ which were carried out at step 117 in the mode 3 channel. From step 119, the system proceeds to step 120 to read a flag OTG which is set by the U-axis subroutine when simultaneous truing is terminated. A negative response at step 120 causes the system to proceed to step 121 where the value of the commanded feed rate signal XFRA is set to a value ($2FD_i$+WWRT). This new feed rate value is intended to carry out finish grinding by advancing the workpiece into the grinding wheel at the decelerating feed rate $FD_i$ by advancing the X-axis slide at the rate $2FD_i$, while at the same time advancing the X-axis slide at the additional rate WWRT at which the wheel radius is being reduced at the truing interface due to simultaneous truing and grinding. It will be appreciated that the accuracy with which the desired grinding feed rate $FD_i$ is met will be dependent upon the accuracy with which the desired truing rate WWRT is met at the truing interface.

From step 121 the system proceeds to step 106a where the new values of $FD_i$ and XFRA are used to compute the new value of $\Delta X_i$. The new value of $\Delta X_i$ is then used at step 107 to control the feed rate of the wheel slide in the same manner described previously.

Returning to the U-axis subroutine of FIG. 11, the mode 4 channel of this subroutine is entered with an affirmative response at step 303, because of the setting of the flag MD4. This subroutine then proceeds to step 330 which reads a flag GOK45 to be described below. If the flag GOK45 has not been set, the system advances to step 331 which determines when the "distance to go" value $DTG_i$ is reduced to a keyed-in value TDIS representing the point at which it is desired to terminate simultaneous truing and grinding.

As long as step 331 produces a negative response, the U-axis subroutine advances to step 337 where the wheel wear rate WWRG due to grinding is computed for the current value of the grinding feed rate $FD_i$. This value WWRG is computed using Equation (10) as rewritten at step 337, using the values of b and k computed at step 036a of the main program. The computed value of WWRG is then used at step 338 to compute a new value for the truing slide feed rate command signal UFRA (in units of inches per minute) that will achieve the desired truing rate represented by the value WWRT (one of the keyed-in values) while the wheel is being worn down due to grinding at the computed rate WWRG. As indicated at step 338 in FIG. 11, this new value of the command signal UFRA is equal to the sum of WWRT and WWRG. The system then proceeds to step 339 where the new value of $\Delta U_i$ is once again determined by dividing the new UFRA value by 1500. As before, this value of $\Delta U_i$ is used at step 316 to control the feed rate of the truing slide.

When step 331 produces an affirmative response, indicating that $DTG_i$ has been reduced to the value at which simultaneous truing is to be terminated, the system advances to step 332 where a flag OTG is read. This flag OTG will always be clear the first time step 332 is reached in each grinding operation, thereby producing a negative response which advances the system to step 333 where the flag OTG is set. The system then proceeds to step 334 where another new end point value UCEP is set. This time UCEP is set at a value equal to the sum of the current wheel radius value $RADW_i$ (as computed at step 713 of the subroutine of FIG. 9), the truing roll radius value RADT, and the value GAP described previously. This is the same formula followed for the setting of the UCEP value at step 308, but the value determined at step 334 will be somewhat smaller because the wheel radius will have been reduced in the meantime. However, the end result of the new value set at step 334 will be the same as the value set at step 308, i.e., the truing slide will be retracted to a position where the truing roll face is spaced away from the grinding wheel face by a distance corresponding to the value GAP.

From step 334 the system advances to step 335 where the feed rate command signal UFRA is set at the same value CV (but with the opposite polarity) that was used to close the "following gap" in mode 3. This value CV determines the rate at which the truing roll is backed away from the grinding wheel at the point where simultaneous truing and grinding is terminated, which is determined by the value TDIS used at step 331. From step 335, the system proceeds to step 310, where the value of $\Delta U_i$ is once again determined by dividing the new feed rate command signal value UFRA by 1500.

While the truing roll is being retracted at the commanded rate, step 311 constantly compares the absolute value of $\Delta U_i$ with the remaining distance between the newly set endpoint UCEP and the current commanded position $UCP_i$, to determine when the truing roll is within one $\Delta T$ of the desired endpoint. When an affirmative response is produced at step 311, the system proceeds to step 312 (described previously), and steps 313 and 327, both of which produce negative responses. From step 327, the system advances to step 342 which sets the flag GOK45 to indicate that the retracting movement of the truing slide is in its final $\Delta T$. Thus, if the system is still in mode 4 in the next $\Delta T$, it will proceed directly from step 330 to step 315 which sets $\Delta U_i$ to zero so that the truing slide is not driven any farther.

Returning now to the mode 4 channel of the X-axis subroutine of FIG. 8, it will be recalled that the flag OTG is set at step 332 of the U-axis subroutine when simultaneous truing and grinding is terminated. When this occurs, it is no longer necessary or desirable to supplement the X-axis feed rate command value $FD_i$ with the truing rate value WWRT, because truing is no longer being carried out. Accordingly, step 120 of the X-axis subroutine produces an affirmative response when the flag OTG is on, causing the system to proceed to step 122 rather than step 121, and setting the X-axis feed rate command signal XFRA equal to twice the decelerating workpiece feed rate value $FD_i$. Steps 106 and 107 then cause finish grinding to continue at the desired rate $FD_i$.

Mode 4 is terminated, and mode 5 initiated, when the decelerating feed rate $FD_i$ reaches a keyed-in value FGRFIN representing a desired radial finish grinding feed rate for the final increment of finish grinding which reduces the workpiece radius to the desired final value PTRADD. Step 040 of the main program (FIG. 7b) determines when the value of $FD_i$ has been reduced to the keyed-in value FGRFIN, and when this condition occurs step 042 produces an affirmative response which advances the system to step 041 to clear the flag MD4, and then on to step 042 which sets the flag MD5.

In the X-axis subroutine of FIG. 8, the setting of the "mode 5" flag MD5 advances the system from step 111 to steps 112 and 123 where the grinding feed rate command signal is changed from $2FD_i$ to twice the keyed-in constant value FGRFIN. From step 123, the system proceeds on through steps 106 through 108.

In the U-axis subroutine of FIG. 11, the setting of the "mode 5" flag MD5 produces an affirmative response at step 304, advancing the system to step 350 where the flag GOK45 is read. It will be recalled that this flag GOK45 is the flag that is set when the truing slide has been returned to its retracted position, which can occur in either mode 4 or mode 5. If the truing slide has not yet reached the retracted position, or has not yet even started its retracting movement, step 350 produces a negative response which advances the system to step 332. That is, a negative response at step 350 has the same effect as a positive response at step 331—simultaneous truing is terminated by setting UFRA to $-CV$, and a new end point UCEP is set at step 335. This is the desired result because if mode 5 is entered before the truing slide has even reached the position represented by the value TDIS, it is desired to end simultaneous truing and grinding immediately.

An affirmative response at step 350 indicates that the truing slide has already reached its retracted position, and the system is advanced directly to step 315 which sets the value of $\Delta U_i$ to zero, thereby de-energizing the truing slide feed motor TFM.

During the finish grinding mode 5, the actual workpiece radius value $PTRAD_i$ is used to determine when finish grinding should be terminated, by determining when the actual workpiece radius has been reduced to the desired final workpiece radius value PTRADD. This comparison is carried out at step 043 of the main program, and when this step produces an affirmative answer, the flag MD5 is immediately cleared at step 044. The main program then proceeds to step 045 which clears a flag STEINC (yet to be discussed) and then on to step 046 which returns to step 021 where the flag MD6 is set. This causes the X-axis slide drive motor XFM to retract the X-axis slide to its "parked" position in the same manner described previously.

Although the truing roll drive motor TM was started at step 004 of the main program, control of the truing roll speed is not initiated until mode 4, because it is only during mode 4 that the truing roll engages the grinding wheel. The subroutine for controlling the truing roll speed during mode 4 is shown in FIG. 12. This subroutine does not hold the truing roll speed TRV at a set point speed, but rather adjusts the truing roll speed to hold a signal RSURV, representing the relative surface velocity at the truing interface, equal to a set point value RSURA. The value RSURV is computed from an equation described in more detail in co-pending U.S. patent application Ser. No. 249,192, filed Mar. 30, 1981 for "Grinding Control Methods and Apparatus". That equation is rewritten at step 508 of FIG. 12. As described in the copending application, controlling the relative surface velocity at the truing interface is an indirect method of controlling STE.

The first step 500 of the subroutine of FIG. 12 determines whether the flag MD4 is on, and if the answer is affirmative the system proceeds to step 501 which reads the current truing roll speed signal $TRV_i$ from the truing roll tachometer 58. Step 502 computes and stores a running average $TRVAV_i$ of the last ten speed readings $TRV_i$. Similarly, step 503, reads the grinding wheel velocity $WHV_i$ from the wheel tachometer 36, and step 504 computes and stores a running average $WHVAV_i$ of the last ten truing roll speed readings $WHV_i$.

Step 505 reads the flag STEINC which is set at step 039 of the main program when the finish grinding carried out during mode 4 has proceeded to a point where the "distance to go" value $DTG_i$ is equal to a keyed-in value DD2. The value DD2 represents a "distance to go" value at which it is desired to change the STE in order to change the surface condition of the grinding wheel so that a desired surface finish is produced on the workpiece during the last portion of the finish grinding. When the value of $DTG_i$ reaches the value DD2, step 038 of the main program produces an affirmative response which advances the system to step 041 where the flag STEINC is set.

Returning to the subroutine of FIG. 12, up until the time the flag STEINC is set, step 505 produces a negative response which advances the system to step 506 where the value of RSURA is set to a keyed-in set point value RSUR1. The system then proceeds to step 508 where the value RSURV is computed using the equation mentioned above. It will be recognized that this equation, as written at step 508 in FIG. 12, requires a series of separate computations each of which is a straightforward addition, subtraction, multiplication, or division operation. The resulting computed value RSURV is then used at step 509 to compute an error signal SURVERR, which is the difference (if any) between the value RSURA set at 506 and the value RSURV computed at step 508. The error signal SURVERR is then used at step 510 to make an integrating correction to the truing roll speed command signal VTM. More particularly, the error signal SURVERR is multiplied by a gain factor GT, and the resulting product is added to the previous speed command signal $VTM_{i-1}$ to produce a new speed command signal $VTM_i$. The subroutine then returns the system to the main program at step 511.

After the flag STEINC is set at step 041 of the main program, step 505 of the subroutine of FIG. 12 produces an affirmative response which advances the system to step 507 rather than 506, setting the value of RSURA to a second keyed-in set point value RSUR2. This set point RSUR2 is greater than the first set point RSUR1 so as to produce a higher STE, which has the effect of dulling the surface of the grinding wheel so as to produce a smoother final surface finish on the ground workpiece.

It will be recalled that the regulating wheel drive motor RM was started at step 030 of the main program. The subroutines for producing the command signal VRM for controlling the driving voltage $V_{rm}$ for the motor RM is illustrated in FIG. 13. The first step 600 of this subroutine reads the value of the signal $RGV_i$ which is the digital counterpart of the analog signal $\omega_r$ received from the regulating wheel tachometer 39. This signal RGV represents the actual speed of the regulating wheel at any given instant. Step 601 computes and stores a running average RGVAV of the speed signal RGV over, for example, the last ten $\Delta T$'s.

At step 602, the subroutine of FIG. 13 computes an error signal $RGVERR_i$ as the difference (if any) between the keyed-in set point speed value RGVD (in rpm) and the latest average value $RGVAV_i$. This error signal $RGVERR_i$ is then used to effect any adjustment required in the command signal VRM which controls the driving voltage $V_{rm}$ supplied to the drive motor RM. More specifically, the error signal $RGVERR_i$ is used to make an integrating correction by multiplying it by a proportionality or gain factor GRV (one of the keyed-in constants), and then adding the resulting product to the value of the command signal $VRM_{i-1}$ for the previous $\Delta T$. The resulting new value $VRM_i$ of the command signal will tend to restore the actual regulating wheel speed RGV to the set point speed RGVD. The command signal will remain at this new value, holding the actual regulating wheel speed at the set point speed, unless and until there is a further deviation of the actual speed from the set point speed. Step 603 of this subroutine returns the system to the main program.

In the foregoing example, the values of the exponent b and the coefficient k are computed during the rough grinding of each separate workpiece, just before the finish grinding is initiated. As an alternative, particularly in applications where such a high degree of precision is not an absolute requirement, the values of b and k can be approximated from computations performed in other, preferably similar, grinding operations. Many grinding operations are highly repetitious, using grinding wheels with the same material and the same initial size to grind the same kind of workpiece day after day. Consequently, once the values of b and k have been determined for the grinding of one such workpiece with one such grinding wheel in a given set of grinding conditions, those values of b and k will normally have a high degree of validity for other, similar grinding operations. For example, it has been found that the use of the value "2" for the exponent b and the value "1" for the coefficient k will produce satisfactory results in many grinding operations. These particular values can be used in the system that has been described in detail above by simply omitting step 036a of the main program and using keyed-in values of "2" and "1" for b and k, respectively, at step 337 of the U-axis subroutine of FIG. 11.

It should also be noted that the system described above is based upon an assumption that the truing roll wear and regulating wheel wear are insignificant enough that they can be ignored, i.e., the values RADT and RADR are assumed to be constants, between referencing routines. If desired, however, the system can be refined to compensate for the wear rates of the truing roll and regulating wheel, which are normally much smaller than the wear rate of the grinding wheel. Examples of specific systems for compensating for the truing roll wear rate are described in the aforementioned copending application Ser. No. 249,192, which is assigned to the assignee of the present invention.

DETAILED DESCRIPTION OF PREFERRED EMBODIMENT FOR CENTER-TYPE GRINDING OF SOLID WORKPIECES

To grind workpieces that require precise concentricity of the ground surface with a central axis, the centerless grinding system described above can be rather easily converted to a vastly improved center-type grinding system. One example of such a center-type system is illustrated in FIGS. 14–16. This system supports the workpiece 24 on a pair of spindles 100 and 101 rather than a work rest blade; the workpiece 24 is driven by a spindle or workpiece drive motor PM rather than by a regulating wheel; and feeding movement of the workpiece 24 into a fixed-axis grinding wheel 20 is effected solely by controlled movement of a cylindrical backup wheel 102. This backup wheel 102 is similar to the regulating wheel 26 in the system of FIG. 1 except that the backup wheel 102 is not rotationally driven and, therefore, does not perform any speed-regulating function. That is, the backup wheel 102 is free-wheeling about its own axis. Since there is no need to eliminate slippage between the backup wheel 102 and the workpiece 24, the wheel 102 can be made entirely of hard rubber, without the grit normally included in a regulating wheel, or it can even be made of steel.

As illustrated in FIG. 16, the backup wheel 102 in the center-type grinding system is at least as long as the grinding wheel 20 in the axial direction. Thus the wheel 102 provides firm support for the workpiece 24 against the grinding forces applied thereto as the workpiece 24 is fed into the grinding wheel 20, because it is the advancing movement of the backup wheel 102 that actually effects the feeding movement of the workpiece. Consequently, inaccuracies due to deflection of the workpiece by the grinding forces are virtually eliminated.

Movement of the backup wheel 102 along the X-axis can be controlled by the same subroutines used to control the X-axis slide in mode 3 of the centerless grinding system of FIG. 1, i.e., the subroutines shown in FIGS. 8 and 9, with certain modifications. Although the workpiece axis drops an infinitesimal amount due to pivoting movement of the spindles 100, 101 in the center-type machine (as will be described below), this change is so small that it can be ignored; nor will it affect the final radius of the ground workpiece, because that final radius is determined solely by a gage 115 (also described below). Consequently, for controlling the center-type machine of FIGS. 14–16, steps 705 through 713 of the subroutine of FIG. 9 can be replaced by a single step which computes a new actual grinding wheel radius value $RADW_i$ in each iteration interval T by simply subtracting the current value of CORΔ from the previous wheel radius value $RADW_{i-1}$. Thus:

$$RADW_i = RADW_{i-1} - COR\Delta \qquad (56)$$

Because the gage 115 in the system of FIGS. 14–16 is a radius gate rather than a diameter gage, step 153 of the subroutine of FIG. 9 is also modified to first compute the current workpiece radius $PTRAD_i$ from the gage signal (as described in more detail below). The workpiece diameter $PTDIA_i$ is then computed by multiplying the value of $PTRAD_i$ by two.

To permit the workpiece 24 to be fed into the grinding wheel 20 under the urging of the backup wheel 102, the spindles 100, 101 are carried on arms 103, 104 which are pivotally mounted on trunnions 105, 106 having a common axis of rotation running parallel to the axis of the workpiece 24. As the backup wheel 102 is advanced toward the grinding wheel 20, the force applied to the workpiece 24 by the backup wheel causes the spindle arms 103, 104 to pivot about their respective pivotal mountings, thereby permitting the workpiece to be fed into the grinding wheel.

The trunnion mountings of the spindle arms 103, 104 are preferably unidirectional during grinding; that is, they permit pivoting movement of the spindle arms 103, 104 only toward, not away from, the grinding wheel 20. The purpose of this unidirectional mounting is to enable the spindle arms 103, 104 to resist deflections of the workpiece away from the grinding wheel. For example, if a starting workpiece has a surface which is eccentric with respect to its axis of rotation, that portion of the workpiece which is being ground will oscillate until enough material is ground off to make the workpiece surface concentric with the axis of rotation. If the spindle arms 103, 104 were mounted in a manner that permitted the spindle arms to pivot in both directions, the spindle arms would naturally oscillate back and forth along with the workpiece. With the unidirectional mounting, however, the spindles resist movement of the workpiece away from the grinding wheel, thereby applying an additional feeding force on the workpiece each time the "high" part of the eccentricity passes the grinding wheel. The result is to accelerate the "rounding up" of the workpiece.

In the illustrative embodiment of FIGS. 14–16, bidirectional movement of the pivotal mounting of the workpiece spindle arms 103, 104 is prevented by hydraulic cylinders 107 (FIG. 15) which produce a light biasing pressure urging the spindle arms 103, 104 toward the grinding wheel 20. Although these cylinders 107 apply only a light biasing pressure in the advancing (feeding) direction, they firmly resist any retracting force exerted on the spindle arms 103, 104. To this end, the cylinders 107 are supplied with pressurized fluid P through a check valve 109 which admits the pressurized fluid into the cylinders 107 but blocks the flow of fluid out of the cylinders. When the grinding of a given workpiece is completed, the hydraulic pressure P is removed from the cylinders 107 by opening a solenoid valve 110, thereby permitting the spindle arms to be retracted for removal of the ground workpiece and insertion of a new workpiece. Indeed, in certain applications it may be desirable to remove this hydraulic pressure during finish grinding to avoid the application of excessive feed pressure to the workpiece as the desired final radius is approached.

When it is desired to grind an eccentric surface on a workpiece, the X-axis slide can be oscillated in synchronism with the eccentricity of the workpiece. That is, the X-axis slide can be positively driven back and forth to produce an oscillatory motion which either (1) causes a desired eccentric surface to be ground on the workpiece (retracting the backup wheel when the high spot of the eccentric surface is at the grinding interface) or (2) causes an eccentric surface to be ground out of the workpiece (advancing the backup wheel when the high spot of the eccentric surface is at the grinding interface.

Another advantage of the pivotal mounting of the workpiece spindles is an increase in the dynamic stiffness of the grinding machine, which in turn reduces excess wear of the grinding wheel. Dynamic stiffness is typically expressed in terms of a "damping factor" value, which is the ratio of dynamic stiffness to static stiffness. Typical damping factors for machine tools in general are in the range of 0.1 to 0.2, whereas the center-type grinding machine described herein should have a substantially higher dynamic stiffness, e.g., about 0.4. This is a significant improvement because it can reduce excess wear of the grinding wheel by a factor of ten or more.

In accordance with an important aspect of this invention, a workpiece that is substantially longer than the axial length of the grinding wheel is ground at successive axial locations with the grinding at each such location being effected by feeding the grinding wheel and the workpiece relatively toward each other along a path extending in a general radial direction through the grinding wheel so that grinding is effected uniformly across the face of the grinding wheel, and controlling SGE during grinding at each successive axial location to optimize the grinding conditions at each such location. Thus, the center-type grinding system of FIGS. 14-16 provides for controlled movement of the spindle arms 103, 104 along a Z-axis parallel to the axis of the workpiece. This Z-axis movement, which is equally applicable to the work rest blade 25 in the centerless system of FIG. 1, permits a long workpiece 24 (see FIG. 16) to be indexed along the grinding wheel 20 so that successive lengths of the workpiece can be "plunged" into the grinding wheel. By controlling SGE during each successive plunge, the entire workpiece can be ground with a high degree of efficiency and accuracy—within one or two thousandths of the desired final dimension. The final increment of grinding can be carried out quickly in a final traverse grinding pass, or, in the case of centerless grinding, a final throughfeed centerless grinding pass.

This method of grinding long workpieces in multiple plunges with SGE control produces significant improvements in overall productivity of the grinding equipment, greatly improved metallurgical quality of the ground surface, and reduced levels of operator skill and time. Because grinding is effected uniformly across the full width of the grinding wheel in each successive plunge, the entire face of the grinding wheel is utilized at the same level of efficiency and productivity, which are maintained at a high level by controlling the SGE. The grinding wheel face remains flat and sharp, thereby maximizing productivity and avoiding adverse effects on the workpiece, such as the metallurgical "burns" often produced when a grinding wheel wears non-uniformly across its width in center-type traverse grinding or throughfeed centerless grinding.

The multiple-plunge grinding of long workpieces is particularly effective when the backup wheel 102 is used to support the workpiece during each plunge grind. The backup wheel 102 has the effect of removing the flexibility of the workpiece from the system, producing a relatively rigid system which can be controlled with a high degree of accuracy and reliability. Productivity can also be increased because higher grinding power and metal removal rate can be used.

In the illustrative system of FIGS. 14-16, indexing movement of the workpiece 24 along the Z-axis is accomplished by mounting the spindle arms 103, 104 on a Z-axis slide ZS riding on Z-axis ways 111 on the machine bed. Movement of the slide ZS is controlled by a Z-axis feed motor ZFM which can be operated manually or by a subroutine of the same computer control system which controls the other parameters of the grinding system. Each time a grinding plunge is completed, the solenoid valve 110 is opened briefly to allow the workpiece to retract slightly; the backup wheel 102 is retracted slightly to remove the feeding pressure from the workpiece; and the Z-axis motor ZFM is energized to index the workpiece to the next grinding position. This process is repeated at the end of each grinding plunge until all desired surfaces of the workpiece have been ground. The workpiece is then removed, and the Z-axis motor ZFM is energized in the reverse direction to return the slide ZS and the spindle arms 103, 104 to their starting positions for grinding a new workpiece.

To prevent sagging of the long workpiece 24 between the spindles 100 and 101, a plurality of steady rests 112 are spaced along the underside of the workpiece. These steady rests 112 are mounted on the Z-axis slide ZS, and each steady rest has a vertically adjustable support cradle 113 with a generally V-shaped top surface for engaging and supporting the underside of the workpiece 24. These cradles 113 are urged upwardly against the workpiece by hydraulic cylinders 114 which are controlled to exert upward forces which counterbalance (1) the downward force executed thereon due to the weight of the long workpiece and its tendency to sag between the spindles 100, 101 and (2) the tangential force $F_T$ exerted on the workpiece at the grinding interface. Component (1) of this upward force is a keyed-in constant PTWT that can be pre-calculated for each steady rest position from the size, weight and shape of each different workpiece. Component (2) is more dependent on the dynamic grinding conditions.

At any given grinding interface, the magnitude of the tangential force $F_T$ exerted on the workpiece is defined as:

$$F_T = PWR_w/S_w \tag{57}$$

where $PWR_w$ is the power input to the grinding wheel in foot-pounds/minute, $S_w$ is the surface velocity of the grinding wheel in feet/minute, and $F_T$ is in pounds. This equation can be re-written in terms of the parameters available in the control system as follows:

$$F_T = \frac{2\pi(TORW)(WHV)}{2\pi(RADW)(WHV)/12} = \frac{12\ TORW}{RADW} \tag{58}$$

Thus, the value of the force FSR to be applied by a given steady rest to the workpiece can be expressed as follows:

$$FSR = \frac{12\ TORW}{RADW} + PTWT \tag{59}$$

As long as SGE is maintained relatively constant, the value of TORW also remains relatively constant; during finish grinding, however, the SGE is deliberately altered, thereby changing TORW. Furthermore, the value of RADW changes substantially over the life of any given grinding wheel. Accordingly, it is desirable to provide automatic control of the hydraulic pressure supplied to the hydraulic cylinders 114 so as to maintain the desired counterbalancing force FSR on the workpiece at each steady rest. More specifically, the hydraulic pressure PSR supplied to the cylinders 113 is preferably maintained at a value equal to the force FSR, as defined by Equation (59), multiplied by a gain factor GPSR which takes into account the surface area of the hydraulic piston. Thus:

$$PSR = GPSR \cdot FSR = GPSR \left( \frac{12 \, TORW}{RADW} + PTWT \right) \quad (60)$$

FIG. 17 illustrates a subroutine which can be added to the computer control system described above for the purpose of implementing this automatic control of the hydraulic pressure supplied to each steady rest cylinder 114. This subroutine is entered at step 800 which reads the current value of the grinding wheel input torque $TORW_i$ from the ADC receiving the analog signal $TOR_w$ from the transducer 35. The value of $TORW_i$ can be averaged by the usual "stacking" procedure if desired. The subroutine then advances to step 801 where the current value of the grinding wheel radius $RADW_i$ is computed as the value $RADW_{i-1}$ in the previous iteration minus the current value of $COR\Delta_i$ representing the incremental reduction in grinding wheel radius in the latest iteration interval.

At step 802, the subroutine of FIG. 17 carries out three computations, the first of which is a computation of the current value of the desired hydraulic pressure $PSR_i$ to be supplied to the cylinders 113, as determined by Equation (60) above. This equation uses the current values of $TORW_i$ and $RADW_i$ determined at steps 800 and 801, as well as the keyed-in constants GPSR and PTWT described above. The second computation at step 802 determines the value of an error signal PSRERR, which is simply the difference between the current desired hydraulic pressure value $PSR_i$ and the corresponding value $PSR_{i-1}$ for the previous iteration interval. The error value $PSRERR_i$ is then used in the third computation at step 802 to determine the value of a control voltage level $VSR_i$ which is passed through a DAC to generate an analog signal for controlling a valve or similar device which determines the level of the actual hydraulic pressure PSR supplied to the steady rest cylinder 114. The equation for computing the desired value of the voltage signal $VSR_i$ is set forth at step 802 in FIG. 17, and comprises the sum of the previous value $VSR_{i-1}$ and the value of the error signal $PSRERR_i$ multiplied by a gain factor GVSR (another one of the keyed-in constants). This subroutine then returns to the main program at step 803.

Since the X-axis control system holds the grinding rate constant at the value GR during rough grinding, the metal removal rate M'—which is the denominator of the ratio SGE—is essentially constant. Consequently, a constant SGE ratio can be maintained during each plunge, as well as over successive plunges of a given workpiece as it is indexed past the grinding wheel, by holding the numerator $PWR_g$ constant. This is accomplished in the same manner described above in connection with the subroutine of FIG. 10 for controlling the centerless system, i.e., any change in the input torque $TOR_w$ to the grinding wheel is translated into a change in the grinding wheel speed $\omega_w$ to initiate the self-sharpening action, which in turn causes the input torque to be restored to its original level.

In the subroutine of FIG. 10, the gain factor GW which translates any given change in torque $TOR_w$ into a corresponding change in wheel speed $\omega_w$, is set to different values GW1, GW2 and GW3 for rough grinding and the different stages of finish grinding. When grinding a long workpiece in multiple plungers, however, only rough grinding is normally involved because the finish grinding is done during a final traverse grinding (or throughfeed centerless grinding) pass in order to even out any discontinuities between the ground surfaces produced by successive plunges. Consequently, only the first gain factor GW1 is normally used in the exemplary center-type grinding system of FIGS. 14–16, and, therefore, steps 203, 204, 206 and 207 of the subroutine of FIG. 10 can be omitted.

In order to gage the workpiece radius while it is being ground in the center-type system of FIGS. 14–16, an LVDT gage 115 is provided at each of the multiple grinding positions along the length of the workpiece. These gages 115 are the same as the gages 60, 61 used in the centerless system of FIGS. 1–3, but only a single gage is needed at each grinding position in the center-type system in FIGS. 14–16 because the center of the workpiece is fixed by the spindles 100, 101. Thus, only a radius gage, not a diameter gage, is needed.

The gages 115 produce electrical output signals which represent the distance Y1 between the lowermost surface of the workpiece (at the respective gage locations) and a known reference position YR (see FIG. 16). The distance Y2 between the spindle axes and that same reference position YR is also known, and thus the workpiece radius $R_p$ is the difference between Y1 and Y2 or:

$$R_p = Y2 - Y1 \quad (61)$$

When one of the steady rests 112 is located within a given grinding area, the gage 115 for the particular grinding position can be mounted within the cradle 113 of that particular steady rest. In fact, hydraulic cylinders are available with LVDT transducers built directly into them; since the pistons of the cylinders 114 follow the changing elevation of the lowermost surface of the workpiece 24 as it is being ground, such integrated gages which signal the positions of the pistons in the hydraulic cylinders 114 can be used as workpiece gages. Those grinding positions that do not include a steady rest are provided with separate mounting pedestals 116 for the gages 115. These pedestals 116, which are mounted on the Z-axis slide ZS, are equipped with manual adjustment screws 117 for adjusting the vertical positions of the gages 115 therein for different workpiece sizes.

The subroutine for producing the command signal VPM for controlling the driving voltage $V_{pm}$ for the workpiece drive motor PM is illustrated in FIG. 18. The first step 900 of this subroutine reads the value of the signal PTV which is the digital counterpart of the analog signal $\omega_p$ received from the workpiece tachometer 39. This signal PTV represents the actual speed of the workpiece at any given instant. Step 901 computes and stores a running average PTVAV of the speed signal PTV over, for example, the last ten $\Delta T$'s. This is the conventional averaging technique performed by a "stacking" procedure which continuously stores the latest 10 readings, adding the new value $PTV_i$ and discarding the oldest value $PTV_{i-10}$ in each $\Delta T$. The ten values stored at any given time are summed and divided by ten to provide the desired average value PTVAV.

At step 902, the subroutine of FIG. 18 computes an error signal $PTVERR_i$ as the difference (if any) between the keyed-in set point speed value PTVD (in rpm) and the latest average value $PTVAV_i$. This error signal $PTVERR_i$ is then used to effect any adjustment required in the command signal VPM which controls the driving voltage $V_{pm}$ supplied to the drive motor PM. More specifically, the error signal $PTVERR_i$ is used to make an integrating correction by multiplying it by a proportionality or gain factor GPV (one of the keyed-in constants), and then adding the resulting product to the value of the command signal $VPM_{i-1}$ for the previous $\Delta T$. The resulting new value $VPM_i$ of the command signal will tend to restore the actual workpiece speed PTV to the set point speed PTVD. The command signal will remain at this new value, holding the actual workpiece speed at the set point speed, unless and until there is a further deviation of the actual speed from the set point speed. Step 903 of this subroutine returns the system to the main program.

The truing roll 50 in the center-type grinding system of FIGS. 14–16 operates in the same manner as in the centerless system of FIGS. 1–3. That is, the truing roll 50 can be fed into the grinding wheel 20 for simultaneous truing and grinding, using a subroutine similar to that of FIG. 11 described above, or the truing roll may simply be used to true the grinding wheel each time a certain number of workpieces have been ground, or on command from the operator.

DETAILED DESCRIPTION OF PREFERRED EMBODIMENT FOR CENTERLESS GRINDING OF HOLLOW WORKPIECES

In accordance with a further important aspect of this invention, hollow workpieces are ground in a centerless grinding operation using a regulating wheel which fits inside the hollow workpiece for supporting the workpiece against radial forces exerted thereon at the grinding interface. Controllable feed means are provided for moving the regulating wheel in the direction of its axis so as to permit it to be moved in and out of the hollow interior of the workpiece. By providing a regulating wheel inside the hollow workpiece and directly opposite the grinding wheel which is grinding the outer surface of the workpiece, this system avoids serious problems encountered in prior art techniques for centerless grinding of hollow workpieces. For example, this system avoids the workpiece distortion that can be caused by "squashing" a hollow workpiece between the grinding wheel and external workpiece supports, and by avoiding such distortion the hollow workpiece can be ground much more rapidly. Avoiding such workpiece distortion also provides more accurate gage readings during the grinding process.

Use of the internal regulating wheel to control the rotational speed of the workpiece also overcomes other problems with prior art processes for grinding hollow workpieces. For example, prior art techniques have typically used driven magnetic chucks to control the workpiece feed, but unless the magnetic chucks are made extremely large (and expensive), a certain amount of rotational slippage can occur at the interface between the chuck and the workpiece. This problem is avoided by driving the hollow workpiece with an internal regulating wheel, which is capable of accurately and reliably controlling the workpiece speed without any slippage problems.

An illustrative centerless grinding system for grinding hollow workpieces with the use of an internal regulating wheel is illustrated in FIGS. 19–20. This system differs from the centerless grinding system of FIGS. 1–3 in that a Z-axis slide ZS is interposed between the X-axis slide and the R-axis slide RS. Thus, the regulating wheel 26 is still carried by the X-axis slide XS, but the regulating wheel can also be moved in a controlled manner relative to the X-axis slide along two mutually perpendicular axes, namely the R and Z axes. The Z-axis slide ZS has its own feed motor ZFM supplied with a controllable drive voltage $V_{zfm}$. This voltage $V_{zfm}$ may be controlled manually to traverse the slide RS along the Z-axis for feeding the regulating wheel 26 in and out of the hollow workpiece 24.

The purpose of the Z-axis movement in the grinding system of FIGS. 19–20 is to permit the regulating wheel 26 to be moved in and out of the hollow interior of a workpiece 24. Whenever the Z-axis slide ZS is moved, it carries with it the R-axis slide RS, so that the regulating wheel can actually be moved along both the axes R and Z simultaneously if desired.

The mounting of the regulating wheel 26 on the R-axis slide RS in the system of FIGS. 19–20 differs from the mounting arrangement for the regulating wheel in the system of FIG. 1 in that the regulating wheel 26 in the system of FIGS. 19–20 projects laterally from one side of the slide RS. The purpose of this mounting arrangement, of course, is to permit the regulating wheel 26 to be aligned with the hollow interior of the workpiece 24. Movement of the Z-axis slide ZS can then move the regulating wheel 26 in and out of the workpiece 24, and while the regulating wheel is inside the hollow workpiece the wheel can be fed against the inside surface of the workpiece by the R-axis feed motor RFM. The workpiece 24 can be fed into the grinding wheel 20 by advancing either the R-axis slide RS or the X-axis slide XS.

As can be seen in FIG. 19, the hollow workpiece 24 is held in the desired axial position, in alignment with the grinding wheel 20, by means of a magnetic chuck 200 mounted on the slide XS. As is well known, a magnetic chuck holds a workpiece in position by magnetically attracting the end of the workpiece against the face of the chuck and then magnetically holding the workpiece in that position while the workpiece is being worked upon. The face of the chuck is perpendicular to the axis of the grinding wheel. In the present example, the magnetic chuck 200 is free-wheeling so that it rotates along with the workpiece 24 while the workpiece is being driven by the regulating wheel 26. Since the sole function of the magnetic chuck 200 in the illustrative system is to hold the workpiece in the desired axial position with the workpiece axis parallel to that of the grinding wheel, any slippage that occurs in a direction parallel to the chuck face is immaterial.

Aside from the unique features described above, the grinding system of FIGS. 19 and 20 is similar in both structure and operation to the grinding system of FIGS. 1–3. Thus, the X-axis slide XS carries both a work rest blade 25 and a work support blade 25b for supporting the workpiece 24 during loading and unloading as well as during grinding. Also, the outside diameter of the workpiece is gaged by a pair of position-measuring gages 60 and 61, with the lower gage 61 being mounted in the slide XS between the blades 25 and 25b, and the upper gage 60 being mounted in a plate 62 attached to opposite sides of the slide XS via mounting frames 63 and 64 (see FIGS. 2 and 3). As described previously, these frames 63 and 64 define openings which are large enough to permit workpieces to be inserted axially through the frames onto the top surfaces of the blades 25 and 25b.

The function and control of the three rotational drive motors WM, RM and TM, as well as the feed motors XFM, RFM and TFM, are also similar to the system of FIGS. 1–3; these motors can, therefore, be controlled by subroutines similar to those described above in connection with FIGS. 8 through 13. The only significant difference is that the X-axis feed rate in the system of FIGS. 19 and 20 must be controlled to regulate the rate of reduction of the workpiece radius, rather than diameter, because the regulating wheel 26 is located inside the workpiece. Thus, the multiplexer "2" is removed from steps 116, 121, 122, 123 and 106a in the X-axis subroutine of FIG. 8, and the value of the error signal PTDERR computed at steps 106, 106a, and 118 is divided by two so that it reflects the error in the radial, rather than diametral, grinding rate.

In the exemplary embodiment of FIGS. 19 and 20, the regulating wheel 26 is illustrated as having a flat face to match the flat inside surface of the workpiece 24. If the inside surface of the workpiece 24 is contoured, however, the face of the regulating wheel 26 may be similarly contoured, with a complementary configuration, to provide uniform backup support across the full width of the workpiece. This is particularly desirable in the case of relatively thin workpieces.

Another possible modification of the illustrative system is to drive the workpiece 24 by driving the magnetic chuck 200 and allowing the regulating wheel 26 to free-wheel. The workpiece 24 can still be fed into the grinding wheel by advancing either the X-axis slide XS or the R-axis slide RS, preferably the same slide which carries the magnetic chuck 200. Yet another possible modification is to feed the grinding wheel into the workpiece by mounting the grinding wheel on an X-axis slide, while holding the work rest blade and the regulating wheel in stationary positions.

Although not shown in the drawings, a diamond dressing tool is preferably mounted on the slide XS so that the regulating wheel 26 can be dressed while it is moved along the Z axis by the drive motor ZFM. Such dressing is desirable on a periodic basis, e.g., once a day, to remove material that has become loaded with metal or worn too smooth to provide the desired frictional engagement with the workpiece.

The grinding system of FIGS. 19 and 20 can also be used to grind the inside surface of a hollow workpiece by interchanging the grinding wheel and the regulating wheel, with appropriate changes in the diameters of the two wheels. That is, the regulating wheel 26 can be replaced with a grinding wheel of the same diameter so that it will fit inside the hollow workpiece; and the grinding wheel 20 can be replaced with a regulating wheel of the same or somewhat smaller diameter. The grinding wheel is then fed into the hollow workpiece 24 to grind the inside surface thereof by advancing the R-axis slide RS while controlling the parameters of the grinding system to maintain a relatively constant SGE.

DETAILED DESCRIPTION OF PREFERRED EMBODIMENT FOR CENTER-TYPE ANGULAR WHEEL GRINDING

The present invention is also applicable to center-type angular wheel grinding operations such as the one illustrated in FIGS. 21 and 22. Angular wheel grinders utilize grinding wheels having grinding faces which are not parallel to the grinding wheel axis, nor is the grinding wheel axis parallel to the workpiece axis. As a result, such grinding wheels can be used to grind workpiece surfaces which are not parallel to the workpiece axis, such as the shoulder 24a on the workpiece 24 illustrated in FIGS. 21 and 22. In the illustrative embodiment, the angular grinding wheel 20 is provided with two beveled surfaces 20a and 20b which are perpendicular to each other so that the wheel surface 20a can be used to grind the workpiece shoulder 24a while the perpendicular wheel surface 20b is used to grind a cylindrical workpiece surface 24b immediately adjacent the shoulder surface 24a. The grinding of these two surfaces can be either simultaneous or sequential. The axes of the grinding wheel 20 and the workpiece 24 are canted relative to each other so that the grinding wheel surfaces 20a and 20b engage the desired workpiece surfaces 24a and 24b.

In order to grind the two workpiece surfaces 24a and 24b with the corresponding grinding wheel faces 20a and 20b, the workpiece and the grinding wheel are fed relatively into each other along two mutually perpendicular axes identified as the Z axis and the X axis. The Z-axis feed rate controls grinding at the interface between the wheel face 20a and the workpiece surface 24a, while the X-axis feed rate controls grinding at the interface between the grinding wheel face 20b and the workpiece surface 24b. The relative infeeding along the Z-axis is effected by a Z-axis feed motor ZFM which moves a Z-axis slide ZS along horizontal ways on the machine bed. As shown in FIGS. 21 and 22, the slide ZS mounts a nut 300 engaged with a lead screw 301 which is reversibly driven at controllable speeds by the feed motor ZFM. The speed and direction of the motor ZFM are controlled by the magnitude and polarity of the energizing voltage $V_{zfm}$ applied to the motor, and a resolver 302 produces a signal ZR representing the position of the Z-axis slide as it moves back and forth along the Z axis.

Feeding movement of the X-axis slide XS is controlled by a feed motor XFM in the same manner described above in connection with the embodiment of FIGS. 14–16. Thus, the motor XFM moves the slide XS, along with a backup wheel 102 carried thereon, back and forth along the X axis according to the polarity of the energizing voltage $V_{xfm}$ and at a rate proportional the magnitude of that voltage. During such movement, a resolver 29 produces a signal XR representing the position of the X-axis slide at any given instant.

Control of the feed motors ZFM and XFM can be carried out in a number of different ways, depending upon whether it is desired to grind the two work surfaces simultaneously or sequentially. The simplest technique is to effect the grinding of the two surfaces sequentially. In this case, the Z-axis feed motor ZFM is de-energized during grinding of the workpiece surface 24b, while the other parameters of the grinding system are controlled in the same manner described above in connection with the center-type grinding system of FIGS. 14–16. Then during grinding of the workpiece surface 24a, the X-axis feed motor XFM is de-energized, and the Z-axis motor ZFM is energized to feed the workpiece axially into the grinding wheel.

To effect grinding of the workpiece surface 24a, the Z-axis slide ZS is fed to the left, as viewed in FIG. 22, by the motor ZFM. During this Z-axis feeding, the grinding system is controlled in the same manner as in X-axis feeding except that the feed motor ZFM and its resolver signal ZR take the place of the X-axis feed motor XFM and its resolver signal XR. Thus, the grinding wheel speed is still being controlled to control SGE during grinding of the workpiece shoulder 24a. During this phase of the grinding operation, the workpiece dimension being monitored for final size is the axial position of the shoulder surface 24a, which is sensed by an LVDT gage 304. This gage 304 produces an electrical output signal which represents the distance between the workpiece shoulder surface 24a being ground and a known reference position. Thus, the signal from the gage 304 can be used as a substitute for the gage signals used in the X-axis control system described previously. The desired final value of this gage signal, representing the desired final position of the workpiece shoulder 24a, is keyed into the control system as a constant corresponding to the constant PTRADD used in the previously described X-axis control system.

The workpiece 24 in the grinding machine of FIGS. 21 and 22 is supported by a spindle 100 and a driven chuck 303. The chuck 303 is preferred over a second spindle because the chuck offers more solid resistance to the Z-axis force exerted on the workpiece by the grinding wheel 20 during grinding of the workpiece shoulder 24a. That is, the chuck 303 serves as a backup support for the workpiece to resist the axial forces exerted on the workpiece during Z-axis grinding. The chuck 303 also serves to rotate the grinding wheel during both Xaxis grinding and Z-axis grinding, being driven by a motor PM which is controlled in the same manner as the workpiece drive motor PM described above in the embodiment of FIGS. 14–16.

A CENTERLESS THROUGHFEED GRINDING SYSTEM EMBODYING THE INVENTION

One particularly useful application of the present invention is in centerless throughfeed grinding, in which the axis of the regulating wheel is canted relative to the axis of the grinding wheel to produce a force vector which tends to move the workpieces longitudinally along the surface of the grinding wheel. Multiple workpieces are often ground simultaneously by the same grinding wheel in this type of grinding operation. In order to control the SGE in such a grinding operation, it is necessary to know the actual grinding rate, even though the workpieces are constantly moving in the direction of their axes while they are being ground.

In accordance with a further aspect of the present invention, the grinding rate of a throughfeed centerless grinding operation is monitored by measuring selected dimensions of a multiplicity of workpieces before and after grinding in a selected grinding time period, determining the volume of material removed from the workpieces as indicated by the differences between the measured dimensions before and after grinding, and determining the rate of material removal from the workpieces by dividing the volume of material removed by the selected time period. One or more of the system parameters can then be adjusted as required to maintain the actual grinding rate constant, thereby maintaining a substantially constant value for the denominator—the metal removal rate M'—of the ratio SGE. Examples of system parameters which can be adjusted to control the actual grinding rate are the elevation of the work rest blade and the angle of cant between the axes of the regulating wheel and the grinding wheel.

As long as the metal removal rate M' is held substantially constant in the manner described above, a substantially constant SGE value can be maintained by the same kind of control system utilized in the various embodiments of the invention described above. That is, the numerator $PWR_g$ of the ratio SGE can be held essentially constant by changing the grinding wheel speed $\omega_w$ in response to any change in the input torque $TOR_w$ to the grinding wheel. As described in detail above, this change in the grinding wheel speed produces a self-sharpening action which causes the input torque $TOR_w$ to be maintained at a substantially constant level, thereby maintaining a corresponding constant SGE value.

In order to determine the volume of material removed from any given workpiece in the throughfeed centerless grinding operation, appropriate dimensions of the workpiece are measured before and after the grinding operation. For example, in the case of a simple cylindrical workpiece, it is simply necessary to measure the diameter and length of the workpiece before grinding, and then measure the diameter again after grinding. If the diameter of the workpiece before grinding is D1 and the diameter after grinding is D2, the volume of material removed by grinding is equal to $(D1^2 - D2^2)/4$. It is preferred to carry out this calculation for a multiplicity of workpieces ground during a known time period, then sum the total volume of material removed from that entire group of workpieces, and divide the resulting sum by the known time period during which those workpieces were ground. The resulting value is the average rate of material removal during that particular grinding time.

With this technique of monitoring the grinding rate, the ratio SGE can be controlled during throughfeed centerless grinding, with all the attendant advantages described above for SGE control during centerless grinding.

I claim as my invention:

1. A centerless grinding system comprising
   a driven grinding wheel, a driven regulating wheel, and a work rest blade for centerless grinding of a workpiece supported by said work rest blade between said grinding wheel and said regulating wheel,
   means for determining the rate of reduction of the workpiece radius while it is being ground, and
   means responsive to said rate of reduction of the workpiece radius for controlling the ratio of the power consumed in removing workpiece material to the rate of removal of workpiece material by the grinding wheel.

2. A centerless grinding system as set forth in claim 1 wherein said workpiece radius reduction rate-determining means comprises a pair of workpiece gages disposed on diametrically opposite sides of said workpiece.

3. A centerless grinding system as set forth in claim 2 wherein said workpiece gages are positioned to sense the lowest and highest surfaces of said workpiece.

4. A centerless grinding system as set forth in claim 2 wherein said workpiece gages are linearly variable differential transformers.

5. A centerless grinding system as set forth in claim 2 which includes a movable slide carrying said work rest blade and said regulating wheel, and controllable drive means for controllably advancing said work rest blade and said regulating wheel relative to said grinding wheel, said workpiece gages being mounted on said slide.

6. A centerless grinding system as set forth in claim 5 wherein said workpiece gages are positioned to sense the top and bottom surfaces of said workpiece, the top gage being mounted on said slide by mounting means configured to permit workpieces to be loaded and unloaded axially along said work rest blade.

7. A centerless grinding system as set forth in claim 6 wherein said mounting means includes means for dispensing a liquid coolant onto said workpiece.

8. A centerless grinding system as set forth in claim 2 wherein each of said workpiece gages produces an electrical signal that varies in proportion to the distance between the gaged workpiece surface and a fixed reference point.

9. A centerless grinding system as set forth in claim 1 wherein said ratio-controlling means comprises means for conjointly controlling the relative surface speed of rubbing contact between said workpiece and said grinding wheel, and the relative infeed rate of said workpiece and said grinding wheel.

10. A centerless grinding system as set forth in claim 9 wherein said ratio-controlling means includes means for increasing or decreasing said relative surface speed to decrease or increase the grit-fracturing action on the face of said grinding wheel and thereby make the wheel duller or sharper.

11. A centerless grinding system as set forth in claim 9 wherein said ratio-controlling means includes means for increasing or decreasing said relative infeed rate to increase or decrease the grit fracturing action on the face of said grinding wheel and thereby make the wheel sharper or duller.

12. A centerless grinding system as set forth in claim 1 which includes means for feeding said workpiece and said grinding wheel relatively toward each other along a path extending generally radially through the grinding wheel so that grinding is effected uniformly across the face of the grinding wheel.

13. A centerless grinding system as set forth in claim 12 wherein said feeding means comprises means for controllably advancing said regulating wheel and said work rest blade toward said grinding wheel.

14. A centerless grinding system as set forth in claim 13 wherein the rotational axis of said grinding wheel is stationary.

15. A centerless grinding system as set forth in claim 1 which includes means for moving said workpiece in an axial direction between said regulating wheel and grinding wheel while said workpiece is supported on said work rest blade and disengaged from said grinding wheel.

16. A centerless grinding system as set forth in claim 1 wherein said regulating wheel is driven in the same direction as said grinding wheel and which includes means for controlling said regulating wheel to brake the rotation of the workpiece so that the relative surface speed of rubbing contact between the workpiece and the grinding wheel is equal to the difference between the surface speeds of the regulating wheel and the grinding wheel.

17. A centerless grinding system as set forth in claim 1 wherein said ratio-controlling means includes means for relatively infeeding said workpiece and grinding wheel at a controlled rate, means for driving the grinding wheel at a set point speed, means for monitoring the power input to said grinding wheel, and means responsive to a change in said power input for temporarily altering said set point speed and thereby temporarily altering the grinding wheel speed to effect a change in the grinding wheel face so that the power input to said grinding wheel is restored to its original level.

18. A centerless grinding system as set forth in claim 1 which includes
means for advancing said regulating wheel relatively toward said grinding wheel to effect relative infeeding of said workpiece and said grinding wheel,
means for determining the rate of wear of said grinding wheel from (1) the rate of reduction of the workpiece radius and (2) the position of said regulating wheel relative to said grinding wheel, and
means for controlling the rate of advance of said regulating wheel relatively toward said grinding wheel according to the rate of wear of said grinding wheel, so as to maintain a desired rate of relative infeeding of said workpiece and said grinding wheel.

19. A centerless grinding system as set forth in claim 18 which includes means for monitoring the position of said regulating wheel relative to said grinding wheel.

20. A centerless grinding system comprising
a driven grinding wheel, a driven regulating wheel, and a work rest blade for centerless grinding of a workpiece supported by said work rest blade between said grinding wheel and said regulating wheel,
means for determining the rate of reduction of the workpiece radius while it is being ground, and
means for conjointly controlling the relative surface speed of rubbing contact between said workpiece and said grinding wheel, and the relative infeed rate of said workpiece and said grinding wheel.

* * * * *